(12) United States Patent
Zhong et al.

(10) Patent No.: US 12,459,919 B2
(45) Date of Patent: Nov. 4, 2025

(54) POLYMORPHIC FORMS OF (R)-4-(1-((3-(DIFLUOROMETHYL)-1-METHYL-1H-PYRAZOL-4-YL)SULFONYL)-1-FLUOROETHYL)-N-(ISOXAZOL-3-YL)PIPERIDINE-1-CARBOXAMIDE

(71) Applicant: MyoKardia, Inc., Brisbane, CA (US)

(72) Inventors: Min Zhong, Palo Alto, CA (US); Olivier Monnier, Villeveyrac (FR); Jean-Philippe Jelin, Montpellier (FR); Richard Duvoux, Montpellier (FR); Jean Alie, Montpellier (FR); Philippe Ochsenbein, Montpellier (FR)

(73) Assignee: MYOKARDIA, INC., Brisbane, CA (US)

( * ) Notice: Subject to any disclaimer, the term of this patent is extended or adjusted under 35 U.S.C. 154(b) by 927 days.

(21) Appl. No.: 17/678,569

(22) Filed: Feb. 23, 2022

(65) Prior Publication Data

US 2022/0289709 A1    Sep. 15, 2022

Related U.S. Application Data

(63) Continuation of application No. 16/929,230, filed on Jul. 15, 2020, now abandoned.

(60) Provisional application No. 62/874,855, filed on Jul. 16, 2019.

(51) Int. Cl.
C07D 401/12 (2006.01)
A61K 9/00 (2006.01)

(52) U.S. Cl.
CPC .......... C07D 401/12 (2013.01); *A61K 9/0019* (2013.01); *C07B 2200/13* (2013.01)

(58) Field of Classification Search
CPC ................................................. C07D 401/12
See application file for complete search history.

(56) References Cited

U.S. PATENT DOCUMENTS

| | | | |
|---|---|---|---|
| 9,925,177 B2 | 3/2018 | Oslob et al. | |
| 2005/0250789 A1 | 11/2005 | Burns et al. | |
| 2010/0113377 A1 | 5/2010 | Simpson | |
| 2010/0228026 A1 | 9/2010 | Yoshida et al. | |
| 2016/0145249 A1 | 5/2016 | Terakado et al. | |
| 2022/0265629 A1 | 8/2022 | Tamby et al. | |

FOREIGN PATENT DOCUMENTS

| | | | |
|---|---|---|---|
| CA | 2598610 A1 | 9/2006 | |
| CN | 102596949 A | 7/2012 | |
| EP | 2500345 A1 | 9/2012 | |
| EP | 2203437 B1 | 11/2012 | |
| WO | 2000/044723 A1 | 8/2000 | |
| WO | 2006/009726 A2 | 1/2006 | |
| WO | 2006/074025 A1 | 7/2006 | |
| WO | 2008/120759 A1 | 10/2008 | |
| WO | 2009/011850 A2 | 1/2009 | |
| WO | 2009/038974 A1 | 3/2009 | |
| WO | 2009/043747 A2 | 4/2009 | |
| WO | 2009/154300 A2 | 12/2009 | |
| WO | 2010/113377 A1 | 10/2010 | |
| WO | 2011/059021 A1 | 5/2011 | |
| WO | 2015/005305 A1 | 1/2015 | |
| WO | 2015/018475 A1 | 2/2015 | |
| WO | 2015/112806 A2 | 7/2015 | |
| WO | 2016/118774 A1 | 7/2016 | |

OTHER PUBLICATIONS

Patric Stahly, Importance of selection of pharmaceutical salts and screening of crystal polymorphism, pharmacology, 2006, vol. 66, No. 6, p. 435-439. Translated abstract provided.

Noriaki Hirayama, Organic Compound Crystal Produced Handbook, 2008, pp. 17-23, 37-40, 45-51, 57-65. Translated abstract provided.

International Search Report and Written Opinion mailed Apr. 29, 2016 in connection with PCT/US2016/014365.

Written Opinion for Singapore Patent Application No. 11201705928 issued Apr. 20, 2018, 6 pages.

Andrei, et al., New Perspective in Heart Failure Management: Could Myosin Activators be the Answer? Discoveries Journals. Oct. 2014;2(4):e33, 8 pages. Doi:10.15190/d.2014.25.

(Continued)

*Primary Examiner* — Shawquia Jackson
(74) *Attorney, Agent, or Firm* — Honigman LLP; Andrew N. Weber; Jonathan P. O'Brien

(57) ABSTRACT

The present invention provides novel polymorphs of (R)-4-(1-((3-(difluoromethyl)-1-methyl-1H-pyrazol-4-yl)sulfonyl)-1-fluoroethyl)-N-(isoxazol-3-yl)piperidine-1-carboxamide (I-491) that are useful for the treatment of cardiac disorders including systolic dysfunction, dilated cardiomyopathy (DCM), heart failure with reserved ejection fraction (HFrEF), and conditions associated with left and/or right ventricular systolic dysfunction or systolic reserve. The synthesis and characterization of the polymorphs is described, as well as methods for treating systolic dysfunction, DCM, HFrEF, and other forms of heart disease.

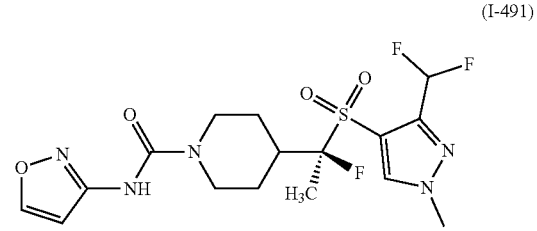

(I-491)

38 Claims, 19 Drawing Sheets

(56) References Cited

OTHER PUBLICATIONS

Byrn, S., et al: "Pharmaceutical Solids: A Strategic Approach to Regulatory Considerations", Pharmaceutical Research, vol. 12, No. 7, Jan. 1, 1995 (Jan. 1, 1995), pp. 945-954.

Caira, M.R., "Crystalline Polymorphism of Organic Compounds", Topics in Current Chemistry; [Topics in Current Chemistry], Springer, Berlin, DE, vol. 198, Jan. 1, 1998 (Jan. 1, 1998), pp. 163-208.

Malik, et al., Cardiac myosin activation: a potential therapeutic approach for systolic heart failure. Science. Mar. 18, 2011;331(6023):1439-43. doi:10.1126/science.1200113.

Shen et al. Discovery of a highly potent, selective, and bioavailable soluble epoxide hydrolase inhibitor with excellent ex vivo target engagement. J Med Chem. Aug. 27, 2009;52(16):5009-12. doi: 10.1021/jm900725r. PubMed PMID: 19645482.

Teerlink, J.R., "A novel approach to improve cardiac performance: cardiac myosin activators", Heart Fail Rev. Dec. 2009;14(4), pp. 289-298.

Bakar, M.R.H.A., Process-analytical Technology-based Approaches for the Monitoring and Control of Size and Polymorphic Form in Pharmaceutical Crystallisation processes, 2010.

Braga, D. et al., Crystal Polymorphism and Multiple Crystal Forms, Struct Bond, 132: pp. 25-50, Feb. 25, 2009.

Grant, D.J.W., Polymorphism in Pharmaceutical Solids, edited by H. G. Brittain, Chapter 1, pp. 1-33, Marcel Dekker, 1999.

Guillory, J.K., Polymorphism in Pharmaceutical Solids, edited by H. G. Brittain, Chapter 5, pp. 183-226, Marcel Dekker, 1999.

Hilfiker, R. et al., "Relevance of Solid-state Properties for Pharmaceutical Products", Polymorphism: in the Pharmaceutical Industry, edited by Rolf Hilfiker, pp. 1-19, 2006.

Lu, J. et al., Polymorphism and crystallization of active pharmaceutical ingredients (APIs), Current Medicinal Chemistry, 2009, 16, pp. 884-905.

Shah, N.H. et al., Pharmaceutical Dosage Forms: Tablets, edited by Larry L. Augsburger and Stephen W. Hoag, 3rd Ed., vol. 2, Chapter 2, pp. 51-104, Informa Healthcare, 2008.

POLYMORPHIC FORMS OF (R)-4-(1-((3-(DIFLUOROMETHYL)-1-METHYL-1H-PYRAZOL-4-YL)SULFONYL)-1-FLUOROETHYL)-N-(ISOXAZOL-3-YL)PIPERIDINE-1-CARBOXAMIDE

CROSS-REFERENCE TO RELATED APPLICATION

This application is a continuation of U.S. application Ser. No. 16/929,230, filed on Jul. 15, 2020, which claims the benefit of U.S. provisional application No. 62/874,855, filed Jul. 16, 2019. The entire contents of the aforementioned applications are incorporated herein by reference in their entireties.

BACKGROUND OF THE INVENTION

Heart failure (HF) is a global pandemic affecting about 26 million people worldwide. It is the most rapidly growing cardiovascular condition globally, with substantial morbidity, mortality, and cost burden to healthcare systems (Ponikowski et al., *ESC Heart Fail.* (2014) 1(1):4-25; Savarese and Lund, *Card Fail Rev.* (2017) 3(1):7-11). HF is the most common cause of hospitalization in patients older than 65 years (Ponikowski, supra; Savarese and Lund, supra; and Shah et al., *J Am Coll Cardiol.* (2017) 70(20):2476-86). The five-year mortality rate after HF hospitalization is about 42%, comparable to many cancers (Benjamin et al., *Circulation* (2019) 139:e56-e528).

Heart failure is a clinical syndrome in which a patient's heart is unable to provide an adequate supply of blood flow to the body to meet the body's metabolic needs. For some people with heart failure, the heart has difficulty pumping enough blood to support other organs in the body. For others, they may have a hardening and stiffening of the heart muscle itself, which blocks or reduces blood flow to the heart. Those two conditions result in inadequate blood circulation to the body and congestion of the lungs. Heart failure can affect the right or left side of the heart, or both sides at the same time. It can be either an acute (short-term) or chronic (ongoing) condition. Heart failure can be referred to as congestive heart failure when fluid builds up in various parts of the body. Symptoms of heart failure include, but are not limited to, excessive fatigue, sudden weight gain, a loss of appetite, persistent coughing, irregular pulse, chest discomfort, angina, heart palpitations, edema (e.g., swelling of the lungs, arms, legs, ankles, face, hands, or abdomen), shortness of breath (dyspnea), protruding neck veins, and decreased exercise tolerance or capacity.

The volume of blood pumped by the heart is generally determined by: (a) the contraction of the heart muscle (i.e., how well the heart squeezes or its systolic function) and (b) the filling of the heart chambers (i.e., how well the heart relaxes and fills with blood or its diastolic function). Ejection fraction is used to assess the pump function of the heart; it represents the percentage of blood pumped from the left ventricle (the main pumping chamber) per beat. A normal or preserved ejection fraction is great than or equal to 50 percent. If the systolic function of the heart is impaired such that the heart demonstrates substantial reduction in ejection fraction, this condition is known as heart failure with reduced ejection fraction (HFrEF). HFrEF with an ejection fraction of ≤40% is classical HFrEF, while HFrEF with an ejection fraction of 41-49% is classified as heart failure with mid-range ejection fraction (HFmrEF), under the 2013 American College of Cardiology Foundation/American Heart Association guidelines (Yancy et al., *Circulation* (2013) 128:e240-327) and the 2019 ACC Expert Consensus Decision Pathway on Risk Assessment, Management, and Clinical Trajectory of Patients Hospitalized With Heart Failure (Hollenberg et al., *J Am Coll Cardiol* (2019) 74:1966-2011). There are many causes for a weak heart muscle (low ejection fraction), including ischemia/infarction, hypertension, heart valve defects, gene mutations, infection, and toxin/drug exposure.

Diastolic dysfunction may contribute to morbidity in HFrEF patients. If the heart pumps normally but is too stiff to fill properly, this condition is known as heart failure with preserved ejection fraction (HFpEF). Historically, HFpEF was termed diastolic heart failure; however, recent investigations suggest a more complex and heterogeneous pathophysiology. HFpEF patients exhibit subtle or mild abnormalities in systolic performance, which become more dramatic during exercise. Ventricular diastolic and systolic reserve abnormalities, chronotropic incompetence, stiffening of ventricular tissue, atrial dysfunction, pulmonary hypertension, impaired vasodilation, and endothelial dysfunction are all implicated. Frequently, these abnormalities are noted only when the circulatory system is stressed.

In the United States alone, there are about 2.6 million HFrEF patients, corresponding to about 40% of the U.S. HF population (Bloom et al., *Nat Rev Dis Primers.* (2017) 3:17058). HFrEF may develop from an ischemic origin (primarily attributed to coronary artery disease) or a non-ischemic origin (attributed to a disease of the myocardium from non-coronary causes). Coronary artery disease (coronary heart disease) is a disease in which there is a narrowing of the passageway of the coronary arteries, and when severe, the narrowing causes inadequate blood supply to the heart muscle and may lead to the death of heart muscle cells (infarction). Non-ischemic HFrEF is sometimes referred to as dilated cardiomyopathy (DCM). Despite the nomenclature, dilated (enlarged) heart chambers can be found in both non-ischemic and ischemic HFrEF patients. Hereafter, DCM refers to non-ischemic HFrEF. DCM can be assigned a clinical diagnosis of genetic DCM or "idiopathic" DCM if no identifiable cause can be found. Mutations in over 30 genes, including sarcomere genes, perturb a diverse set of myocardial proteins to cause a DCM phenotype. Some of the genetic links to DCM are discussed in Hershberger, et al., *Nature Reviews* (2013) 10(9):531-47 and Rosenbaum et al., *Nat Rev Cardiol.* (2020) 17(5):286-97.

Contemporary medical therapy for HFrEF centers on counteracting the effects of neurohormonal activation with modulators of the renin-angiotensin-aldosterone system, (3-adrenergic blockers, diuretics, and modulators of the vasoactive peptide BNP (brain natriuretic peptide). Although these drugs attenuate some of the maladaptive consequences and improve clinical outcomes, none addresses the underlying causal pathways of myocardial dysfunction.

Several inotropic agents are used in clinical practice to augment cardiac contractility by increasing intracellular calcium or cyclic adenosine monophosphate, mechanisms that increase myocardial oxygen demand. Their use is limited to short-term or destination therapy in patients with refractory or end-stage heart failure for the purpose of symptom relief, as chronic studies with these drugs have demonstrated increased mortality due to arrhythmias and ischemia. However, these drugs do improve hemodynamics and symptoms, suggesting a potential clinical benefit for agents that increase contractility without arrhythmic or ischemic liabilities.

There are currently no approved therapies for treating heart failure by targeting the contractile apparatus directly.

There remains an urgent need for new safe, effective treatments for systolic heart failure.

Non-ischemic HFrEF is sometimes referred to as dilated cardiomyopathy (DCM). Despite the nomenclature, dilated (enlarged) heart chambers can be found in both non-ischemic and ischemic HFrEF patients. Dilated cardiomyopathy (DCM) comprises a group of myocardial disorders that lead to left ventricular dilatation and systolic dysfunction (abnormality of contraction). DCM can be subdivided into ischemic (attributed due to coronary artery disease) or non-ischemic (primary diseases of the myocardium). Hereafter, DCM refers to non-ischemic HFrEF. DCM can be assigned a clinical diagnosis of "idiopathic" DCM if no identifiable cause (except genetic) can be found. Idiopathic DCM can be further subcategorized based upon whether a genetic cause can be identified. Mutations in over 30 genes, including sarcomere genes, perturb a diverse set of myocardial proteins to cause a DCM phenotype. Some of the genetic links to DCM are discussed in Hershberger, et al., *Nature Reviews* (2013) 10(9):531-47. Epidemiologic data indicate that approximately 1 in 2,500 individuals in the general population have idiopathic DCM.

Sarcomere gene mutations that cause DCM are highly penetrant, but there is wide variability in clinical severity and clinical course. Some genotypes are associated with a more malignant course, but there is considerable variability between and even within families carrying the same mutation. While many patients with DCM report minimal or no symptoms for extended periods of time, DCM is a progressive disease with a significant cumulative burden of morbidity and mortality. The hallmark of DCM is a dilated left ventricle, more spherical in shape than usual, and with decreased systolic function. Patients usually present with symptoms of heart failure: dyspnea, orthopnea, exercise intolerance, fatigue, abdominal discomfort and poor appetite. Signs include sinus tachycardia, a gallop rhythm, murmur of mitral regurgitation, rales, jugular venous distension, hepatomegaly, peripheral edema and cool extremities can be found. As with many other disorders, symptoms tend to worsen with age. The patient journey is punctuated by hospitalizations for decompensated heart failure and an increased risk for sudden arrhythmic death and death from pump failure.

Diagnosis is dependent upon patient history and physical examination. Plasma biomarkers such as B-type natriuretic peptide (BNP) or its N-terminal pro-protein (NT-proBNP) can help with diagnosis and management of DCM, especially to distinguish heart failure from comorbid pulmonary disease. Coronary angiography can identify if heart failure is due to ischemic etiology. Endomyocardial biopsy can distinguish DCM from disease processes that might require alternative management strategy, such as myocarditis, storage disease, sarcoidosis or hemochromatosis.

Medical therapy remains the mainstay in patients with DCM and heart failure. Beta-blocker, ACE inhibitor or ARB, mineralocorticoid receptor blocker, and loop diuretics continue to be standard options for the treatment of heart failure symptoms and reduction of risk for cardiovascular death and heart failure hospitalization. Implantable cardioverter defibrillators (ICD) for patients with left ventricular ejection fraction of less than 30% can reduce sudden arrhythmic death. Additionally, cardiac resynchronization therapy (CRT) has been shown to improve heart failure-free survival in select patients. Despite these interventions, morbidity and mortality for heart failure remain high, and hospitalization for heart failure remains the most common reason for hospitalization in the elderly. The present disclosure provides therapeutic agents and methods to make such that remedy the unmet need for improved treatment of systolic dysfunction, DCM, HFrEF, and related cardiac disorders.

BRIEF SUMMARY OF THE INVENTION

In one aspect, the invention provides polymorphs of (R)-4-(1-((3-(difluoromethyl)-1-methyl-1H-pyrazol-4-yl) sulfonyl)-1-fluoroethyl)-N-(isoxazol-3-yl)piperidine-1-carboxamide (I-491). Four polymorphs including Forms A, B, C and D are detailed herein.

In another aspect, the invention provides compositions and pharmaceutical compositions containing a polymorph of I-491, or a pharmaceutically acceptable salt thereof as described herein, and a pharmaceutically acceptable excipient.

The disclosure also provides methods for treating systolic dysfunction. In another aspect, the invention provides methods of treating dilated cardiomyopathy. In certain aspects of the disclosure, the invention provides methods of treating HFrEF. These methods include administering to a subject in need thereof an effective amount of a compound or pharmaceutically acceptable salt thereof as described herein.

The details of certain aspects of the invention are set forth in the Detailed Description, as described below. Other features, objects, and advantages of the invention will be apparent from the Definitions, Examples, Figures, and Claims.

DETAILED DESCRIPTION

Figure 1A:
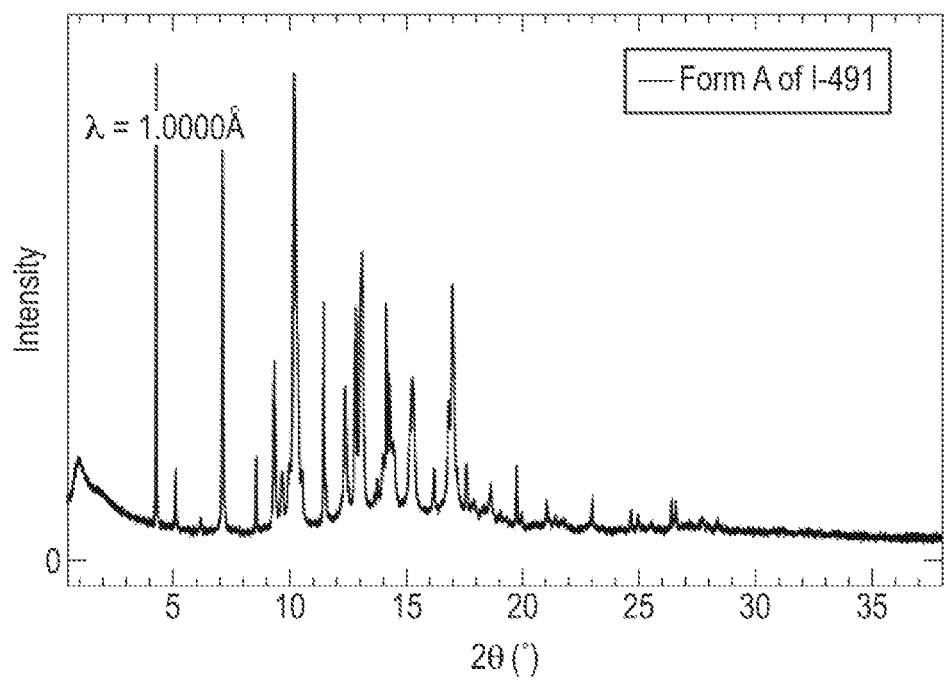
FIG. 1A shows a high resolution synchrotron X-ray powder diffraction pattern of Form A recorded at room temperature (ESRF, $\lambda$=1.000 Å).

A crystalline polymorph form of a particular drug is often an important determinant of the drug's ease of preparation, stability, solubility, storage stability, ease of formulation, and in vivo pharmacology. Polymorphic forms occur where the same composition of matter crystallizes in a different lattice arrangement resulting in different thermodynamic properties and thermodynamic stabilities specific to a particular polymorph form. In cases where two or more polymorph substances can be produced, it is desirable to prepare each of the polymorphs in pure form and determine the properties of each polymorph. Based on the desired features, properties, and stabilities, a preferred polymorph may be selected. In certain aspects, ease of preparation or stability may be deemed to be especially important, such that the most stable polymorph may be preferred in certain instances, while in other instances, the polymorph which is easiest to prepare (e.g., least dangerous, least expensive, highest yielding) may be considered to be preferred. In other situations, a different polymorph may be preferred for greater solubility and/or superior pharmacokinetics. Because improved drug formulations, with better bioavailability or better stability for example, are consistently sought, there is an ongoing need for new or purer polymorphic forms of existing drug molecules. The various crystalline polymorphs of I-491:

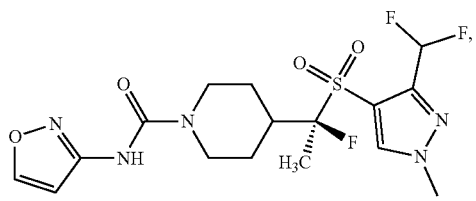

described herein, help meet these and other needs.

A series of polymorphs of (R)-4-(1-((3-(difluoromethyl)-1-methyl-1H-pyrazol-4-yl)sulfonyl)-1-fluoroethyl)-N-(isoxazol-3-yl)piperidine-1-carboxamide (I-491) and pharmaceutically acceptable salts thereof has been found to increase contractility by enhancing phosphate release from myosin without prolonging systole or shortening diastole. As such, the compounds can improve systolic function in patients with DCM or HFrEF, helping them to overcome the debilitating exertional dyspnea and fatigue that often accompanies the disease. The compounds can also be used to treat other cardiac disorders characterized by diminished cardiac output.

Form B was identified as the most stable polymorph (compared to Form A, Form C, and Form D) and as such, was selected as the lead polymorph for development. The more stable a polymorph is, the less likely it is to change to another form over time on the shelf, whether it be an active pharmaceutical ingredient alone or in a formulated drug product. Changes in polymorphic form upon storage or during processing can lead to changes in solubility, dissolution rate, or bioavailability; therefore, it is important to identify a stable polymorph to use as the drug candidate early in development.

Definitions

The term "about" as used herein is used to describe a range (e.g., of temperatures, of mass, of weight) and is given its ordinary meaning in the art, typically referring to the error associated with an instrument to collect a measurement or reading. In general, the term "about" when referring to temperature provides a deviation of ±0-2° C.

As used herein, the term "salt" refers to an acid or base salt of a compound of the invention. Pharmaceutically acceptable salts can be derived, for example, from mineral acids (hydrochloric acid, hydrobromic acid, phosphoric acid, and the like), organic acids (acetic acid, propionic acid, glutamic acid, citric acid and the like), and quaternary ammonium ions. It is understood that the pharmaceutically acceptable salts are non-toxic. Additional information on suitable pharmaceutically acceptable salts can be found in Remington's Pharmaceutical Sciences, 17th ed., Mack Publishing Company, Easton, Pa., 1985, which is incorporated herein by reference.

The neutral form of a compound may be regenerated by contacting the salt with a base or acid and isolating the parent compound in the conventional manner. The parent form of the compound differs from the various salt forms in certain physical properties, such as solubility in polar solvents.

The term "room temperature" refers to a temperature within the range of 19-26° C.

The term "solvate" refers to forms of the compound that are associated with a solvent, usually by a solvolysis reaction. This physical association may include hydrogen bonding. Conventional solvents include water, methanol, ethanol, acetic acid, dimethyl sulfoxide (DMSO), tetrahydrofuran (THF), diethyl ether, and the like. The compounds described herein may be prepared, e.g., in crystalline form, and may be solvated. Suitable solvates include pharmaceutically acceptable solvates and further include both stoichiometric solvates and non-stoichiometric solvates. In certain instances, the solvate will be capable of isolation, for example, when one or more solvent molecules are incorporated in the crystal lattice of a crystalline solid. "Solvate" encompasses both solution-phase and isolatable solvates. Representative solvates include hydrates, ethanolates, and methanolates. In certain aspects, a solvate is a distinct polymorph. In some aspects, a solvate is not a distinct polymorph, i.e., a defined polymorph with a distinct crystal structure may contain residual solvent molecules.

The term "amorphous" or "amorphous form" refers to a form of a solid ("solid form"), the form substantially lacking three-dimensional order. In certain embodiments, an amorphous form of a solid is a solid form that is substantially not crystalline. In certain embodiments, the X-ray powder diffraction (XRPD) pattern of an amorphous form includes a wide scattering band with a peak at 2θ of, e.g., between 20 and 70°, inclusive, using CuKα radiation. In certain embodiments, the XRPD pattern of an amorphous form further includes one or more peaks attributed to crystalline structures. In certain embodiments, the maximum intensity of any one of the one or more peaks attributed to crystalline structures observed at a 2θ of between 20 and 70°, inclusive, is not more than 300-fold, not more than 100-fold, not more than 30-fold, not more than 10-fold, or not more than 3-fold of the maximum intensity of the wide scattering band. In certain embodiments, the XRPD pattern of an amorphous form includes no peaks attributed to crystalline structures.

The term "polymorph" or "polymorphic form" refers to a crystalline form of a compound (or a salt, hydrate, or solvate thereof) in a particular crystal packing arrangement. All polymorphs have the same elemental composition. Different crystalline forms usually have different X-ray diffraction patterns, melting points, density, hardness, crystal shape, optical and electrical properties, stability, and solubility. Recrystallization solvent, rate of crystallization, storage temperature, and other factors may cause one crystal form to dominate. Various polymorphs of a compound can be prepared by crystallization under different conditions.

The term "crystalline" refers to a solid phase in which the material has a regular ordered internal structure at the molecular level and gives a distinctive X-ray diffraction pattern with defined peaks. Such materials when heated sufficiently will also exhibit the properties of a liquid, but the change from solid to liquid is characterized by a phase change, typically first order (melting point). The term "crystalline" or "crystalline form" refers to a solid form substantially exhibiting three-dimensional order. In certain embodiments, a crystalline form of a solid is a solid form that is substantially not amorphous. In certain embodiments, the X-ray powder diffraction (XRPD) pattern of a crystalline form includes one or more sharply defined peaks.

The compound of the present invention possesses an asymmetric carbon atom (optical center) and double bonds; the racemates, diastereomers, geometric isomers, regioisomers and individual isomers (e.g., separate enantiomers) are all intended to be encompassed within the scope of the present invention. The stereochemical depiction shown for the compound of the present invention is meant to refer the compound in which one of the isomers is present and substantially free of the other isomer. "Substantially free of" another isomer indicates at least a 70/30 ratio of the two isomers at the stereochemical center shown, more preferably 80/20, 90/10, or 95/5 or more. In some embodiments, one of the isomers will be present in an amount of at least 99%.

When a polymorphic form is described, it is meant to refer the identified polymorph as described herein, which is substantially free of any other polymorph. "Substantially free of" another polymorph indicates at least a 70/30 molar ratio of the two polymorphs, more preferably 80/20, 90/10, 95/5, 99/1 or more. In some embodiments, one of the polymorph will be present in an amount of at least 99%.

The compounds of the present invention may also contain unnatural proportions of atomic isotopes at one or more of the atoms that constitute such compounds. Unnatural proportions of an isotope may be defined as ranging from the amount found in nature to an amount consisting of 100% of the atom in question. For example, the compounds may incorporate radioactive isotopes, such as tritium ($^3$H), iodine-125 ($^{125}$I) or carbon-14 ($^{14}$C), or non-radioactive isotopes, such as deuterium ($^2$H) or carbon-13 ($^{13}$C). Such isotopic variations can provide additional utilities to those described elsewhere within this application. For instance, isotopic variants of the compounds of the invention may find additional utility, including but not limited to, as diagnostic and/or imaging reagents, or as cytotoxic/radiotoxic therapeutic agents. Additionally, isotopic variants of the compounds of the invention can have altered pharmacokinetic and pharmacodynamic characteristics, which can contribute to enhanced safety, tolerability or efficacy during treatment. All isotopic variations of the compounds of the present invention, whether radioactive or not, are intended to be encompassed within the scope of the present invention. When specifically referred to, such as, $C_1$-$C_4$ deuteroalkyl—the term refers to an alkyl group with the indicated number of carbon atoms and having hydrogen atoms replaced by deuterium in a number of from one to a per-deutero form, wherein the deuterium replacement is greater than the natural abundance of deuterium—typically 50%, 60%, 70%, 80%, 90%, 95% or more deuterium replacement. Examples of $C_1$-$C_4$ deuteroalkyl are —$CD_3$, —$CH_2CD_3$, —$CD_2CD_3$, —$CH_2CH_2CH_2D$, and the like.

As used herein, the term "pharmaceutically acceptable" refers to a substance that is compatible with a compound of the invention, as well as with any other ingredients with which the compound is formulated. Furthermore, a pharmaceutically acceptable substance is not deleterious to the recipient of the substance. The term "pharmaceutically acceptable salt" refers to those salts which are, within the scope of sound medical judgment, suitable for use in contact with the tissues of humans and lower animals without undue toxicity, irritation, allergic response, and the like, and are commensurate with a reasonable benefit/risk ratio. Pharmaceutically acceptable salts are well known in the art. For example, Berge et al., describe pharmaceutically acceptable salts in detail in J. Pharmaceutical Sciences, 1977, 66, 1-19, incorporated herein by reference.

Pharmaceutically acceptable salts of the compounds described herein include those derived from suitable inorganic and organic acids and bases. Examples of pharmaceutically acceptable, nontoxic acid addition salts are salts of an amino group formed with inorganic acids such as hydrochloric acid, hydrobromic acid, phosphoric acid, sulfuric acid, and perchloric acid or with organic acids such as acetic acid, oxalic acid, maleic acid, tartaric acid, citric acid, succinic acid, or malonic acid or by using other methods known in the art such as ion exchange. Other pharmaceutically acceptable salts include adipate, alginate, ascorbate, aspartate, benzenesulfonate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. Salts derived from appropriate bases include alkali metal, alkaline earth metal, ammonium and $N^+(C_{1-4}$ alkyl$)_4^-$ salts. Representative alkali or alkaline earth metal salts include sodium, lithium, potassium, calcium, magnesium, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate, and aryl sulfonate.

As used herein, the term "pharmaceutical composition" refers to a product comprising a compound of the invention, an excipient as defined herein, and other optional ingredients in specified amounts, as well as any product which results directly or indirectly from combination of the specified ingredients in the specified amounts.

As used herein, the term "excipient" refers to a substance that aids the administration of an active agent to a subject. Pharmaceutical excipients useful in the present invention include, but are not limited to, binders, fillers, disintegrants, lubricants, coatings, sweeteners, flavors and colors. One of skill in the art will recognize that other excipients can be useful in the present invention.

In some embodiments, treatment may be administered after one or more signs or symptoms of the disease have developed or have been observed. As used herein, the terms "treat," "treating" and "treatment" refer to any indicia of success in the treatment or amelioration of a pathology, injury, condition, or symptom related to systolic dysfunction, DCM, HFrEF, or other cardiac disorders, including any objective or subjective parameter such as abatement; remission; diminishing of symptoms; making the pathology, injury, condition, or symptom more tolerable to the patient; decreasing the frequency or duration of the pathology, injury, condition, or symptom; or, in some situations, preventing the onset of the pathology, injury, condition, or symptom. Treatment or amelioration can be based on any objective or subjective parameter; including, e.g., the result of a physical examination.

A "subject" to which administration is contemplated refers to a human (i.e., male or female of any age group, e.g., pediatric subject (e.g., infant, child, or adolescent) or adult subject (e.g., young adult, middle-aged adult, or senior adult)) or non-human animal. A "patient" refers to a human subject in need of treatment of a disease.

The terms "administer," "administering," or "administration" refers to implanting, absorbing, ingesting, injecting, inhaling, or otherwise introducing a polymorphic form of I-491 described herein, or a composition thereof, in or on a subject.

The terms "condition," "disease," and "disorder" are used interchangeably.

An "effective amount" of a polymorphic form described herein refers to an amount sufficient to elicit the desired biological response, i.e., treating the condition. As will be appreciated by those of ordinary skill in this art, the effective amount of a polymorphic form of I-491 described herein may vary depending on such factors as the desired biological endpoint, the pharmacokinetics of the polymorphic form, the condition being treated, the mode of administration, and the age and health of the subject. In certain embodiments, an effective amount is a therapeutically effective amount. In certain embodiments, an effective amount is the amount of a polymorphic form of I-491 described herein in a single dose. In certain embodiments, an effective amount is the combined amounts of a polymorphic form of I-491 described herein in multiple doses.

A "therapeutically effective amount" of a polymorphic form of I-491 described herein is an amount sufficient to provide a therapeutic benefit in the treatment of a condition or to delay or minimize one or more symptoms associated with the condition. A therapeutically effective amount of a polymorphic form means an amount of therapeutic agent, alone or in combination with other therapies, which provides a therapeutic benefit in the treatment of the condition. The term "therapeutically effective amount" can encompass an amount that improves overall therapy, reduces or avoids symptoms, signs, or causes of the condition, and/or enhances the therapeutic efficacy of another therapeutic agent.

Compounds

In one aspect, provided herein are polymorphs of I-491:

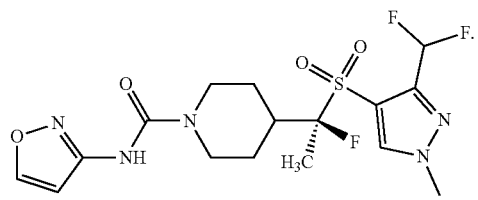 [SMILES: Cn1cc(S(=O)(=O)[C@@](C)(F)C2CCN(C(=O)Nc3ccon3)CC2)c(C(F)F)n1]

(I-491)

Polymorphic forms of I-491 including Form A, Form B, Form C, Form D are detailed herein.

The polymorphs of I-491 can be prepared by methods as generally outlined in the Examples. One skilled in the art will appreciate that the compounds and polymorphs thereof of the invention can be prepared using other synthetic methods as substitutes for transformations provided in the Examples.

Form A

In certain aspects, the present disclosure provides a polymorph of I-491 characterized as Form A. In general, Form A has a X-ray powder diffraction pattern obtained by irradiation with Cu-Kα having at least 3 peaks expressed in degrees 2-theta±0.2° selected from 10.98, 15.78, 16.08, 20.44, 23.78, and 26.58 degrees. In some aspects, Form A is characterized by at least one of: (a) a X-ray powder diffraction pattern obtained by irradiation with Cu-Kα having two or more peaks expressed in degrees 2-theta±0.2° and selected from 6.62, 10.98, 13.26, 14.48, 15.02, 15.48, 15.78, 16.08, 16.32, 17.72, 19.26, 19.86, 19.94, 20.44, 21.68, 21.90, 22.04, 22.60, 23.78, 26.16, 26.36, 26.58, 27.24, and 28.04 degrees; or (b) a DSC thermogram showing an endotherm at about 181-200° C.

In certain aspects, Form A is characterized by a X-ray powder diffraction pattern obtained by irradiation with Cu-Kα having each of the peaks expressed in degrees 2-theta±0.2° and selected from 6.62, 10.98, 13.26, 14.48, 15.02, 15.48, 15.78, 16.08, 16.32, 17.72, 19.26, 19.86, 19.94, 20.44, 21.68, 21.90, 22.04, 22.60, 23.78, 26.16, 26.36, 26.58, 27.24, and 28.04 degrees. In some aspects, Form A is characterized by 4 or more peaks, 8 or more peaks, 16 or more peaks, or 20 or more peaks expressed in degrees 2-theta±0.2° and selected from 6.62, 10.98, 13.26, 14.48, 15.02, 15.48, 15.78, 16.08, 16.32, 17.72, 19.26, 19.86, 19.94, 20.44, 21.68, 21.90, 22.04, 22.60, 23.78, 26.16, 26.36, 26.58, 27.24, and 28.04 degrees.

In certain aspects, Form A is characterized by a X-ray powder diffraction pattern obtained by irradiation with Cu-Kα having peaks expressed in degrees 2-theta±0.2° at each of 10.98, 15.78, 16.08, 20.44, 23.78, and 26.58 degrees. In some aspects, Form A is characterized by 4 or more peaks, or 2 or more peaks expressed in degrees 2-theta±0.2° at each of 10.98, 15.78, 16.08, 20.44, 23.78, and 26.58 degrees. In some aspects, Form A is characterized by a X-ray powder diffraction pattern obtained by irradiation with Cu-Kα having peaks expressed in degrees 2-theta±0.2° at each of 10.98, 15.78, 20.44, and 26.58 degrees.

In some aspects, Form A is characterized by a X-ray powder diffraction pattern obtained by irradiation with Cu-Kα having peaks expressed in degrees 2-theta±0.2° at each of 6.62, 10.98, 16.08, 23.78, and 26.58 degrees. In certain aspects, Form A is characterized by 2 or more, or 4 or more peaks expressed in degrees 2-theta±0.2° selected from 6.62, 10.98, 16.08, 23.78, and 26.58 degrees.

In certain aspects, Form A is characterized by a X-ray powder diffraction pattern obtained by irradiation with Cu-Kα having peaks expressed in degrees 2-theta±0.2° at each of 15.78, 16.08, and 23.78 degrees. In some aspects, Form A is characterized by 2 or more peaks expressed in degrees 2-theta±0.2° selected from 15.78, 16.08, and 23.78 degrees.

In some aspects, Form A is characterized by a X-ray powder diffraction pattern obtained by irradiation with Cu-Kα having peaks expressed in degrees 2-theta±0.2° at each of 6.62, 15.78, 16.08, and 26.58 degrees. In some aspects, Form A is characterized by 2 or more peaks expressed in degrees 2-theta±0.2° selected from 6.62, 15.78, 16.08, and 26.58 degrees.

In certain aspects, Form A is characterized by a X-ray powder diffraction pattern obtained by irradiation with Cu-Kα having peaks expressed in degrees 2-theta±0.2° at each of 6.62, 17.72, 23.78, and 26.58 degrees. In some aspects, Form A is characterized by 2 or more peaks expressed in degrees 2-theta±0.2° selected from 6.62, 17.72, 23.78, and 26.58 degrees.

Figure 1B:
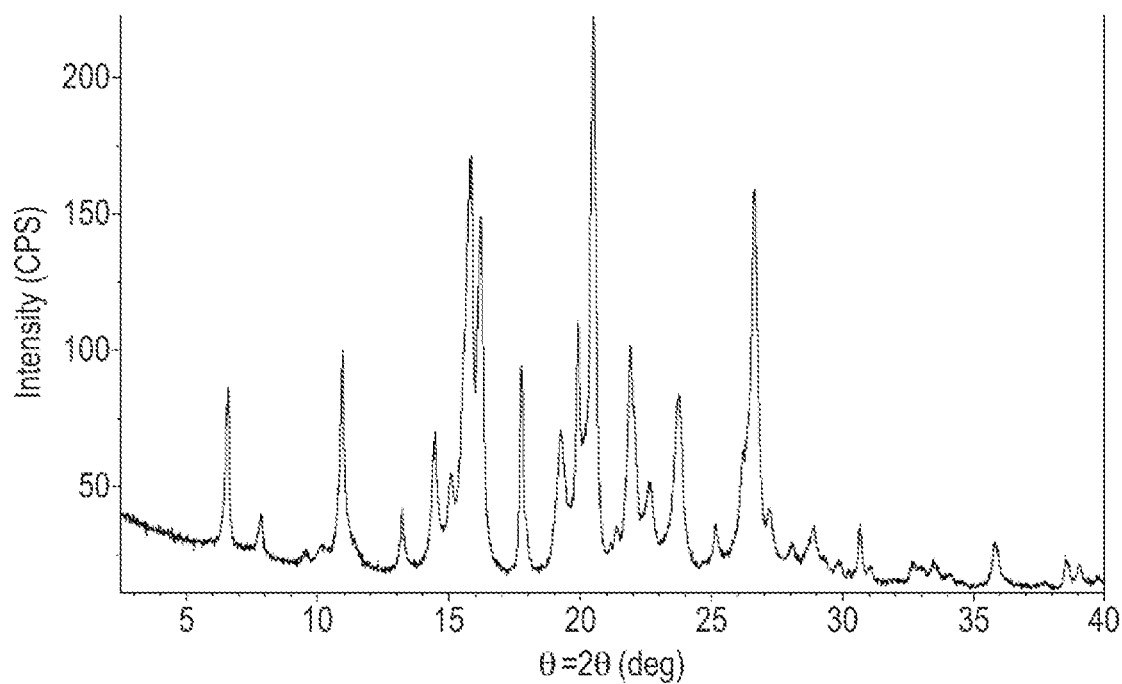
FIG. 1B shows a X-ray powder diffraction pattern of Form A recorded at room temperature.
Figure 5:
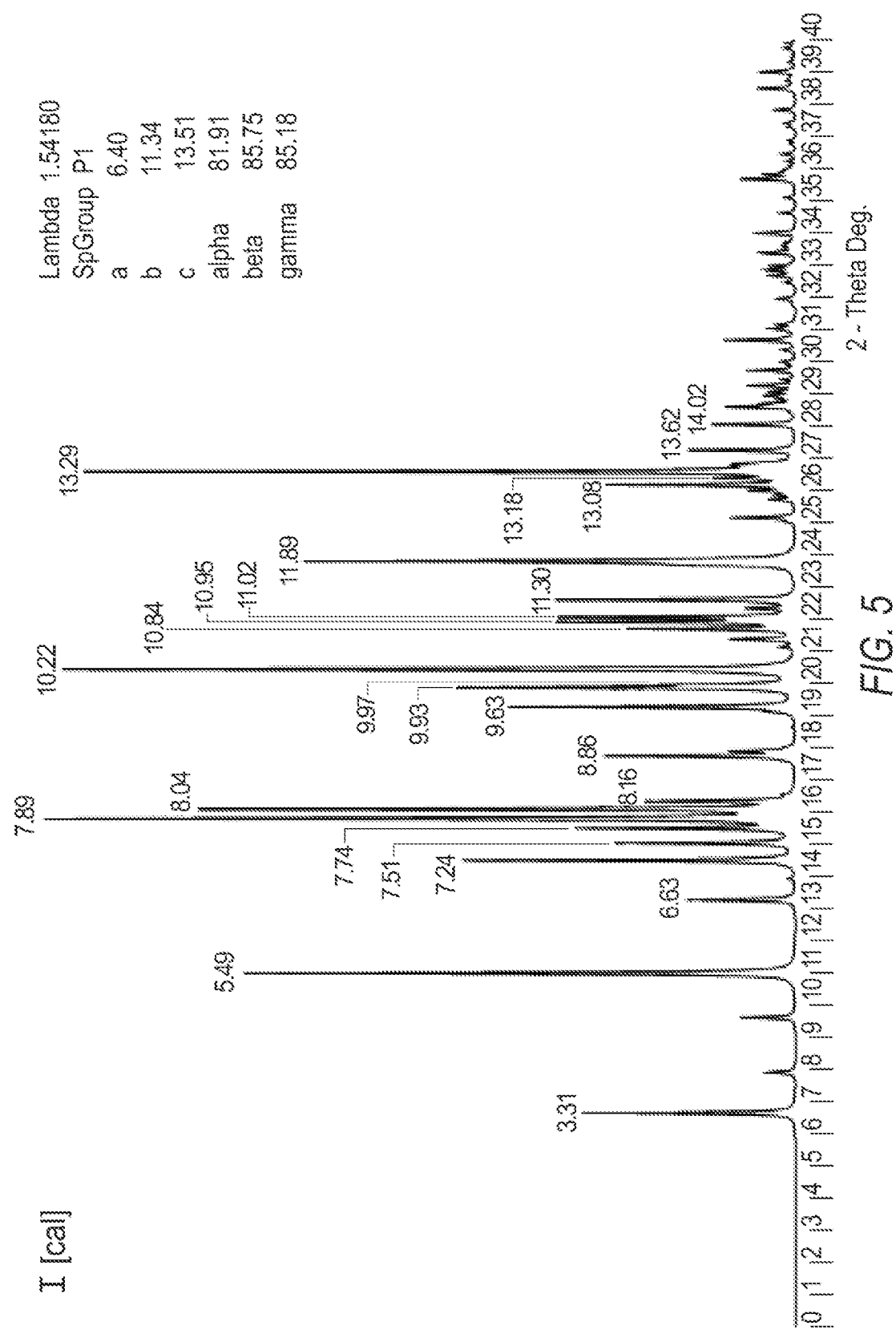
FIG. 5 shows a simulated powder diffraction pattern from the crystal structure of Form A at copper wavelength.

In certain aspects, Form A is characterized by a X-ray powder diffraction pattern essentially the same as shown in FIG. 1A. In certain aspects, Form A is characterized by a X-ray powder diffraction pattern essentially the same as shown in FIG. 1B. In certain aspects, Form A is characterized by a X-ray powder diffraction pattern essentially the same as shown in FIG. 5.

In certain aspects, Form A is further characterized by a X-ray powder diffraction pattern obtained by irradiation with Cu-Kα lacking peaks expressed in degrees 2-theta±0.05° at each of 0 to 6.00, 8.00 to 8.90, 11.40 to 12.60, 16.80 to 17.20, and 24.40 to 24.80. In some aspects, there are no peaks expressed in degrees 2-theta±0.05° at each of 0 to 6.00, 8.00 to 8.90, 11.40 to 12.60, 16.80 to 17.20, and 24.40 to 24.80 degrees. In certain aspects, there are no peaks expressed in degrees 2-theta±0.05° in at least 2 of the ranges consisting of 0 to 6.00, 8.00 to 8.90, 11.40 to 12.60, 16.80 to 17.20, and 24.40 to 24.80. In certain aspects, there are no peaks expressed in degrees 2-theta±0.05° in at least 4 of the ranges consisting of 0 to 6.00, 8.00 to 8.90, 11.40 to 12.60, 16.80 to 17.20, and 24.40 to 24.80. In some aspects, there are only weak intensity peaks expressed in degrees 2-theta±0.05° at each of 0 to 6.00, 8.00 to 8.90, 11.40 to 12.60, 16.80 to 17.20, and 24.40 to 24.80 degrees. In certain aspects, there are only weak intensity peaks expressed in degrees 2-theta±0.05° in at least 2 of the ranges consisting of 0 to 6.00, 8.00 to 8.90, 11.40 to 12.60, 16.80 to 17.20, and 24.40 to 24.80. In certain aspects, there are only weak intensity peaks expressed in degrees 2-theta±0.05° in at least 4 of the ranges consisting of 0 to 6.00, 8.00 to 8.90, 11.40 to 12.60, 16.80 to 17.20, and 24.40 to 24.80.

In some aspects, there are only peaks that are equal than or less than 1/10 the height of the most intense peak (within the same diffraction pattern) expressed in degrees 2-theta±0.05° at each of 0 to 6.00, 8.00 to 8.90, 11.40 to 12.60, 16.80 to 17.20, and 24.40 to 24.80 degrees. In certain aspects, there are only peaks that are equal than or less than 1/10 the height of the most intense peak (within the same diffraction pattern) expressed in degrees 2-theta±0.05° in at least 2 of the ranges consisting of 0 to 6.00, 8.00 to 8.90, 11.40 to 12.60, 16.80 to 17.20, and 24.40 to 24.80. In certain aspects, there are only peaks that are equal than or less than 1/10 the height of the most intense peak (within the same diffraction pattern) expressed in degrees 2-theta±0.05° in at least 4 of the ranges consisting of 0 to 6.00, 8.00 to 8.90, 11.40 to 12.60, 16.80 to 17.20, and 24.40 to 24.80. In some aspects, there are only peaks that are equal than or less than 1/20 the height of the most intense peak (within the same diffraction pattern) expressed in degrees 2-theta±0.05° at each of 0 to 6.00, 8.00 to 8.90, 11.40 to 12.60, 16.80 to 17.20, and 24.40 to 24.80 degrees. In certain aspects, there are only peaks that are equal than or less than 1/20 the height of the most intense peak (within the same diffraction pattern) expressed in degrees 2-theta±0.05° in at least 2 of the ranges consisting of 0 to 6.00, 8.00 to 8.90, 11.40 to 12.60, 16.80 to 17.20, and 24.40 to 24.80. In certain aspects, there are only peaks that are equal than or less than 1/20 the height of the most intense peak (within the same diffraction pattern) expressed in degrees 2-theta±0.05° in at least 4 of the ranges consisting of 0 to 6.00, 8.00 to 8.90, 11.40 to 12.60, 16.80 to 17.20, and 24.40 to 24.80.

In some aspects, Form A is further characterized by a X-ray powder diffraction pattern obtained by irradiation with Cu-Kα lacking peaks expressed in degrees 2-theta±0.05° at 24.40 to 24.80 degree. In certain aspects, there are no peaks expressed in degrees 2-theta±0.05° at 24.40 to 24.80 degrees. In certain aspects, there are only weak intensity peaks expressed in degrees 2-theta±0.05° at 24.40 to 24.80 degrees. In certain aspects, there are only peaks that are equal than or less than 1/10 the height of the most intense peak (within the same diffraction pattern) expressed in degrees 2-theta±0.05° at 24.40 to 24.80 degrees. In certain aspects, there are only peaks that are equal than or less than 1/20 the height of the most intense peak (within the same diffraction pattern) expressed in degrees 2-theta±0.05° at 24.40 to 24.80 degrees.

In certain aspects, Form A is further characterized by a X-ray powder diffraction pattern obtained by irradiation with Cu-Kα lacking peaks expressed in degrees 2-theta±0.05° at each of 0 to 6.00, 11.40 to 12.60, and 24.40 to 24.80 degrees. In some aspects, there are no peaks at 0 to 6.00, 11.40 to 12.60, and 24.40 to 24.80 degrees. In certain aspects, there are no peaks expressed in degrees 2-theta±0.05° in at least two of the ranges selected from 0 to 6.00, 11.40 to 12.60, and 24.40 to 24.80 degrees. In some aspects, there are only weak intensity peaks expressed in degrees 2-theta±0.05° at 0 to 6.00, 11.40 to 12.60, and 24.40 to 24.80 degrees. In certain aspects, there are only weak intensity peaks expressed in degrees 2-theta±0.05° in at least two of the ranges selected from 0 to 6.00, 11.40 to 12.60, and 24.40 to 24.80 degrees. In some aspects, there are only peaks that are equal than or less than 1/20 the height of the most intense peak (within the same diffraction pattern) expressed in degrees 2-theta±0.05° at 0 to 6.00, 11.40 to 12.60, and 24.40 to 24.80 degrees. In certain aspects, there are only peaks that are equal than or less than 1/20 the height of the most intense peak (within the same diffraction pattern) expressed in degrees 2-theta±0.05° in at least two of the ranges selected from 0 to 6.00, 11.40 to 12.60, and 24.40 to 24.80 degrees. In some aspects, there are only peaks that are equal than or less than 1/10 the height of the most intense peak (within the same diffraction pattern) expressed in degrees 2-theta±0.05° at 0 to 6.00, 11.40 to 12.60, and 24.40 to 24.80 degrees. In certain aspects, there are only peaks that are equal than or less than 1/10 the height of the most intense peak (within the same diffraction pattern) expressed in degrees 2-theta±0.05° in at least two of the ranges selected from 0 to 6.00, 11.40 to 12.60, and 24.40 to 24.80 degrees.

In some aspects, Form A is further characterized by a X-ray powder diffraction pattern obtained by irradiation with Cu-Kα lacking peaks expressed in degrees 2-theta±0.05° at 11.40 to 12.60 degrees. In certain aspects, there are no peaks expressed in degrees 2-theta±0.05° at 11.40 to 12.60 degrees. In certain aspects, there are only weak intensity peaks expressed in degrees 2-theta±0.05° at 11.40 to 12.60 degrees. In certain aspects, there are only peaks that are equal than or less than 1/20 the height of the most intense peak (within the same diffraction pattern) expressed in degrees 2-theta±0.05° at 11.40 to 12.60 degrees. In certain aspects, there are only peaks that are equal than or less than 1/10 the height of the most intense peak (within the same diffraction pattern) expressed in degrees 2-theta±0.05° at 11.40 to 12.60 degrees.

Figure 2:
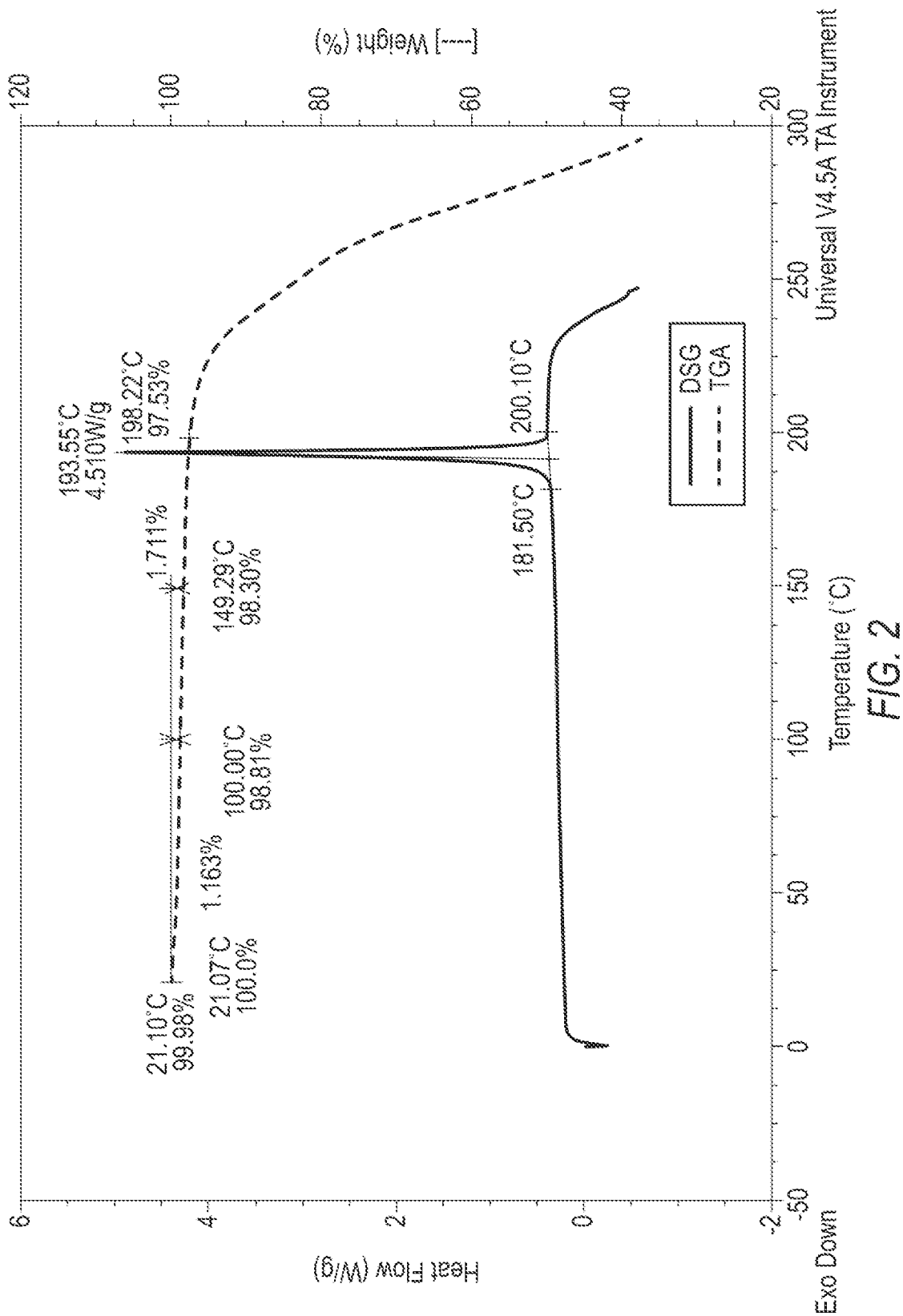
FIG. 2 shows a DSC thermogram and a TGA thermogram of Form A.

In some aspects, Form A is characterized by a DSC thermogram essentially the same as shown in FIG. 2. In some aspects, Form A is characterized by a DSC thermogram showing an endotherm at about 181-200° C. In certain aspects, Form A is characterized by a melt onset of about 181° C. In some aspects, Form A is characterized by a melting point of 191° C.±2° C.

Figure 3:
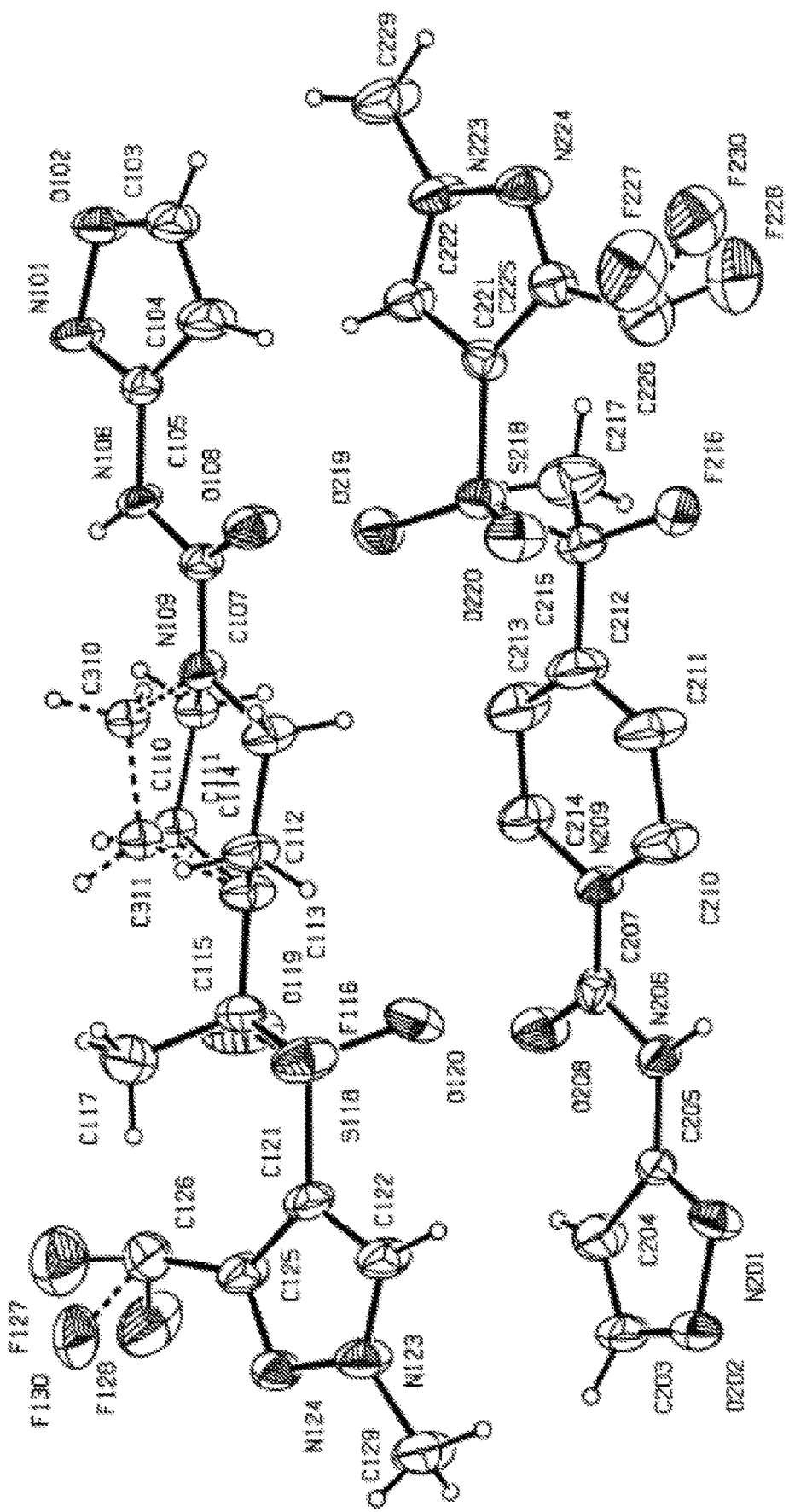
FIG. 3 shows an Ortep representation of the molecular structure of Form A with atoms labels and thermal ellipsoids at 30% probability and disordered regions indicated with dotted lines.

In certain aspects, Form A is characterized by the structure as appearing in FIG. 3. In certain aspects, Form A is characterized by the structure as appearing in FIG. 4. In some aspects, Form A has a triclinic crystal system and a space group of P1. In certain aspects, Form A has unit cell dimensions of a=6.403 Å, b=11.343 Å, c=13.507 Å, α=81.91°, β=85.73°, and γ=85.18°.

In certain aspects of the disclosure, Form A is substantially free of other forms of tert-butyl-(R)-4-(1-((3-(difluoromethyl)-1-methyl-1H-pyrazol-4-yl)sulfonyl)-1-fluoroethyl)piperidine-1-carboxylate. Particularly, Form A is substantially free of Form D of tert-butyl-(R)-4-(1-((3-(difluoromethyl)-1-methyl-1H-pyrazol-4-yl)sulfonyl)-1-fluoroethyl)piperidine-1-carboxylate. In some aspects, Form A is substantially free of amorphous tert-butyl-(R)-4-(1-((3-(difluoromethyl)-1-methyl-1H-pyrazol-4-yl)sulfonyl)-1-fluoroethyl)piperidine-1-carboxylate.

In another aspect, provided herein is a composition comprising Form A. In some aspects, the composition comprises greater than or equal to 75% by weight Form A. In some aspects, the composition comprises greater than or equal to 85% by weight Form A. In some aspects, the composition comprises greater than or equal to 90% by weight Form A. In some aspects, the composition comprises greater than or equal to 95% by weight Form A. In some aspects, the composition comprises greater than or equal to 98% by weight Form A. In some aspects, the composition comprises greater than or equal to 99% by weight Form A. In some aspects, the composition comprises greater than or equal to 99.5% by weight Form A. In some aspects, the composition comprises greater than or equal to 99.9% by weight Form A. In another aspect, provided herein is a composition, wherein the molar ratio of the amount of the Form A to the sum of the amounts of other polymorphic forms is equal to or greater than 80:20. In another aspect, the molar ratio of the amount of the Form A to the sum of the amounts of other forms is equal to or greater than 90:10. In another aspect, the molar ratio of the amount of the Form A to the sum of the amounts of other forms is equal to or greater than 95:5. In another aspect, the molar ratio of the amount of the Form A to the sum of the amounts of other forms is equal to or greater than 97:3. In another aspect, the molar ratio of the amount of the Form A to the sum of the amounts of other forms is equal to or greater than 98:2. In another aspect, the molar ratio of the amount of the Form A to the sum of the amounts of other forms is equal to or greater than 99:1. In another aspect, the molar ratio of the amount of the Form A to the sum of the amounts of other forms is equal to or greater than 99.5:0.5.

In another aspect, provided herein is a composition, wherein the molar ratio of the amount of the Form A to polymorphic Form D is equal to or greater than 80:20. In another aspect, the molar ratio of the amount of the Form A to Form D is equal to or greater than 90:10. In another aspect, the molar ratio of the amount of the Form A to Form D is equal to or greater than 95:5. In another aspect, the molar ratio of the amount of the Form A to Form D is equal to or greater than 97:3. In another aspect, the molar ratio of the amount of the Form A to Form D is equal to or greater than 98:2. In another aspect, the molar ratio of the amount of the Form A to Form D is equal to or greater than 99:1. In another aspect, the molar ratio of the amount of the Form A to Form D is equal to or greater than 99.5:0.5.

Also provided herein is a composition comprising Form A that is essentially solvent free. In some aspects, Form A is a solvate. In certain aspects, the composition has less than 6 wt. % of solvent. In some aspects, the composition has less than 3 wt. % of solvent. In certain aspects, the composition has less than 2 wt. % of solvent. In some aspects, the composition has less than 0.5 wt. % of solvent. In certain aspects, the solvent is methanol. In some aspects, the solvent is ethanol. In certain aspects the solvent is acetone. In other aspects, the solvent is acetonitrile.

Form B

In certain aspects, the present disclosure provides a polymorph of I-491 characterized as Form B. In general, Form B has a X-ray powder diffraction pattern obtained by irradiation with Cu-Kα having at least 3 peaks expressed in degrees 2-theta±0.2° selected from 15.42, 16.28, 19.02, 20.70, and 26.88 degrees. In some aspects, Form B is characterized by at least one of: (a) a X-ray powder diffraction pattern obtained by irradiation with Cu-Kα having two or more peaks expressed in degrees 2-theta±0.2° and selected from 7.32, 7.88, 10.20, 10.88, 13.40, 14.68, 15.24, 15.42, 16.28, 17.70, 18.48, 19.02, 20.18, 20.70, 21.56, 21.98, 22.94, 23.16, 23.86, 24.24, 24.78, 25.38, 26.40, 26.88, and 28.74 degrees; or (b) a DSC thermogram showing an endotherm at about 170-185° C.

In certain aspects, Form B is characterized by a X-ray powder diffraction pattern obtained by irradiation with Cu-Kα having each of the peaks expressed in degrees 2-theta±0.2° and selected from 7.32, 7.88, 10.20, 10.88, 13.40, 14.68, 15.24, 15.42, 16.28, 17.70, 18.48, 19.02, 20.18, 20.70, 21.56, 21.98, 22.94, 23.16, 23.86, 24.24, 24.78, 25.38, 26.40, 26.88, and 28.74 degrees. In some aspects, Form B is characterized by 4 or more peaks, 8 or more peaks, 16 or more peaks, or 20 or more peaks expressed in degrees 2-theta±0.2° and selected from 7.32, 7.88, 10.20, 10.88, 13.40, 14.68, 15.24, 15.42, 16.28, 17.70, 18.48, 19.02, 20.18, 20.70, 21.56, 21.98, 22.94, 23.16, 23.86, 24.24, 24.78, 25.38, 26.40, 26.88, and 28.74 degrees.

In certain aspects, Form B is characterized by a X-ray powder diffraction pattern obtained by irradiation with Cu-Kα having peaks expressed in degrees 2-theta±0.2° at each of 7.88, 10.20, 20.70, and 26.88 degrees. In some aspects, Form B is characterized by 3 peaks or 2 peaks expressed in degrees 2-theta±0.2° at each of 7.88, 10.20, 20.70, and 26.88 degrees.

In some aspects, Form B is characterized by a X-ray powder diffraction pattern obtained by irradiation with Cu-Kα having peaks expressed in degrees 2-theta±0.2° at each of 7.32, 7.88, 10.20, and 18.48 degrees. In certain aspects, Form B is characterized by 2 or more, or 3 or more peaks selected from 7.32, 7.88, 10.20, and 18.48 degrees.

In certain aspects, Form B is characterized by a X-ray powder diffraction pattern obtained by irradiation with Cu-Kα having peaks expressed in degrees 2-theta±0.2° at each of 7.32, 16.28, and 26.88 degrees. In some aspects, Form B is characterized by 2 or more peaks expressed in degrees 2-theta±0.2° selected from 7.32, 16.28, and 26.88 degrees.

In some aspects, Form B is characterized by a X-ray powder diffraction pattern obtained by irradiation with Cu-Kα having peaks expressed in degrees 2-theta±0.2° at each of 7.88, 15.42, 17.70, and 21.56 degrees. In some aspects, Form B is characterized by 2 or more peaks expressed in degrees 2-theta±0.2° selected from 7.88, 15.42, 17.70, and 21.56 degrees.

Figure 6A:
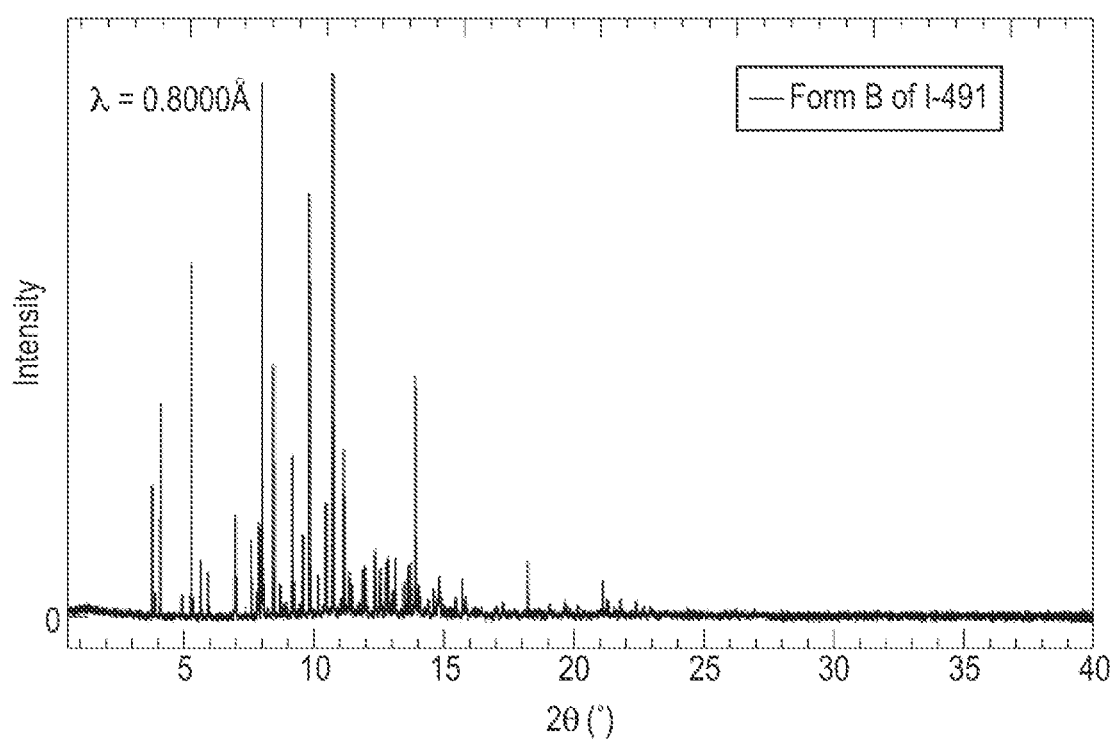
FIG. 6A shows a high resolution synchrotron X-ray powder diffraction pattern of Form B recorded at room temperature (ESRF, $\lambda$=0.800 Å).
Figure 6B:
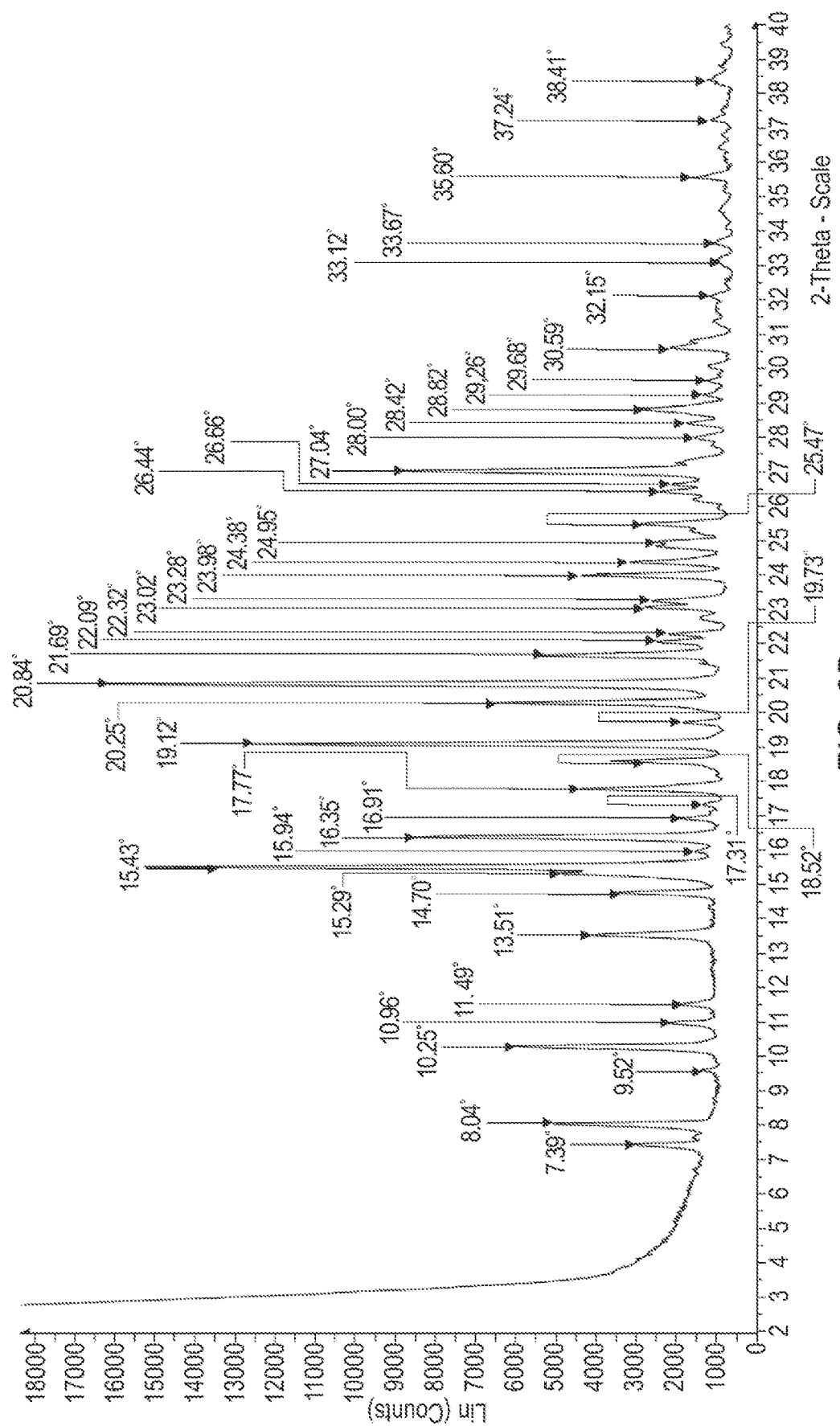
FIG. 6B shows a X-ray powder diffraction pattern of Form B recorded at room temperature.
Figure 10:
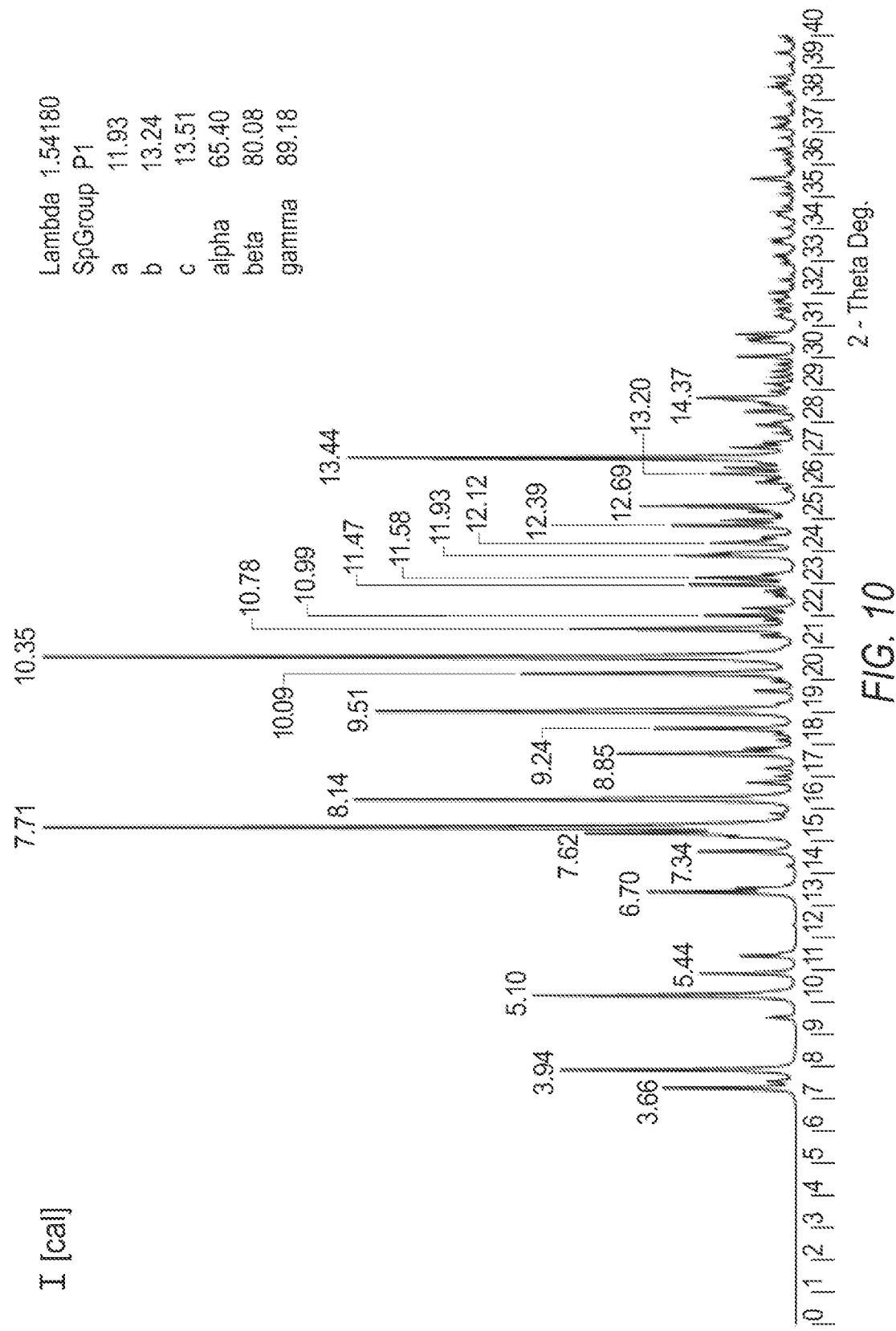
FIG. 10 shows a simulated powder diffraction pattern from the crystal structure of Form B at copper wavelength. Only one theoretical reflection is present in the 9° to 10° angular region, whereas 3 are effectively present in the 7° to 8° angular region.

In certain aspects, Form B is characterized by a X-ray powder diffraction pattern essentially the same as shown in FIG. 6A. In certain aspects, Form B is characterized by a X-ray powder diffraction pattern essentially the same as shown in FIG. 6B. In certain aspects, Form B is characterized by a X-ray powder diffraction pattern essentially the same as shown in FIG. 10.

In certain aspects, Form B is further characterized by a X-ray powder diffraction pattern obtained by irradiation with Cu-Kα lacking peaks expressed in degrees 2-theta±0.05° at each of 0 to 6.80 and 8.15 to 9.00 degrees. In some aspects, there are no peaks expressed in degrees 2-theta±0.05° at each of 0 to 6.80 and 8.15 to 9.00 degrees. In certain aspects, there are no peaks expressed in degrees 2-theta±0.05° in at least 1 of the ranges consisting of 0 to 6.80 and 8.15 to 9.00 degrees. In some aspects, there are only weak intensity peaks expressed in degrees 2-theta±0.05° at each of 0 to 6.80 and 8.15 to 9.00 degrees. In certain aspects, there are only weak intensity peaks expressed in degrees 2-theta±0.05° in at least 1 of the ranges consisting of 0 to 6.80 and 8.15 to 9.00. In some aspects, there are only peaks that are equal than or less than 1/20 the height of the most intense peak (within the same diffraction pattern) expressed in degrees 2-theta±0.05° at each of 0 to 6.80 and 8.15 to 9.00 degrees. In certain aspects, there are only peaks that are equal than or less than 1/20 the height of the most intense peak (within the same diffraction pattern) expressed in degrees 2-theta±0.05° at least 1 of the ranges consisting of 0 to 6.80 and 8.15 to 9.00 degrees. In some aspects, there are only peaks that are equal than or less than 1/10 the height of the most intense peak (within the same diffraction pattern) expressed in degrees 2-theta±0.05° at each of 0 to 6.80 and 8.15 to 9.00 degrees. In certain aspects, there are only peaks that are equal than or less than 1/10 the height of the most intense peak (within the same diffraction pattern) expressed in degrees 2-theta±0.05° at least 1 of the ranges consisting of 0 to 6.80 and 8.15 to 9.00.

In some aspects, Form B is further characterized by a X-ray powder diffraction pattern obtained by irradiation with Cu-Kα lacking peaks expressed in degrees 2-theta±0.05° at 0 to 6.80 degree. In certain aspects, there are no peaks expressed in degrees 2-theta±0.05° at 0 to 6.80 degrees. In certain aspects, there are only weak intensity peaks expressed in degrees 2-theta±0.05° at 0 to 6.80 degrees. In certain aspects, there are only peaks that are equal than or less than 1/20 the height of the most intense peak (within the same diffraction pattern) expressed in degrees 2-theta±0.05° at 0 to 6.80 degrees. In certain aspects, there are only peaks that are equal than or less than 1/10 the height of the most intense peak (within the same diffraction pattern) expressed in degrees 2-theta±0.05° at 0 to 6.80 degrees.

In certain aspects, Form B is further characterized by a X-ray powder diffraction pattern obtained by irradiation with Cu-Kα lacking peaks expressed in degrees 2-theta±0.05° at each of 8.15 to 9.00 degrees. In some aspects, there are no peaks expressed in degrees 2-theta±0.05° at 8.15 to 9.00 degrees. In some aspects, there are only weak intensity peaks expressed in degrees 2-theta±0.05° at 8.15 to 9.00 degrees. In some aspects, there are only peaks that are equal than or less than 1/20 the height of the most intense peak (within the same diffraction pattern) expressed in degrees 2-theta±0.05° at 8.15 to 9.00 degrees. In some aspects, there are only peaks that are equal than or less than 1/10 the height of the most intense peak (within the same diffraction pattern) expressed in degrees 2-theta±0.05° at 8.15 to 9.00 degrees.

Figure 7:
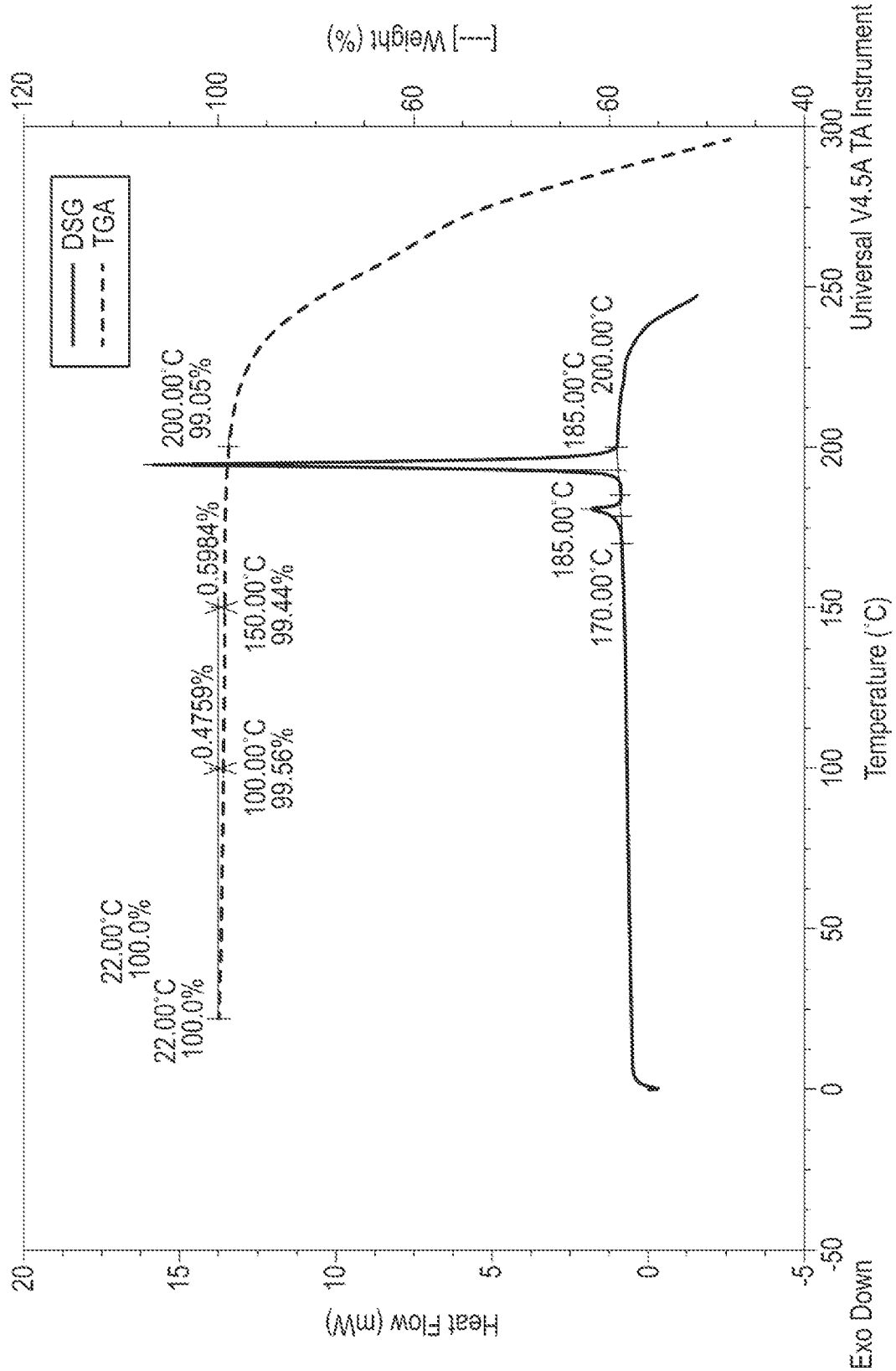
FIG. 7 shows a DSC thermogram and a TGA thermogram of Form B.

In some aspects, Form B has is characterized by a DSC thermogram essentially the same as shown in FIG. 7. In some aspects, Form B is characterized by a DSC thermogram showing an endotherm at about 170-185° C. In certain aspects, Form B is characterized by a melt onset of about 170° C. In some aspects, Form B is characterized by a melting point of 178° C.±2° C. In some aspects, Form B is characterized by a DSC thermogram showing a second endotherm at about 185-200° C. In some aspects, Form B is characterized by a second melting point of 192.7° C.±2° C.

Figure 8:
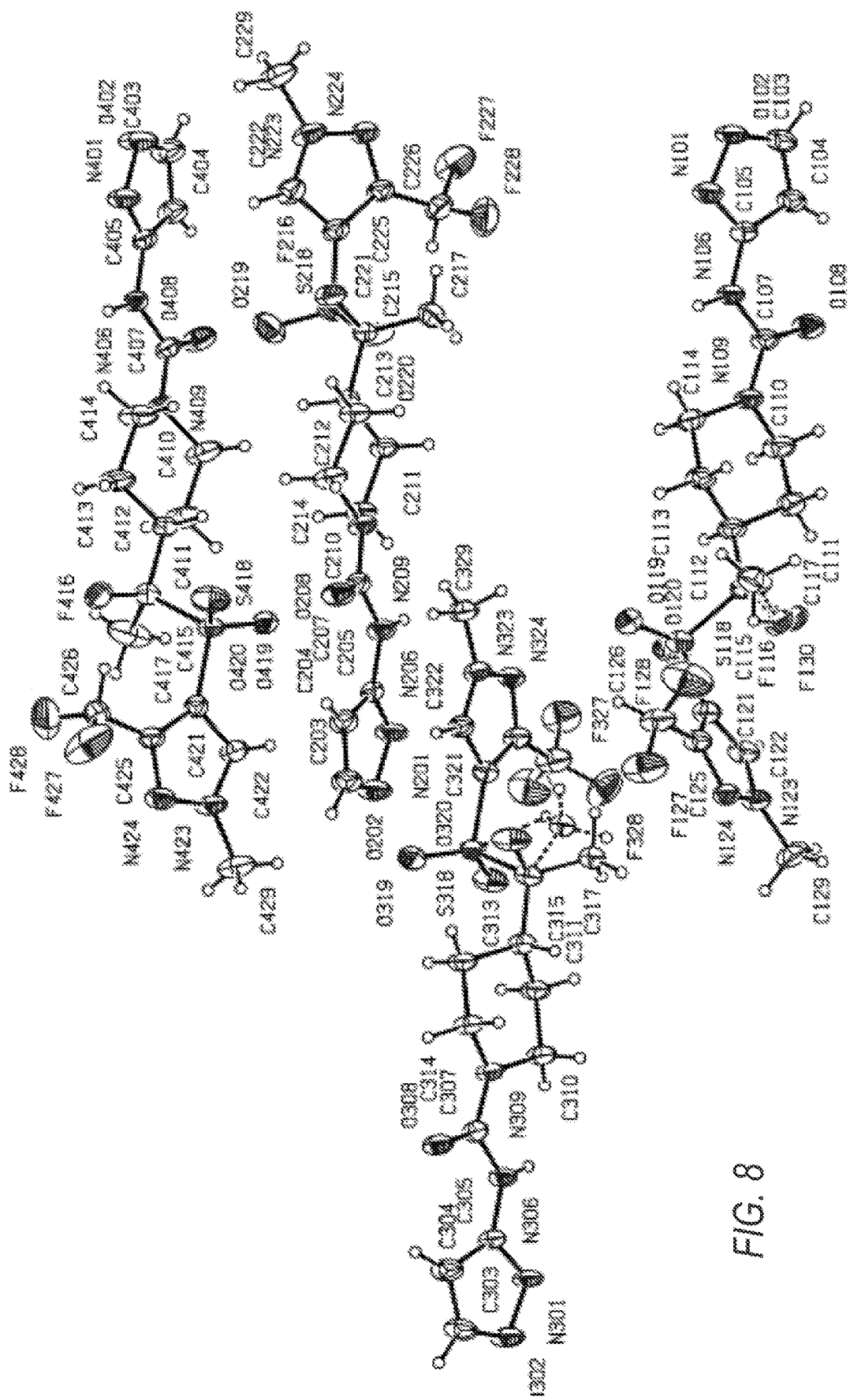
FIG. 8 shows Ortep representation of the molecular structure of Form B with atoms labels and thermal ellipsoids at 30% probability. There are four independent molecules with disordered regions indicated by dotted lines.

In certain aspects, Form B is characterized by the structure as appearing in FIG. 8. In certain aspects, Form B is characterized by the structure as appearing in FIG. 9. In some aspects, Form B has a triclinic crystal system and a space group of P1. In certain aspects, Form B has unit cell dimensions of a=11.926 Å, b=13.239 Å, c=13.511 Å, α=65.40°, β=80.08°, and γ=89.18°.

In certain aspects of the disclosure, Form B is substantially free of other forms of tert-butyl-(R)-4-(1-((3-(difluoromethyl)-1-methyl-1H-pyrazol-4-yl)sulfonyl)-1-fluoroethyl)piperidine-1-carboxylate. Particularly, Form B is substantially free of Form A and/or Form D of tert-butyl-(R)-4-(1-((3-(difluoromethyl)-1-methyl-1H-pyrazol-4-yl)sulfonyl)-1-fluoroethyl)piperidine-1-carboxylate. In some aspects, Form B is substantially free of amorphous tert-butyl-(R)-4-(1-((3-(difluoromethyl)-1-methyl-1H-pyrazol-4-yl)sulfonyl)-1-fluoroethyl)piperidine-1-carboxylate.

In another aspect, provided herein is a composition comprising Form B. In some aspects, the composition comprises greater than or equal to 99.5% by weight Form B. In another aspect, provided herein is a composition, wherein the molar ratio of the amount of the Form B to the sum of the amounts of other polymorphic forms is equal to or greater than 80:20. In another aspect, the molar ratio of the amount of the Form B to the sum of the amounts of other forms is equal to or greater than 90:10. In another aspect, the molar ratio of the amount of the Form B to the sum of the amounts of other forms is equal to or greater than 95:5. In another aspect, the molar ratio of the amount of the Form B to the sum of the amounts of other forms is equal to or greater than 97:3. In another aspect, the molar ratio of the amount of the Form B to the sum of the amounts of other forms is equal to or greater than 98:2. In another aspect, the molar ratio of the amount of the Form B to the sum of the amounts of other forms is equal to or greater than 99:1. In another aspect, the molar ratio of the amount of the Form B to the sum of the amounts of other forms is equal to or greater than 99.5:0.5.

Also provided herein is a composition comprising Form B that is essentially solvent free. In certain aspects, the composition has less than 6 wt. % of solvent. In some aspects, the composition has less than 3 wt. % of solvent. In certain aspects, the composition has less than 1 wt. % of solvent. In some aspects, the composition has less than 0.7 wt. % of solvent. In certain aspects, the solvent is a mixture of water and methanol. In some aspects, the solvent is a mixture of water and ethanol. In other aspects, the solvent is a mixture of water and acetonitrile. In other aspects, the solvent is water.

Form C

Also provided herein is Form C of I-491. In general, Form C has a X-ray powder diffraction pattern obtained by irradiation with Cu-Kα having at least 3 peaks expressed in degrees 2-theta±0.2° selected from 11.78, 15.14, 19.08, 20.54, and 21.02 degrees.

Figure 13A:
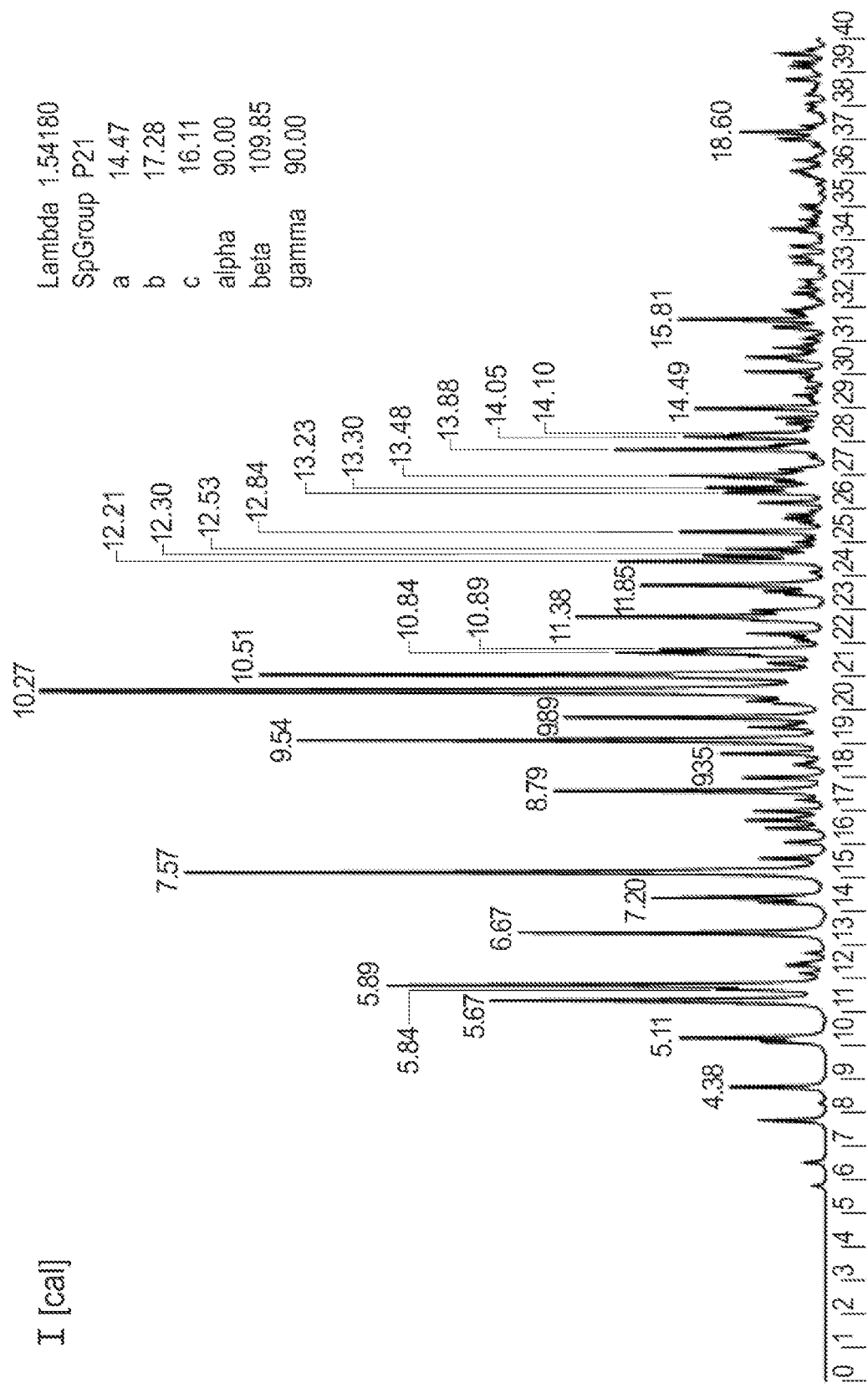
FIG. 13A shows a simulated powder diffraction pattern from the crystal structure of Form C at copper wavelength.
Figure 13B:
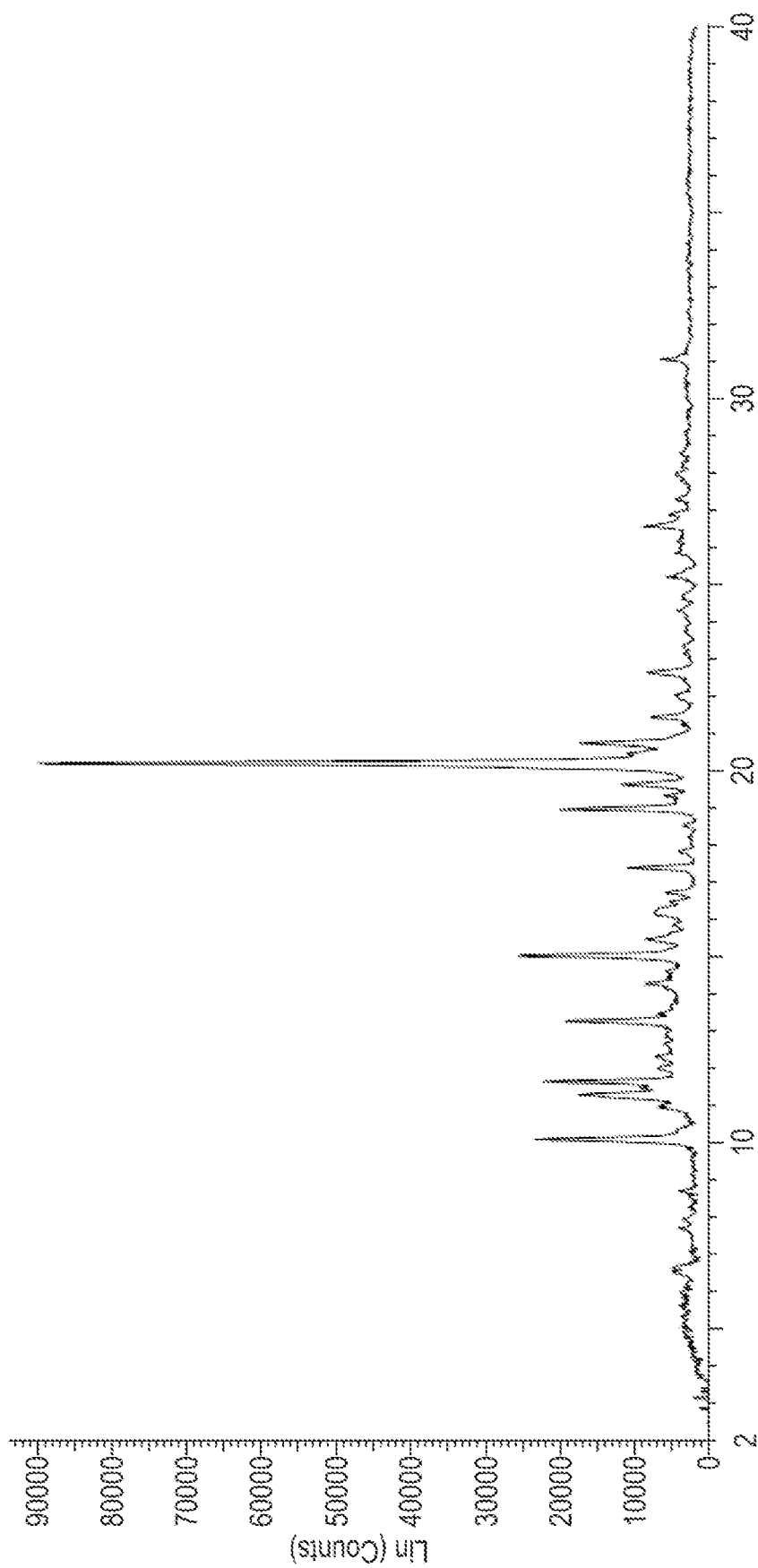
FIG. 13B shows a X-ray powder diffraction pattern of Form C recorded at room temperature.

In certain aspects, Form C is characterized by a X-ray powder diffraction pattern essentially the same as shown in FIG. 13A. In certain aspects, Form C is characterized by a X-ray powder diffraction pattern essentially the same as shown in FIG. 13B.

In some aspects, Form C is characterized by a DSC thermogram showing an endotherm at about 175-189° C. In some aspects, Form B is characterized by a melting point of 185.9° C.±2° C. In some aspects, Form B is characterized by a DSC thermogram showing a second endotherm at about 193-201° C. In some aspects, Form B is characterized by a second melting point of 190° C.±2° C.

Figure 12A:
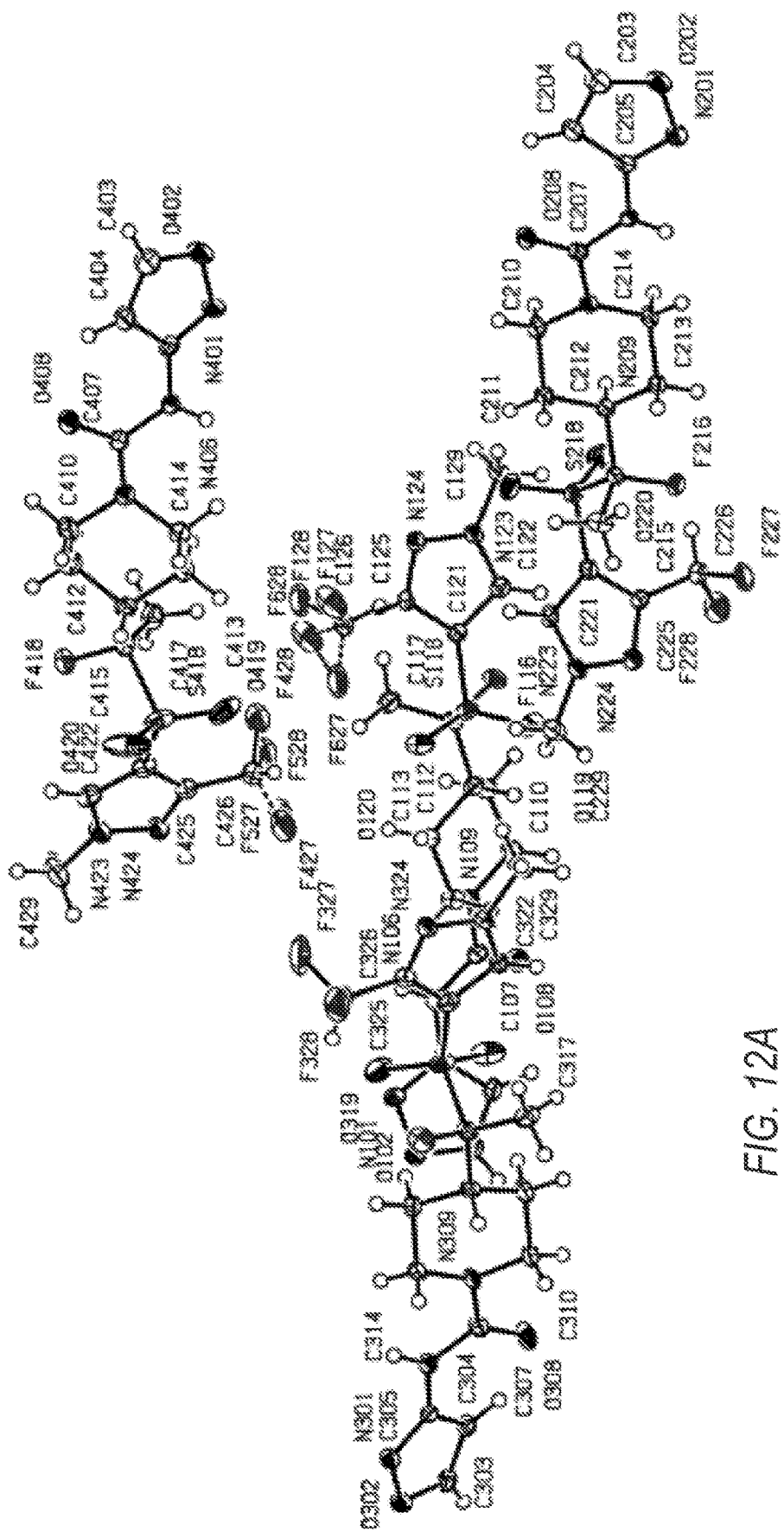
FIG. 12A shows an Ortep representation of the molecular structure of Form C with atoms labels and thermal ellipsoids at 50% probability and disordered regions indicated with dotted lines.

In some aspects, Form C is characterized by the structure shown in FIG. 12A. In other aspects, Form C is characterized by the structures shown in FIG. 12B. In some aspects, Form C has a monoclinic crystal system and a space group of P 21. In certain aspects, Form C has unit cell dimensions of a (Å)=14.47 b (Å)=17.28 c (Å)=16.11 α(°=90.00 β(°)=109.85 γ(°)=90.00.

Form D

Also provided herein is Form D of I-491. In general, Form D of I-491 has a X-ray powder diffraction pattern obtained by irradiation with Cu-Kα having at least 3 peaks expressed in degrees 2-theta±0.2° selected from 11.42, 14.72, 19.52, 19.82, and 20.44 degrees.

Figure 14:
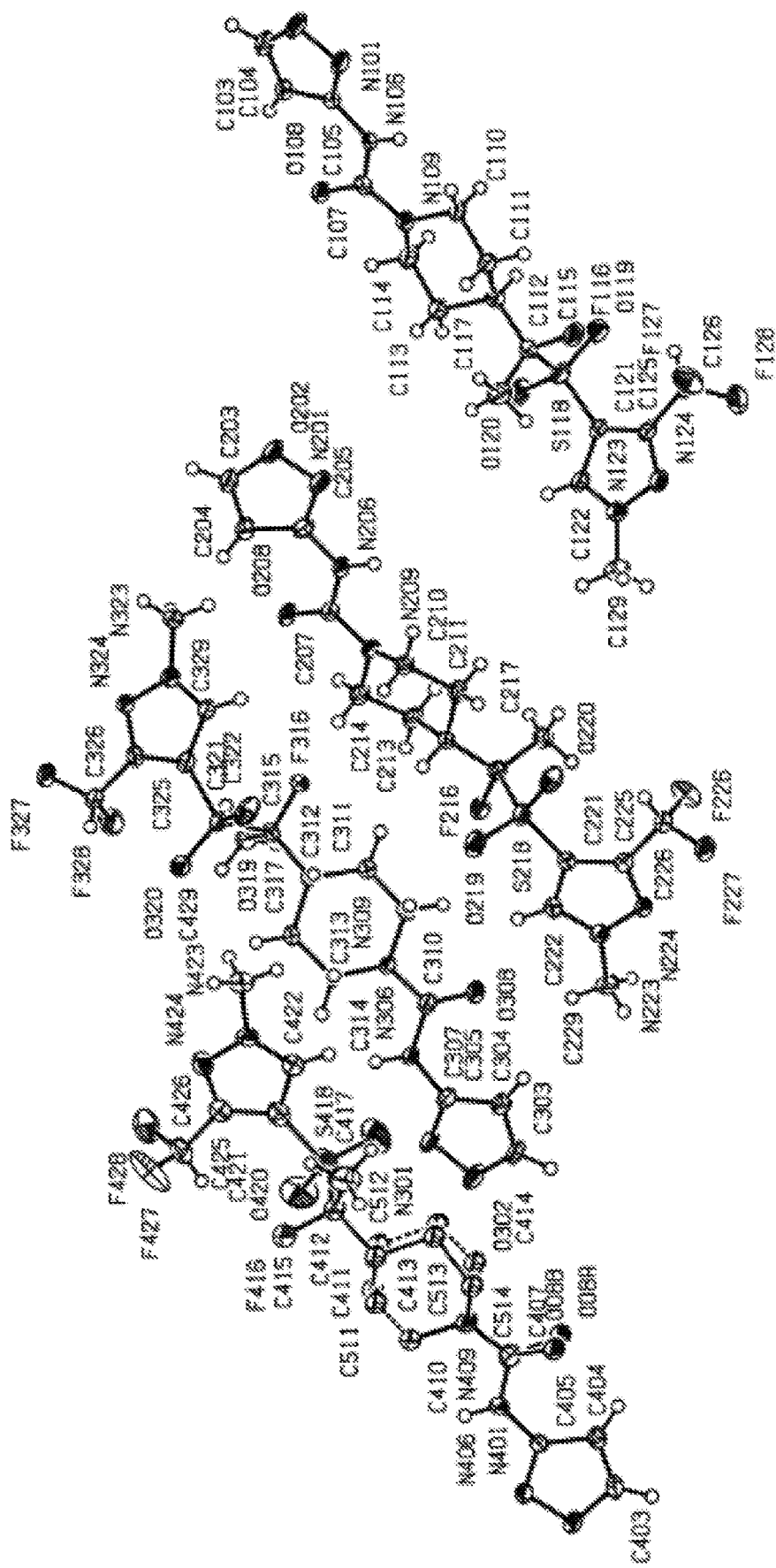
FIG. 14 shows an Ortep representation of the molecular structure of Form D with atoms labels and thermal ellipsoids at 50% probability and with disordered regions indicated by dotted lines.

In some aspects, Form D is characterized by the structure shown in FIG. 14. In other aspects, Form D is characterized by the structures shown in FIG. 15. In some aspects, Form D is characterized by a X-ray powder diffraction pattern essentially the same as shown in FIG. 16. In some aspects, Form D has a triclinic crystal system and a space group of P 1. In certain aspects, Form D has unit cell dimensions of a (Å)=9.78, b (Å)=13.86, c (Å)=16.11, α(°)=65.39, β(°)=84.54, γ(°)=72.42.

Pharmaceutical Compositions

In another aspect, provided herein is a pharmaceutical composition containing a polymorph of I-491 or a pharmaceutically acceptable salt thereof and a pharmaceutically acceptable excipient. The pharmaceutical compositions are useful for treating cardiac disorders associated with systolic dysfunction including dilated cardiomyopathy and HFrEF in humans and other subjects.

The pharmaceutical compositions for the administration of the polymorphs or their pharmaceutically acceptable salts provided herein may conveniently be presented in unit dosage form and may be prepared by any of the methods known in the art of pharmacy and drug delivery. All methods include the step of bringing the active ingredient into association with a carrier containing one or more accessory ingredients. In general, the pharmaceutical compositions are prepared by uniformly and intimately bringing the active ingredient into association with a liquid carrier or a finely divided solid carrier or both, and then, if necessary, shaping the product into the desired formulation. In the pharmaceutical composition, the active agent is generally included in an amount sufficient to increase myocardial contractility (i.e. to improve the systolic dysfunction in DCM or HFrEF) and to improve or not worsen left ventricular relaxation in diastole. Such improved relaxation can alleviate symptoms in dilated cardiomyopathy and other etiologies of diastolic dysfunction, such as heart failure with preserved ejection fraction (HFpEF). It can also ameliorate the effects of diastolic dysfunction causing impairment of coronary blood flow, improving the latter as an adjunctive agent in angina pectoris and ischemic heart disease. It can also confer benefits on salutary left ventricular remodeling in DCM and other causes of left ventricular dysfunction due to ischemic heart disease or chronic volume or pressure overload from, e.g., myocardial infarction, valvular heart disease or systemic hypertension In another aspect, provided herein is a pharmaceutical composition comprising Form A polymorph. In another aspect, the pharmaceutical composition comprises a pharmaceutically acceptable carrier. In another aspect, provided herein is a pharmaceutical composition, wherein the molar ratio of the amount of the Form A polymorph to the sum of the amounts of other forms is equal to or greater than 80:20. In another aspect, the molar ratio of the amount of the Form A polymorph to the sum of the amounts of other forms is equal to or greater than 90:10. In another aspect, the molar ratio of the amount of the Form A polymorph to the sum of the amounts of other forms is equal to or greater than 95:5. In another aspect, the molar ratio of the amount of the Form A polymorph to the sum of the amounts of other forms is equal to or greater than 97:3. In another aspect, the molar ratio of the amount of the Form A polymorph to the sum of the amounts of other forms is equal to or greater than 98:2. In another aspect, the molar ratio of the amount of the Form A polymorph to the sum of the amounts of other forms is equal to or greater than 99:1.

In some aspects, the pharmaceutical composition comprising Form A polymorph further comprises an additional agent. Exemplary non-limiting additional agents include agents that retard the progression of heart failure by down-regulating neurohormonal stimulation of the heart and attempt to prevent cardiac remodeling (e.g., ACE inhibitors, angiotensin receptor blockers (ARBs), β-blockers, aldosterone receptor antagonists, or neural endopeptidase inhibitors); agents that improve cardiac function by stimulating cardiac contractility (e.g., positive inotropic agents, such as the β-adrenergic agonist dobutamine or the phosphodiesterase inhibitor milrinone); and/or agents that reduce cardiac preload (e.g., diuretics, such as furosemide) or afterload (vasodilators of any class, including but not limited to calcium channel blockers, phosphodiesterase inhibitors, endothelin receptor antagonists, renin inhibitors, or smooth muscle myosin modulators). In certain aspects, the additional agent in the pharmaceutical composition is a cardiovascular medication.

In another aspect, provided herein is a pharmaceutical composition comprising Form B polymorph. In another aspect, the pharmaceutical composition comprises a pharmaceutically acceptable carrier. In another aspect, provided herein is a pharmaceutical composition, wherein the molar ratio of the amount of the Form B polymorph to the sum of the amounts of other forms is equal to or greater than 80:20. In another aspect, the molar ratio of the amount of the Form B polymorph to the sum of the amounts of other forms is equal to or greater than 90:10. In another aspect, the molar ratio of the amount of the Form B polymorph to the sum of the amounts of other forms is equal to or greater than 95:5. In another aspect, the molar ratio of the amount of the Form B polymorph to the sum of the amounts of other forms is equal to or greater than 97:3. In another aspect, the molar ratio of the amount of the Form B polymorph to the sum of the amounts of other forms is equal to or greater than 98:2. In another aspect, the molar ratio of the amount of the Form B polymorph to the sum of the amounts of other forms is equal to or greater than 99:1.

In some aspects, the pharmaceutical composition comprising Form B polymorph further comprises an additional agent. Exemplary non-limiting additional agents include agents that retard the progression of heart failure by down-regulating neurohormonal stimulation of the heart and attempt to prevent cardiac remodeling (e.g., ACE inhibitors, angiotensin receptor blockers (ARBs), β-blockers, aldosterone receptor antagonists, or neural endopeptidase inhibitors); agents that improve cardiac function by stimulating cardiac contractility (e.g., positive inotropic agents, such as the β-adrenergic agonist dobutamine or the phosphodiesterase inhibitor milrinone); and/or agents that reduce cardiac preload (e.g., diuretics, such as furosemide) or afterload (vasodilators of any class, including but not limited to calcium channel blockers, phosphodiesterase inhibitors, endothelin receptor antagonists, renin inhibitors, or smooth muscle myosin modulators). In certain aspects, the additional agent in the pharmaceutical composition is a cardiovascular medication.

The pharmaceutical compositions containing the active ingredient may be in a form suitable for oral use, for example, as tablets, troches, lozenges, aqueous or oily suspensions, dispersible powders or granules, emulsions, hard or soft capsules, syrups, elixirs, solutions, buccal patch, oral gel, chewing gum, chewable tablets, effervescent powder and effervescent tablets. Compositions intended for oral use may be prepared according to any method known to the art for the manufacture of pharmaceutical compositions and such compositions may contain one or more agents selected from the group consisting of sweetening agents, flavoring agents, coloring agents, antioxidants and preserving agents in order to provide pharmaceutically elegant and palatable preparations. Tablets contain the active ingredient in admixture with non-toxic pharmaceutically acceptable excipients which are suitable for the manufacture of tablets. These excipients may be for example, inert diluents, such as cellulose, silicon dioxide, aluminum oxide, calcium carbonate, sodium carbonate, glucose, mannitol, sorbitol, lactose, calcium phosphate or sodium phosphate; granulating and disintegrating agents, for example, corn starch, or alginic acid; binding agents, for example PVP, cellulose, PEG, starch, gelatin or acacia, and lubricating agents, for example magnesium stearate, stearic acid or talc. The tablets may be uncoated or they may be coated, enterically or otherwise, by known techniques to delay disintegration and absorption in the gastrointestinal tract and thereby provide a sustained action over a longer period. For example, a time delay material such as glyceryl monostearate or glyceryl distearate may be employed. They may also be coated to form osmotic therapeutic tablets for controlled release.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with water or an oil medium, for example peanut oil, liquid paraffin, or olive oil. Additionally, emulsions can be prepared with a non-water miscible ingredient such as oils and stabilized with surfactants such as mono-diglycerides, PEG esters and the like.

Aqueous suspensions contain the active materials in admixture with excipients suitable for the manufacture of aqueous suspensions. Such excipients are suspending agents, for example sodium carboxymethylcellulose, methylcellulose, hydroxy-propylmethylcellulose, sodium alginate, polyvinyl-pyrrolidone, gum tragacanth and gum acacia; dispersing or wetting agents may be a naturally-occurring phosphatide, for example lecithin, or condensation products of an alkylene oxide with fatty acids, for example polyoxyethylene stearate, or condensation products of ethylene oxide with long chain aliphatic alcohols, for example heptadecaethyleneoxycetanol, or condensation products of ethylene oxide with partial esters derived from fatty acids and a hexitol such as polyoxyethylene sorbitol monooleate, or condensation products of ethylene oxide with partial esters derived from fatty acids and hexitol anhydrides, for example polyethylene sorbitan monooleate. The aqueous suspensions may also contain one or more preservatives, for example ethyl, or n-propyl, p-hydroxybenzoate, one or more coloring agents, one or more flavoring agents, and one or more sweetening agents, such as sucrose or saccharin.

Oily suspensions may be formulated by suspending the active ingredient in a vegetable oil, for example *arachis* oil, olive oil, sesame oil or coconut oil, or in a mineral oil such as liquid paraffin. The oily suspensions may contain a thickening agent, for example beeswax, hard paraffin or cetyl alcohol. Sweetening agents such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending agent and one or more preservatives. Suitable dispersing or wetting agents and suspending agents are exemplified by those already mentioned above. Additional excipients, for example sweetening, flavoring and coloring agents, may also be present.

The pharmaceutical compositions provided herein may also be in the form of oil-in-water emulsions. The oily phase may be a vegetable oil, for example olive oil or *arachis* oil, or a mineral oil, for example liquid paraffin or mixtures of these. Suitable emulsifying agents may be naturally-occurring gums, for example gum acacia or gum tragacanth, naturally-occurring phosphatides, for example soy bean, lecithin, and esters or partial esters derived from fatty acids and hexitol anhydrides, for example sorbitan monooleate, and condensation products of the said partial esters with ethylene oxide, for example polyoxyethylene sorbitan monooleate. The emulsions may also contain sweetening and flavoring agents.

Syrups and elixirs may be formulated with sweetening agents, for example glycerol, propylene glycol, sorbitol or sucrose. Such formulations may also contain a demulcent, a preservative and flavoring and coloring agents. Oral solutions can be prepared in combination with, for example, cyclodextrin, PEG and surfactants.

The pharmaceutical compositions may be in the form of a sterile injectable aqueous or oleagenous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example as a solution in 1,3-butane diol. Among the acceptable vehicles and solvents that may be employed are water, Ringer's solution and isotonic sodium chloride solution. In addition, sterile, fixed oils are conventionally employed as a solvent or suspending medium. For this purpose any bland fixed oil may be employed including synthetic mono- or diglycerides. In addition, fatty acids such as oleic acid find use in the preparation of injectables.

The polymorphs or their pharmaceutically acceptable salts provided herein may also be administered in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials include cocoa butter and polyethylene glycols. Additionally, the compounds can be administered via ocular delivery by means of solutions or ointments. Still further, transdermal delivery of the subject compounds can be accomplished by means of iontophoretic patches and the like. For topical use, creams, ointments, jellies, solutions or suspensions, etc., containing the compounds or their pharmaceutically acceptable salts provided herein are employed. As used herein, topical application is also meant to include the use of mouth washes and gargles.

The polymorphs of this invention may also be coupled to a carrier that is a suitable polymer for targetable drug carriers. Such polymers can include polyvinylpyrrolidone, pyran copolymer, polyhydroxy-propyl-methacrylamide-phenol, polyhydroxyethyl-aspartamide-phenol, or polyethyleneoxide-polylysine substituted with palmitoyl residues. Furthermore, the polymorphs or their pharmaceutically acceptable salts provided herein may be coupled to a carrier that is a biodegradable polymer useful in achieving controlled release of a drug, such as polylactic acid, polyglycolic acid, copolymers of polylactic and polyglycolic acid, polyepsilon caprolactone, polyhydroxy butyric acid, polyorthoesters, polyacetals, polydihydropyrans, polycyanoacrylates and cross linked or amphipathic block copolymers of hydrogels. Polymers and semipermeable polymer matrices may be formed into shaped articles, such as valves, stents, tubing, prostheses and the like.

Pharmaceutical Composition Comprising Form A

In certain aspects of the disclosure, provided herein is pharmaceutical composition comprising Form A and a diluent. In some aspects the pharmaceutical composition further comprises a disintegrant. In certain aspects the pharmaceutical composition further comprises a binder. In some aspects, the pharmaceutical composition further comprises a lubricant.

In some aspects, the pharmaceutical composition comprises Form A and a diluent selected from the group consisting of calcium carbonate, sodium carbonate, calcium phosphate, dicalcium phosphate, calcium sulfate, calcium hydrogen phosphate, sodium phosphate lactose, sucrose, cellulose, microcrystalline cellulose, kaolin, mannitol, sorbitol, inositol, sodium chloride, dry starch, cornstarch, powdered sugar, and mixtures of any of the foregoing diluents. In some aspects, the pharmaceutical composition further comprises a disintegrant is selected from the group consisting of agar, calcium carbonate, potato or tapioca starch, alginic acid, certain silicates, sodium carbonate, croscarmellose sodium, crospovidone, sodium starch glycolate, and mixtures of any of the foregoing disintegrants. In certain aspects, the pharmaceutical composition further comprises a binder is selected from the group consisting of starch (e.g., cornstarch and starch paste), gelatin, sugars (e.g., sucrose, glucose, dextrose, dextrin, molasses, lactose, lactitol, mannitol, etc.), natural and synthetic gums (e.g., acacia, sodium alginate, extract of Irish moss, panwar gum, ghatti gum, mucilage of isapol husks, carboxymethylcellulose, methylcellulose, ethylcellulose, hydroxyethylcellulose, hydroxypropyl cellulose, hydroxypropyl methylcellulose, microcrystalline cellulose, cellulose acetate, poly(vinylpyrrolidone), magnesium aluminum silicate (Veegum®), and larch arabogalactan), alginates, polyethylene oxide, polyethylene glycol, inorganic calcium salts, silicic acid, polymethacrylates, waxes, water, alcohol, and mixtures of any of the foregoing binders. In certain aspects, the pharmaceutical composition further comprises a lubricant is selected from a group consisting of magnesium stearate, calcium stearate, stearic acid, silica, talc, malt, glyceryl behanate, hydrogenated vegetable oils, polyethylene glycol, sodium benzoate, sodium acetate, sodium chloride, leucine, magnesium lauryl sulfate, sodium lauryl sulfate, and mixtures of any of the foregoing lubricants.

Pharmaceutical Composition Comprising Form B

In certain aspects of the disclosure, provided herein is pharmaceutical composition comprising Form B and a diluent. In some aspects the pharmaceutical composition further comprises a disintegrant. In certain aspects the pharmaceutical composition further comprises a binder. In some aspects, the pharmaceutical composition further comprises a lubricant.

In some aspects, the pharmaceutical composition comprises Form B and a diluent selected from the group consisting of calcium carbonate, sodium carbonate, calcium phosphate, dicalcium phosphate, calcium sulfate, calcium hydrogen phosphate, sodium phosphate lactose, sucrose, cellulose, microcrystalline cellulose, kaolin, mannitol, sorbitol, inositol, sodium chloride, dry starch, cornstarch, powdered sugar, and mixtures of any of the foregoing diluents. In some aspects, the pharmaceutical composition further comprises a disintegrant is selected from the group consisting of agar, calcium carbonate, potato or tapioca starch, alginic acid, certain silicates, sodium carbonate, croscarmellose sodium, crospovidone, sodium starch glycolate, and mixtures of any of the foregoing disintegrants. In certain aspects, the pharmaceutical composition further comprises a binder is selected from the group consisting of starch (e.g., cornstarch and starch paste), gelatin, sugars (e.g., sucrose, glucose, dextrose, dextrin, molasses, lactose, lactitol, mannitol, etc.), natural and synthetic gums (e.g., acacia, sodium alginate, extract of Irish moss, panwar gum, ghatti gum, mucilage of isapol husks, carboxymethylcellulose, methylcellulose, ethylcellulose, hydroxyethylcellulose, hydroxypropyl cellulose, hydroxypropyl methylcellulose, microcrystalline cellulose, cellulose acetate, poly(vinylpyrrolidone), magnesium aluminum silicate (Veegum®), and larch arabogalactan), alginates, polyethylene oxide, polyethylene glycol, inorganic calcium salts, silicic acid, polymethacrylates, waxes, water, alcohol, and mixtures of any of the foregoing binders. In certain aspects, the pharmaceutical composition further comprises a lubricant is selected from a group consisting of magnesium stearate, calcium stearate, stearic acid, silica, talc, malt, glyceryl behanate, hydrogenated vegetable oils, polyethylene glycol, sodium benzoate, sodium acetate, sodium chloride, leucine, magnesium lauryl sulfate, sodium lauryl sulfate, and mixtures of any of the foregoing lubricants.

In some aspects, the pharmaceutical composition comprises Form B, at least one diluent, at least one disintegrant, at least one binder, and/or at least one lubricant. In certain aspects, Form B makes up about 1-55% of the mass of the composition. In certain aspects, Form B makes up about 1-20% of the mass of the composition. In certain aspects, the one or more diluents makes up about 30-95% of the mass of the composition. In certain aspects, the one or more diluents makes up about 40-95% of the mass of the composition. In certain aspects, the one or more diluents makes up about 75-95% of the mass of the composition. In certain aspects, the one or more disintegrants make up about 0-10% of the mass of the composition. In certain aspects, the one or more disintegrants make up about 0-5% of the mass of the composition. In certain aspects, the one or more binders make up about 0-10% of the mass of the composition. In certain aspects, the one or more binders make up about 0-5% of the mass of the composition. In certain aspects, the one or more lubricants make up about 0-10% of the mass of the composition. In certain aspects, the one or more lubricants make up about 0-5% of the mass of the composition In certain aspects of the disclosure, provided herein is a pharmaceutical composition comprising Form B, lactose, cellulose, croscarmellose sodium, hydroxypropyl methylcellulose, and magnesium stearate. In some aspects, the pharmaceutical composition comprises, Form B, lactose monohydrate, microcrystalline cellulose, croscarmellose sodium, hydroxypropyl methylcellulose, and magnesium stearate.

Methods of Treating Cardiac Disorders

The mutations that lead to DCM cause significant perturbations in myosin mechanics. These mutations exert their effects via distinct mechanisms depending on their locations in the myosin gene. Without wishing to be bound by any particular theory, it is believed that the compounds or their pharmaceutically acceptable salts provided herein can bind directly to the mutant sarcomeric proteins and correct for their aberrant function, either in cis (by affecting the same specific function) or in trans (by altering a complementary function). As such, they can provide therapeutic benefit for DCM patients by counteracting the hypocontractile and/or impaired relaxation associated with this disease. Additionally, these compounds that increase systolic function hold promise of treating a wide spectrum of disorders in which symptoms and/or clinical outcomes are attributable to systolic dysfunction (left or right sided heart failure) or a reduction in systolic reserve (e.g., HFpEF).

Accordingly, the invention provides a method of treating systolic dysfunction. Further provided are methods of treating DCM. Provided herein are methods of treating HFrEF. The disclosure also provides methods of treating dilated cardiomyopathy (DCM) or a cardiac disorder having one or more pathophysiological features associated with DCM, such as disorders with systolic dysfunction or a reduction in systolic reserve. The method includes administering to a subject in need thereof an effective amount of a polymorph or composition provided herein.

Particularly, the invention provides a method of treating systolic dysfunction by administering to a subject in need thereof with an effective amount of polymorph Form B of I-491. Further provided are methods of treating DCM by administering to a subject in need thereof an effective amount of polymorph Form B of I-491. Also provided herein are methods of treating HFrEF by administering to a subject in need thereof an effective amount of polymorph Form B of I-491. The disclosure also provides methods of treating dilated cardiomyopathy (DCM) or a cardiac disorder having one or more pathophysiological features associated with DCM, such as disorders with systolic dysfunction or a reduction in systolic reserve by administering to a subject in need thereof an effective amount of polymorph Form B of I-491.

Also provided herein are methods of treating systolic dysfunction by administering to a subject in need thereof with an effective amount of polymorph Form A of I-491, methods of treating DCM by administering to a subject in need thereof an effective amount of polymorph Form A of I-491, and methods of treating HFrEF by administering to a subject in need thereof an effective amount of polymorph Form A of I-491. The disclosure also provides methods of treating dilated cardiomyopathy (DCM) or a cardiac disorder having one or more pathophysiological features associated with DCM, such as disorders with systolic dysfunction or a reduction in systolic reserve by administering to a subject in need thereof an effective amount of polymorph Form A of I-491.

The compounds and polymorphs thereof of the invention or their pharmaceutically acceptable salts can alter the natural history of DCM and other diseases rather than merely palliating symptoms. The mechanisms conferring clinical benefit to DCM patients can extend to patients with other forms of heart disease sharing similar pathophysiology, with or without demonstrable genetic influence. For example, an effective treatment for DCM, by improving ventricular contraction, can also be effective in a broader population characterized by systolic dysfunction. The compounds and polymorphs of the invention or their pharmaceutically acceptable salts can specifically target the root causes of the conditions or act upon other downstream pathways. Accordingly, the compounds and polymorphs of the invention or their pharmaceutically acceptable salts can also confer benefit to patients suffering from heart failure with reduced ejection fraction (HFrEF), HFpEF, chronic congestive heart failure, acute heart failure, right-sided (or right ventricular) heart failure, cardiogenic shock and inotropic support after cardiac surgery. Compounds and polymorphs of the invention or their pharmaceutically acceptable salts can potentially improve cardiac function in the following patient segments: idiopathic dilated cardiomyopathy, genetically defined or familial dilated cardiomyopathy, ischemic or post-infarction cardiomyopathy, viral cardiomyopathy or myocarditis, toxic cardiomyopathies (e.g., post-anthracycline anticancer therapy), metabolic cardiomyopathies (in conjunction with enzyme replacement therapy), diastolic heart failure (with diminished systolic reserve), right heart failure due to pulmonary hypertension, and ventricular dysfunction due to on-bypass cardiovascular surgery. Compounds and polymorphs of the invention or their pharmaceutically acceptable salts can also promote salutary ventricular reverse remodeling of left ventricular dysfunction due to ischemia or volume or pressure overload; e.g., myocardial infarctions, chronic mitral regurgitation, chronic aortic stenosis, or chronic systemic hypertension. By reducing left ventricular filling pressures the compounds and polymorphs could improve the symptom of dyspnea and reduce the risk of pulmonary edema and respiratory failure. Reducing or eliminating functional mitral regurgitation and/or lowering left atrial pressures may reduce the risk of paroxysmal or permanent atrial fibrillation, and with it reduce the attendant risk of arterial thromboembolic complications including but not limited to cerebral arterial embolic stroke. The compounds and polymorphs, or their pharmaceutically acceptable salts may reduce the severity of the chronic ischemic state associated with DCM and thereby reduce the risk of Sudden Cardiac Death (SCD) or its equivalent in patients with implantable cardioverter-defibrillators (frequent and/or repeated ICD discharges) and/or the need for potentially toxic antiarrhythmic medications. The compounds and polymorphs, or their pharmaceutically acceptable salts could be valuable in reducing or eliminating the need for concomitant medications with their attendant potential toxicities, drug-drug interactions, and/or side effects. The compounds and polymorphs, or their pharmaceutically acceptable salts may reduce interstitial myocardial fibrosis and/or slow the progression, arrest, or reverse left ventricular stiffness and diastolic dysfunction.

The present disclosure provides a method of treating systolic dysfunction in a patient in need thereof. In some embodiments, the patient is suffering from a syndrome or disorder selected from the group consisting of heart failure (including, but not limited to, heart failure with reduced ejection fraction (HFrEF), heart failure with preserved ejection fraction (HFpEF), congestive heart failure, and diastolic heart failure (with diminished systolic reserve)); a cardiomyopathy (including, but not limited to, ischemic cardiomyopathy, dilated cardiomyopathy, post-infarction cardiomyopathy, viral cardiomyopathy, toxic cardiomyopathy (including, but not limited to, post-anthracycline anticancer therapy), metabolic cardiomyopathy (including, but not limited to, in conjunction with enzyme replacement therapy), infiltrative cardiomyopathy (including, but not limited to, amyloidosis), and diabetic cardiomyopathy); cardiogenic shock; conditions that benefit from inotropic support after cardiac surgery (e.g., ventricular dysfunction due to on-bypass cardiovascular surgery); myocarditis (including, but not limited to, viral); atherosclerosis; secondary aldosteronism; myocardial infarction; valve disease (including, but not limited to, mitral regurgitation and aortic stenosis); systemic hypertension; pulmonary hypertension (i.e., pulmonary arterial hypertension); detrimental vascular remodeling; pulmonary edema; and respiratory failure. In certain embodiments, the syndrome or disorder may be chronic and/or stable. In some embodiments, the patient has heart failure and a diagnosis of any one of NYHA Class II-IV. In certain embodiments, the patient has symptomatic heart failure. In some embodiments, the patient has acute heart failure.

In some embodiments, the patient with HFrEF also exhibits mitral regurgitation. In some embodiments, the HFrEF is ischemic HFrEF. In some embodiments, the HFrEF is dilated cardiomyopathy (DCM); optionally, the patient has a genetic predisposition to DCM or genetic DCM (which may be caused by a pathogenic or likely pathogenic variant of a gene related to cardiac function including, but not limited to, MYH7 or Titin mutation).

Depending on the disease to be treated and the subject's condition, the compounds and polymorphs, or their pharmaceutically acceptable salts provided herein may be administered by oral, parenteral (e.g., intramuscular, intraperitoneal, intravenous, ICV, intracisternal injection or infusion, subcutaneous injection, or implant), by implantation (e.g., as when the compound or polymorph is coupled to a stent device), by inhalation spray, nasal, vaginal, rectal, sublingual, or topical routes of administration and may be formulated, alone or together, in suitable dosage unit formulations containing conventional non-toxic pharmaceutically acceptable carriers, adjuvants and vehicles appropriate for each route of administration.

It will be understood, however, that the specific dose level and frequency of dosage for any particular patient may be varied and will depend upon a variety of factors including the activity of the specific compound or polymorph employed, the metabolic stability and length of action of that compound or polymorph, the age, body weight, hereditary characteristics, general health, sex and diet of the subject, as well as the mode and time of administration, rate of excretion, drug combination, and the severity of the particular condition for the subject undergoing therapy.

Compounds, polymorphs, and compositions provided herein may be used in combination with other drugs that are used in the treatment, prevention, suppression or amelioration of the diseases or conditions for which compounds, polymorphs, and compositions provided herein are useful. Such other drugs may be administered, by a route and in an amount commonly used therefor, contemporaneously or sequentially with a compound, polymorph, or composition provided herein. When a compound, polymorph, or composition provided herein is used contemporaneously with one or more other drugs, a pharmaceutical composition containing such other drugs in addition to the compound, polymorph, or composition provided herein is preferred. Accordingly, the pharmaceutical compositions provided herein include those that also contain one or more other active ingredients or therapeutic agents, in addition to a compound, polymorph, or composition provided herein. Suitable additional active agents include, for example: therapies that retard the progression of heart failure by down-regulating neurohormonal stimulation of the heart and attempt to prevent cardiac remodeling (e.g., ACE inhibitors, angiotensin receptor blockers (ARBs), β-blockers, aldosterone receptor antagonists, or neural endopeptidase inhibitors); therapies that improve cardiac function by stimulating cardiac contractility (e.g., positive inotropic agents, such as the β-adrenergic agonist dobutamine or the phosphodiesterase inhibitor milrinone); and therapies that reduce cardiac preload (e.g., diuretics, such as furosemide) or afterload (vasodilators of any class, including but not limited to calcium channel blockers, phosphodiesterase inhibitors, endothelin receptor antagonists, renin inhibitors, or smooth muscle myosin modulators). The compounds, polymorphs, or their pharmaceutically acceptable salts may be used in combination with a beta-blocker (a drug class with known side-effects due to negative inotropic effect) to confer unique tolerability of beta-blocker titration to target doses. The compounds, polymorphs, or their pharmaceutically acceptable salts may be used in combination with a lusitropic agent for the treatment of diastolic heart failure (or HFpEF, a disorder with diastolic dysfunction and reduced systolic reserve). The weight ratio of the compound or polymorph provided herein to the second active ingredient may be varied and will depend upon the effective dose of each ingredient. Generally, an effective dose of each will be used.

EXAMPLES

In order that the invention described herein may be more fully understood, the following examples are set forth. The examples described in this application are offered to illustrate the compounds, polymorphs, pharmaceutical compositions, and methods provided herein and are not to be construed in any way as limiting their scope.

Example 1. Preparation of (R)-4-(1-((3-(Difluoromethyl)-1-methyl-1H-pyrazol-4-yl)sulfonyl)-1-fluoroethyl)-N-(isoxazol-3-yl)piperidine-1-carboxamide (I-491)

I-491 was synthesized as described in U.S. Pat. No. 9,925,177.

Example 2. Polymorph Evaporation Experiments

Solutions of I-491 were prepared in various solvents at room temperature. Once the mixtures reached complete dissolution, as judged by visual observation, solutions were allowed to evaporate to dryness from an open vial at room temperature. The solids were analyzed by XRPD.

TABLE 1

| Solvent | Polymorph Obtained |
| --- | --- |
| Acetonitrile | Form A + εD |
| Acetone | Form A + acetone solvate |
| Methyl Ethyl Ketone | Form A + εD |
| Dichloromethane | Form A + εD |

Example 3. Polymorph Slurry Experiments

The selected solvent was pre-saturated by slurring with I-491 at the selected temperature. A small amount (20 mg/mL) of I-491 was then added and the suspensions were slurried for two weeks at the indicated temperature. The solids were collected by vacuum filtration and analyzed by XRPD and TGA. The results obtained are reported in Table 2 and Table 3.

In a first set of experiments (Table 2), which were performed utilizing various amounts of water, a non-hydrated form designated as Form B was isolated. In a second set of experiments (Table 3), Form B was isolated by slurring in various solvents without water and at room temperature. At 50° C., a mixture of Forms A and/or B plus Form C was obtained.

TABLE 2

| Solvent | Percent Water | Temperature | Polymorph Obtained |
| --- | --- | --- | --- |
| Ethanol/Water | 25% | RT | Form B |
| Ethanol/Water | 45% | RT | Form B |
| Ethanol/Water | 75% | RT | Form B |
| Methanol/Water | 25% | RT | Form B |
| Methanol/Water | 45% | RT | Form B |
| Methanol/Water | 75% | RT | Form B |
| Water | 100% | RT | Form B |

TABLE 3

| Solvent | Temperature | Polymorph Obtained |
| --- | --- | --- |
| Ethanol | RT | Form B |
| Ethanol | 50° C. | Mixture of Form A + B + C |
| Methanol | RT | Form B |
| Methanol | 50° C. | Mixture of Form A + B + C |
| Ethyl Acetate | RT | Form B |

TABLE 3-continued

| Solvent | Temperature | Polymorph Obtained |
| --- | --- | --- |
| Ethyl Acetate | 50° C. | Mixture of Form A + B + C |
| Methyl IsoButyl Ketone | RT | Form B |
| Methyl IsoButyl Ketone | 50° C. | Mixture of Form B + C |

Example 4. Polymorph Relative Stability and Interconversion

The relative stability of Form A+εD and Form B was assessed by interconversion slurring experiments at different temperatures in an acetonitrile and water mixture. The solvent was pre-saturated by slurring with Form A+εD at the selected temperature. A mixture 1:1 (w/w) of forms A+εD and B was then added to each mother liquor sample and slurried for 18 hours at selected temperature. The solids were collected by vacuum filtration and analyzed by XRPD, TGA and DSC. The results obtained are reported in Table 4. Form B was found to be more stable compared to Form A in the range of RT to 70° C.

TABLE 4

| Temperature | Polymorph Obtained |
| --- | --- |
| 25° C. | Form B |
| 50° C. | Form B |
| 60° C. | Form B |
| 70° C. | Form B |
| 80° C. | Form C + traces of Forms A and B |

Example 5. Characterization of Form A

A representation XRPD pattern for Form A appears in FIG. 1B (acquisition parameters: Panalytical X-pert Pro MPD PW3040 Pro; X-ray tube=Cu (1.54059 Å); voltage=45 kV; amperage=40 mA; scan range=1.00-39.99° 2θ; collection time: 718 s; scan speed=3.3°/min; slit=DS: fixed slit ½°; SS=null; revolution time=1.0 s; mode=transmission).

The DSC thermogram (parameters: equilibrate at 0.00° C., ramp 10.00° C./min to 250.00° C.) shows a single endothermic event associated with the melting of crystalline product characterized by a melting point of 191° C. and melting enthalpy of 75 J/g (FIG. 2). A continuous light loss of mass of 1.7% is observed between room temperature and 149° C. by TGA (FIG. 2). The DVS isotherm evidences the non-hygroscopic character of Form A.

Synchrotron XRPD & Single Crystal

A powder sample of I-491 was sealed into a 0.8 mm thin walled borosilicate glass capillary and then analyzed by high resolution synchrotron XRD, at the European Synchrotron Radiation Facility (beam line ID22, ESRF Grenoble) (Fitch, A. N. *Mater. Sci. Forum* 1996, 228-231; Experiment register: in952). Powder diffraction data (0.5°<2θ<38°) were recorded at room temperature at the Beam Line ID31 in transmission mode with a wavelength of 1.0 Å (12.40 KeV) and a step size of 0.003°. In order to exclude any degradation effect due to beam exposure and to enhance counting statistics, the measurements were made using a device that enabled horizontal translation of the capillary, such that each individual data set was obtained only from previously unexposed area of the powder (original recording). After normalization of the profiles and smoothing of the background, 29 non-overlapping peaks located in the low to medium angle region of the resulting powder diagram were used for cell determination. The synchrotron powder XRD pattern of I-491, represented in FIG. 1A, could be indexed (Boultif, A.;

Louër, D. J. Appl. Cryst. 1991, 24, 987-993) in the triclinic unit cell whose parameters are given below.

Slow evaporation from MeOH/EtOH mixture affords crystals suitable for X-rays diffraction studies. A single crystal selected by observation under a binocular microscope was mounted on the goniometric head of a Bruker Instrument APEX DUO diffractometer (Bruker AXS (2011). APEX2 suite V 2011.2-0. Madison, Wisconsin, U.S.A.) Intensities were collected at room temperature (T=293 K), with the use of a micro source Cu Kα radiation (ImuS, λ=1.54178 Å). Systematic investigation of the diffraction nodes indicates that the crystal belongs to the triclinic system, with a primitive Bravais lattice. The room temperature unit cell parameters are: a (Å)=6.40, b (Å)=11.34, c (Å)=13.51, α(°)=81.91, β (°)=85.75, γ(°)=85.18. In view of the number of atoms in the molecule of I-491 Form A and of the unit cell volume, it was concluded that this unit cell must contain 2 molecules having the formula C16 H18 F3 N5 O4 S which is equivalent to a calculated density of 1.490. The number of reflections collected was 9846, of which 5255 were unique.

Based on the statistical distribution of the intensities, a non-centrosymmetric structure is deduced.

The structure was solved by direct methods and refined on $F^2$ by full least squares methods with SHELXTL (Sheldrick, G. M. Acta Crystallogr. Sect. A 2008, A64, 112-122). All non-hydrogen atoms were refined with anisotropic displacement parameters; a riding model was used for hydrogen atoms. Final agreement values are R1=0.0992 (observed reflections) and wR2=0.2875 (all data) for 5255 reflections and 542 parameters, with a goodness of fit of 1.694.

Figure 4:
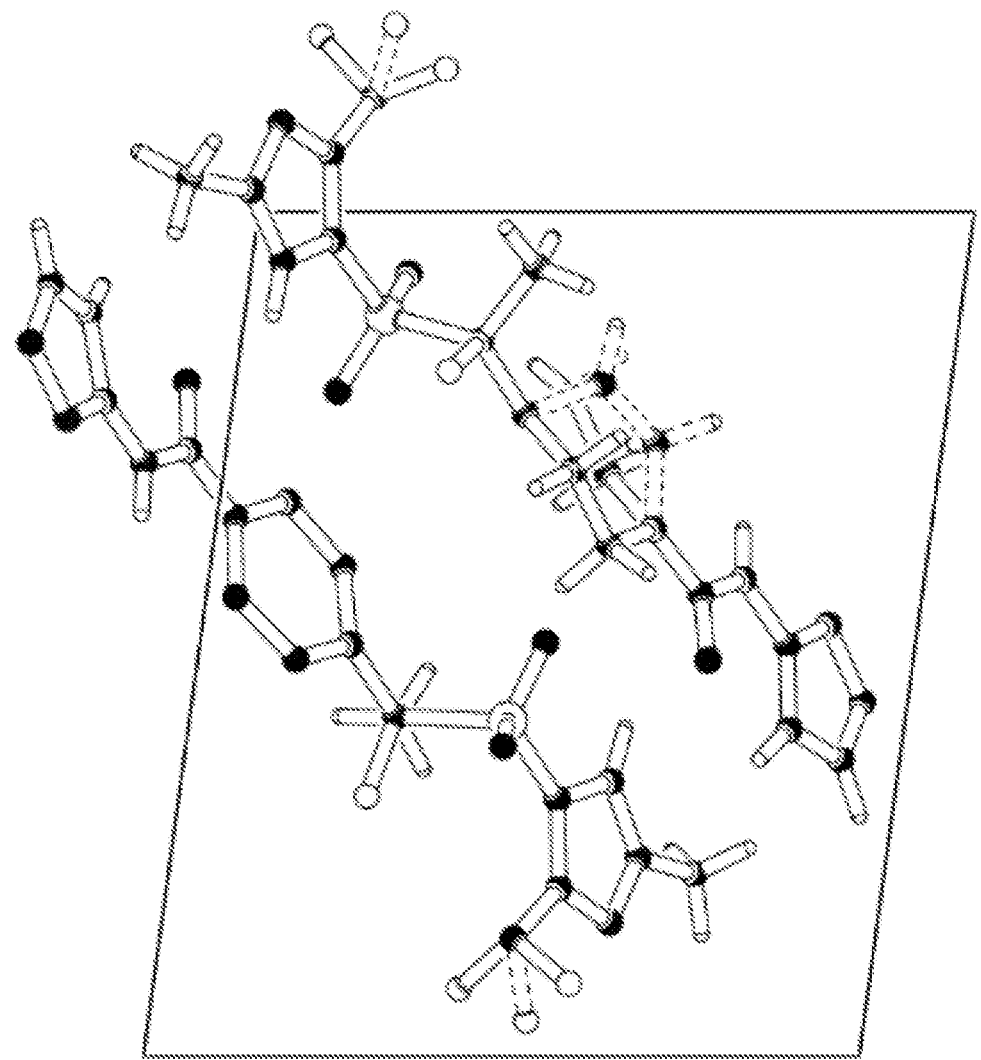
FIG. 4 shows a representation of the molecular packing of Form A down the short axis, showing the disorder scheme (dotted lines).

The compound (FIG. 3) crystallizes in the space group P 1, the asymmetric unit of the crystal is made up of 2 molecule of I-491 Form A, thus 2 formulae are present in the unit cell (FIG. 4). The asymmetric cell contains: 2 [C16 H20 F3 N5 O4 S]. One piperidine group and both $CF_2$ groups are disordered. Examination of the molecular structure confirms that all bond angles and lengths stand in the standard range values.

Crystal data, X-rays experimental parameters and structure refinements are given in Table 5. Table 5.1 lists the positional parameters for all independent non-hydrogen atoms together with their equivalent isotropic displacement parameters. Bond lengths and angles are listed Table 5.2 and 5.3. Hydrogen positions are reported Table 5.4. Table 5.5 lists all the hydrogen bonds.

TABLE 5

| Identification code | Form A |
| --- | --- |
| Chemical formula | C16 H18 F3 N5 O4 S |
| Molecular weight | 433.41 |
| Temperature | 296(2) |
| Wavelength | 1.54178 |
| Crystal system; space group | Triclinic; P 1 |
| Unit cell dimensions | a = 6.4036(8) Å; α = 81.907(9)° |
| | b = 11.3434(15) Å; β = 85.753(9)° |
| | c = 13.5070(15) Å; γ = 85.181(9)° |
| Volume | 966.0(2) Å$^3$ |
| Z, Calculated density | 2, 1.490 Mg/m$^3$ |
| Absorption coefficient | 2.069 l/mm |
| F(000) | 448 |
| Theta range for data collection | 3.31° to 68.05° |
| Limiting indices | −7 <= h <= 7; |
| | −12 <= k <= 13; |
| | −16 <= l <= 16 |
| Reflection collected/unique | 9846/5255 [R(int) = 0.0486] |
| Completeness to theta max | 87.8% |
| Refinement method | Full-matrix least-square on $F^2$ |
| Data/restraints/parameters | 5255/813/542 |
| Goodness of fit on $F^2$ | 1.694 |
| Final R indices [I > 2sigma(I)] | R1 = 0.0992; wR2 = 0.2565 |
| Final R indices [all data] | R1 = 0.1289; wR2 = 0.2875 |
| Absolute structure parameter | 0.03(4) |
| Largest diff peak and hole | 0.576 d −0.320 e/Å$^3$ |

TABLE 5.1

Atomic coordinates (×10$^4$) and equivalent isotropic displacements parameters (Å$^2$ × 10$^3$). U(eq) is defined as one third of the trace of the orthogonalized U$^{ij}$ tensor.

| Label | x | y | z | U(eq) |
| --- | --- | --- | --- | --- |
| C103 | 5150(20) | 9179(11) | 3510(8) | 109(3) |
| C104 | 6600(20) | 8398(11) | 3876(8) | 121(4) |
| C105 | 6152(14) | 8210(7) | 4865(6) | 70(2) |
| C107 | 9125(14) | 6908(7) | 5474(6) | 66(2) |
| C110 | 8464(14) | 5362(8) | 6915(6) | 61.1(1.8) |
| C111 | 0448(14) | 4736(6) | 7841(7) | 61.1(1.8) |
| C112 | 11574(13) | 4112(8) | 7602(7) | 83(2) |
| C113 | 12968(14) | 4887(9) | 6945(7) | 89(3) |
| C114 | 11978(14) | 5533(8) | 6046(7) | 70(2) |
| C115 | 12589(17) | 3340(9) | 8467(7) | 88(3) |
| C117 | 12690(20) | 3986(10) | 9351(9) | 119(4) |
| C121 | 13014(18) | 1089(8) | 9672(7) | 89(3) |
| C122 | 14802(19) | 426(9) | 9424(7) | 97(3) |
| C125 | 12685(18) | 897(8) | 10686(7) | 92(3) |
| C126 | 11010(20) | 1396(10) | 11370(8) | 120(3) |
| C129 | 17240(20) | −1035(13) | 10401(9) | 125(4) |
| C203 | 13600(20) | −2770(11) | 9150(8) | 122(4) |
| C204 | 11860(20) | −2182(12) | 8803(8) | 128(4) |
| C205 | 12556(17) | −1809(7) | 7762(6) | 76(2) |
| C207 | 9518(17) | −522(7) | 7174(7) | 74(2) |
| C210 | 10021(19) | 413(12) | 5440(8) | 119(4) |
| C211 | 9220(20) | 1371(13) | 4705(9) | 139(4) |
| C212 | 7580(20) | 2100(11) | 4881(9) | 120(4) |
| C213 | 6240(20) | 1853(14) | 5798(9) | 140(4) |
| C214 | 6932(19) | 955(11) | 6566(8) | 109(4) |
| C215 | 6392(18) | 2881(8) | 4025(8) | 89(3) |
| C217 | 4150(20) | 2895(12) | 4005(12) | 128(4) |
| C221 | 5774(13) | 5296(8) | 3046(6) | 67(2) |
| C222 | 4032(17) | 6003(9) | 3258(7) | 88(3) |
| C225 | 6049(17) | 5436(10) | 1996(7) | 85(3) |
| C226 | 7950(20) | 4947(12) | 1394(8) | 137(4) |
| C229 | 1560(20) | 7350(14) | 2161(10) | 135(5) |
| C310 | 8800(40) | 5990(30) | 7269(13) | 61.1(1.6) |
| C311 | 10120(40) | 5130(20) | 7970(20) | 61.1(1.8) |
| F116 | 14693(9) | 2969(6) | 8116(5) | 113.6(1.9) |
| F127 | 11690(20) | 2343(11) | 11694(10) | 188(5) |
| F128 | 10358(17) | 544(8) | 12074(7) | 167(4) |
| F130 | 11930(40) | 1550(30) | 12217(15) | 146(6) |
| F216 | 7314(14) | 2624(5) | 3083(4) | 128(2) |
| F227 | 9000(20) | 5806(11) | 863(10) | 185(4) |
| F228 | 7120(20) | 4280(12) | 803(10) | 186(4) |
| F230 | 7580(50) | 5280(40) | 426(13) | 164(6) |
| N101 | 4417(12) | 8743(7) | 5106(5) | 84(2) |
| N106 | 7211(12) | 7466(5) | 5649(5) | 69.1(1.8) |
| N109 | 9914(11) | 6112(6) | 6243(5) | 68.6(1.7) |
| N123 | 15442(15) | −150(8) | 10258(6) | 101(3) |
| N124 | 14203(16) | 145(8) | 11050(5) | 97(3) |
| N201 | 14385(13) | −2285(8) | 7552(5) | 84(2) |
| N206 | 11472(13) | −1123(6) | 7026(5) | 81(2) |
| H209 | 8876(12) | 245(6) | 8384(5) | 72.2(1.9) |
| N223 | 3330(131) | 6535(7) | 2357(6) | 90(2) |
| N224 | 4852(15) | 6256(8) | 1589(8) | 96(3) |
| O102 | 3733(11) | 9366(6) | 4197(4) | 95(2) |
| O108 | 10229(11) | 7134(6) | 4692(5) | 95(2) |
| O119 | 9448(14) | 2217(9) | 9269(8) | 144(4) |
| O120 | 11642(18) | 1445(8) | 7875(7) | 141(3) |
| O202 | 15122(13) | −2937(6) | 8453(5) | 100(2) |
| O208 | 8566(13) | −682(7) | 7987(5) | 103(2) |
| O219 | 6456(13) | 4827(7) | 4900(5) | 101(2) |
| O228 | 9347(12) | 4432(8) | 3673(6) | 108(2) |

TABLE 5.1-continued

Atomic coordinates (×10⁴) and equivalent isotropic displacements parameters ($Å^2 \times 10^3$). U(eq) is defined as one third of the trace of the orthogonalized $U^{ij}$ tensor.

| Label | x | y | z | U(eq) |
|---|---|---|---|---|
| S118 | 11452(4) | 1959(2) | 8778(2) | 99.0(9) |
| S218 | 7182(3) | 4449.2(1.8) | 3968.6(1.5) | 73.8(6) |

TABLE 5.2

Bond Lengths (Ångstrom)

| Bond | Length (Å) |
|---|---|
| C103—C104 | 1.299(16) |
| C104—C105 | 1.335(13) |
| C105—N106 | 1.433(10) |
| C107—N109 | 1.374(10) |
| C107—O108 | 1.235(10) |
| C110—C111 | 1.503(10) |
| C111—C112 | 1.516(10) |
| C112—C113 | 1.467(13) |
| C112—C115 | 1.511(12) |
| C113—C114 | 1.484(12) |
| C115—C117 | 1.517(15) |
| C115—F116 | 1.443(11) |
| C115—S118 | 1.767(11) |
| C121—C122 | 1.363(10) |
| C121—C125 | 1.360(13) |
| C122—N123 | 1.296(12) |
| C125—C126 | 1.490(14) |
| C126—F127 | 1.333(13) |
| C126—F128 | 1.328(11) |
| C126—F130 | 1.365(16) |
| C203—C204 | 1.334(18) |
| C204—C205 | 1.459(13) |
| C205—N206 | 1.368(11) |
| C207—N209 | 1.346(12) |
| C207—O208 | 1.213(10) |
| C210—C211 | 1.452(14) |
| C211—C212 | 1.311(16) |
| C212—C213 | 1.459(16) |
| C212—C215 | 1.557(14) |
| C213—C214 | 1.416(16) |
| C215—C217 | 1.436(16) |
| C215—F216 | 1.419(12) |
| C215—S218 | 1.880(11) |
| C221—C222 | 1.355(12) |
| C221—C225 | 1.405(13) |
| C222—N223 | 1.369(12) |
| C225—C226 | 1.545(16) |
| C296—F227 | 1.327(12) |
| C226—F228 | 1.339(13) |
| C226—F230 | 1.340(16) |
| C310—C311 | 1.513(17) |
| C311—C112 | 1.536(16) |
| F127—F130 | 1.07(3) |
| F128—F130 | 1.63(3) |
| F227—F230 | 1.34(4) |
| F228—F230 | 1.23(4) |
| N101—C105 | 1.263(10) |
| N101—O102 | 1.407(9) |
| N106—C107 | 1.352(10) |
| N109—C110 | 1.483(9) |
| N109—C114 | 1.449(11) |
| N109—C310 | 1.506(16) |
| N123—C129 | 1.467(14) |
| N123—N124 | 1.347(11) |
| N124—C125 | 1.315(13) |
| N201—C205 | 1.277(12) |
| N201—O202 | 1.422(9) |
| N206—C207 | 1.388(12) |
| N209—O210 | 1.419(11) |
| N209—C214 | 1.448(12) |
| N223—C229 | 1.419(14) |
| N223—N224 | 1.345(10) |

TABLE 5.2-continued

Bond Lengths (Ångstrom)

| Bond | Length (Å) |
|---|---|
| N224—C225 | 1.293(13) |
| O102—C103 | 1.278(12) |
| O202—C203 | 1.323(14) |
| S118—C121 | 1.763(10) |
| S118—O119 | 1.428(10) |
| S118—O120 | 1.418(9) |
| S218—C221 | 1.724(9) |
| S218—O219 | 1.419(6) |
| S218—O220 | 1.413(8) |

TABLE 5.3

Bond Angles(°)

| Atoms | Angle (°) |
|---|---|
| C103—C104—C105 | 106.4(10) |
| C103—O102—N101 | 107.6(7) |
| C104—C105—N106 | 131.3(9) |
| C105—N101—O102 | 104.5(7) |
| C107—N105—C105 | 121.4(6) |
| C107—N109—C110 | 119.4(7) |
| C107—N109—C114 | 116.4(6) |
| C107—N109—C310 | 120.6(12) |
| C110—C111—C112 | 112.1(8) |
| C110—N109—C310 | 37.3(14) |
| C111—C112—C311 | 26.2(12) |
| C112—C113—C114 | 114.0(8) |
| C112—C115—C117 | 114.5(3) |
| C112—C115—S118 | 112.1(7) |
| C113—C112—C111 | 112.9(8) |
| C113—C112—O115 | 115.5(8) |
| C113—C112—C311 | 96.0(14) |
| C114—N109—C110 | 114.7(7) |
| C114—N109—C310 | 122.5(12) |
| C115—C112—C111 | 116.3(8) |
| C115—C112—C311 | 110.9(13) |
| C117—C115—S118 | 115.0(7) |
| C121—C125—C125 | 131.2(9) |
| C121—S118—C115 | 106.7(5) |
| C122—C121—S118 | 123.4(7) |
| C122—N123—C129 | 128.0(9) |
| C122—N123—N124 | 111.4(9) |
| C125—C121—C122 | 107.5(9) |
| C125—C121—S118 | 129.1(8) |
| C125—N124—N123 | 106.5(7) |
| C126—F128—F130 | 53.9(9) |
| C126—F130—F128 | 51.8(9) |
| C203—C204—C205 | 100.8(10) |
| C203—O202—N201 | 105.2(8) |
| C205—N201—O202 | 107.5(7) |
| C205—N206—C207 | 124.9(7) |
| C207—N209—C210 | 124.0(8) |
| C207—N209—C214 | 115.2(7) |
| C210—N209—C214 | 120.8(8) |
| C211—C212—C213 | 119.7(10) |
| C211—C215—C212 | 122.5(10) |
| C212—C211—C210 | 123.9(10) |
| C212—C215—S218 | 107.2(8) |
| C213—C212—C215 | 112.7(11) |
| C213—C214—N209 | 118.6(8) |
| C214—C213—C212 | 119.4(10) |
| C217—C215—C212 | 120.7(10) |
| C217—C215—S218 | 109.7(8) |
| C221—C222—N223 | 106.5(7) |
| C221—C225—C226 | 123.8(10) |
| C221—S218—C215 | 105.9(4) |
| C222—C221—C225 | 104.3(8) |
| C222—C221—S218 | 122.4(6) |
| C222—N223—C229 | 129.2(9) |
| C225—C221—S218 | 133.3(7) |
| C225—N224—N223 | 104.9(7) |
| C226—F227—F230 | 60.3(11) |

TABLE 5.3-continued

Bond Angles(°)

| Atoms | Angle (°) |
|---|---|
| C225—F230—F227 | 59.3(12) |
| C310—C311—C112 | 122(2) |
| F116—C115—C112 | 107.3(7) |
| F116—C115—C117 | 104.5(9) |
| F116—C115—S118 | 101.9(5) |
| F127—C126—C125 | 108.7(11) |
| F127—C126—F130 | 46.7(13) |
| F127—F130—C126 | 65.1(11) |
| F127—F130—F128 | 112.0(16) |
| F128—C126—C125 | 110.4(9) |
| F128—C126—F127 | 116.0(11) |
| F123—C126—F130 | 74.3(15) |
| F130—C126—C125 | 107.1(14) |
| F130—F127—C126 | 68.2(11) |
| F216—C215—C212 | 109.5(8) |
| F216—C215—C217 | 108.5(11) |
| F216—C215—S218 | 98.9(6) |
| F227—C226—C225 | 110.5(11) |
| F227—C226—F228 | 111.6(12) |
| F227—C226—F230 | 60.4(8) |
| F228—C226—C225 | 104.8(11) |
| F228—C226—F230 | 54.5(17) |
| F228—F230—C226 | 62.7(12) |
| F228—F230—F227 | 118.3(17) |
| F230—C226—C225 | 105.8(16) |
| F230—F228—C226 | 62.8(12) |
| N101—C105—C104 | 11.4(9) |
| N101—C105—N106 | 117.1(7) |
| N106—C107—N109 | 117.2(6) |
| N109—C110—C111 | 113.3(7) |
| N109—C114—C113 | 114.8(7) |
| N109—C310—C311 | 108.5(19) |
| N123—C122—C121 | 106.1(8) |
| N124—C125—C121 | 108.3(8) |
| N124—C125—C126 | 120.5(8) |
| N124—N123—C129 | 120.5(8) |
| N201—C205—C204 | 111.3(9) |
| N201—C205—N206 | 119.9(7) |
| N206—C205—C204 | 128.7(10) |
| N209—C207—N206 | 115.1(7) |
| N209—C210—C211 | 116.7(9) |
| N224—C225—C221 | 112.1(9) |
| N224—C225—C226 | 123.1(9) |
| N224—N223—C222 | 111.3(7) |
| N224—N223—C229 | 119.3(9) |
| O102—C103—C104 | 109.6(9) |
| O108—C107—N106 | 123.4(7) |
| O108—C107—N109 | 119.2(8) |
| O119—S118—C115 | 106.1(5) |
| O119—S118—C121 | 107.3(5) |
| O120—S118—C115 | 104.7(6) |
| O120—S118—C121 | 109.7(5) |
| O120—S118—O119 | 121.3(7) |
| O202—C203—C204 | 114.5(9) |
| O208—C207—N206 | 119.7(9) |
| O208—C207—N209 | 125.2(9) |
| O219—S218—C215 | 108.1(5) |
| O210—S218—C221 | 107.9(4) |
| O220—S218—C215 | 107.1(5) |
| O220—S218—C221 | 109.4(4) |
| O220—S218—O219 | 119.5(5) |

TABLE 5.4

Hydrogen coordinates (×10$^4$) and isotropic displacements parameters (Å$^2$ × 10$^3$)

| Label | x | y | z | U(eq) |
|---|---|---|---|---|
| H106 | 6616.0 | 7373.0 | 6244.0 | 83.0 |
| H10B | 5157.0 | 9545.0 | 2849.0 | 130.0 |
| H10C | 7717.0 | 8041.0 | 3520.0 | 145.0 |
| H11A | 7987.0 | 4770.0 | 6548.0 | 73.0 |
| H11B | 7243.0 | 5862.0 | 7112.0 | 73.0 |
| H11C | 6523.0 | 4153.0 | 8183.0 | 73.0 |
| H11D | 9608.0 | 5314.0 | 8290.0 | 73.0 |
| H11E | 14197.0 | 4404.0 | 5730.0 | 106.0 |
| H11F | 13440.0 | 5466.0 | 7327.0 | 106.0 |
| H11G | 12894.0 | 6134.0 | 5726.0 | 95.0 |
| H11H | 11866.0 | 4972.0 | 5576.0 | 95.0 |
| H11I | 13514.0 | 4722.0 | 9116.0 | 179.0 |
| H11J | 13785.0 | 3493.0 | 9805.0 | 179.0 |
| H11K | 11548.0 | 4153.0 | 9692.0 | 179.0 |
| H12B | 15435.0 | 393.0 | 8785.0 | 117.0 |
| H12D | 17953.0 | −1128.0 | 9763.0 | 188.0 |
| H12E | 16752.0 | −1786.0 | 10707.0 | 188.0 |
| H12F | 16188.0 | −768.0 | 10826.0 | 188.0 |
| H206 | 12042.0 | −1058.0 | 6426.0 | 97.0 |
| H20B | 13743.0 | −3040.0 | 9826.0 | 146.0 |
| H20C | 10550.0 | −2047.0 | 9134.0 | 154.0 |
| H21E | 3754.0 | 2093.0 | 4030.0 | 192.0 |
| H21F | 3705.0 | 3364.0 | 3399.0 | 192.0 |
| H21G | 3498.0 | 3236.0 | 4572.0 | 192.0 |
| H22S | 3430.0 | 6106.0 | 389.10 | 106.0 |
| H22D | 1484.0 | 7565.0 | 1450.0 | 202.0 |
| H22E | 1684.0 | 8054.0 | 2466.0 | 202.0 |
| H22F | 304.0 | 6984.0 | 2433.0 | 202.0 |
| H31A | 7429.0 | 5689.0 | 7242.0 | 73.0 |
| H31B | 8594.0 | 6759.0 | 7508.0 | 73.0 |
| H31C | 10045.0 | 5215.0 | 8649.0 | 73.0 |

TABLE 5.5

Hydrogen bonds with bond lengths (Ångstroms) and angles (degress °)

| D—H...A | Distance (D—H) | Distance (H...A) | Distance (D...A) | Angle (D—H...A) |
|---|---|---|---|---|
| N106—H106...N201 | 0.8600 | 2.2400 | 3.065(10) | 159.00 |
| N206—H206...N101 | 0.8600 | 2.2800 | 3.105(10) | 161.00 |
| C103—H10B...N124 | 0.9300 | 2.5300 | 3.431(13) | 162.00 |
| C104—H10C...O108 | 0.9300 | 2.4100 | 2.837(14) | 108.00 |
| C110—H11A...O219 | 0.9700 | 2.4900 | 3.247(11) | 135.00 |
| C110—H11B...N106 | 0.9700 | 2.4900 | 2.828(11) | 100.00 |
| C111—H11C...O119 | 0.9700 | 2.5200 | 3.215(14) | 129.00 |
| C113—H11E...F116 | 0.9700 | 2.3200 | 2.710(12) | 103.00 |
| C122—H12B...O208 | 0.9300 | 2.5100 | 3.262(13) | 138.00 |
| C129—H12D...O208 | 0.9600 | 2.3900 | 3.285(14) | 155.00 |
| C203—H20B...N224 | 0.9300 | 2.5000 | 3.421(14) | 172.00 |
| C234—H20C...O208 | 0.9300 | 2.3900 | 2.788(15) | 106.00 |
| C222—H22B...O108 | 0.9300 | 2.5200 | 3.287(12) | 140.00 |

Representation of the crystal structures are given in FIGS. 3 and 4. The figures were generated with the PLATON program (Spek, A. L. *J. Appl. Cryst.* 2003, 36, 7-13).

The I-491 Form A molecule contains a sulfur atom that allows the absolute configuration to be determined, making used of the resolution from single crystal data. The Flack x parameter is calculated based on the anomalous scattering method (Flack, H. D.; Bernadinelli, G. *Acta. Cryst.* 1999, *A*55, 908-915) It gives the absolute structure, providing a sufficient estimate standard deviation is reached. According to the theory, the expected values of the Flack x parameter are 0 for correct (within 3 esd.s) and +1 for inverted absolute structure. The results considering the configuration C115: R; C215: R is 0.03 (4), despite poor esd's, are sufficient to prove the absolute configuration of I-491 Form A.

A simulated diffraction pattern (FIG. 5) was produced from the room temperature experimentally determined crystal structure of Form A. An experimental powder diffraction pattern can be compared to this theoretical pattern to demonstrate the nature of the crystalline structure. Minor differences (if any) can be explained by preferential orientations in the powder.

The crystal structure of I-491 Form A was determined by X-ray diffraction on a single crystal, allowing the generation of a reference powder pattern. Even if the structure is fully solved, this phase is of rather poor quality and thus should correspond to a kinetic form; this is confirmed by rather large peaks found in the synchrotron powder pattern.

Example 6. Characterization of Form B

A representation XRPD pattern for Form B appears in FIG. 6B.

The DSC thermogram (parameters: equilibrate at 0.00° C., ramp 10.00° C./min to 250.00° C.) shows a first endothermic event at 178° C. (5.5 J/g) associated with the solid-solid transition of form B to form A, followed by a second endothermic event at 193° C. (80 J/g) corresponding to the melting of form A (FIG. 7).

A continuous loss of mass of 0.6% is observed between room temperature and 150° C. by TGA (FIG. 7). The DVS isotherm of Form B demonstrates the nonhygroscopic character of Form B.

Synchrotron XRPD & Single Crystal

A powder sample of I-491 was sealed into a 0.8 mm thin walled borosilicate glass capillary and then analyzed by high resolution synchrotron XRD, at the European Synchrotron Radiation Facility (beam line ID22, ESRF Grenoble) (Fitch, A. N. *Mater. Sci. Forum* 1996, 228-231; ESRF Experiment register: in971). Powder diffraction data (0.5°<2θ<40°) were recorded at room temperature at the Beam Line ID31 in transmission mode with a wavelength of 0.8 Å (15.5 KeV) and a step size of 0.003°. In order to exclude any degradation effect due to beam exposure and to enhance counting statistics, the measurements were made using a device that enabled horizontal translation of the capillary, such that each individual data set was obtained only from previously unexposed area of the powder (original recording). After normalization of the profiles and smoothing of the background, 45 non-overlapping peaks located in the low to medium angle region of the resulting powder diagram were used for cell determination. The synchrotron powder XRD pattern of I-491 Form B, represented in FIG. 6A, could be indexed (Boultif A.; Louër, D. *J. Appl. Cryst.* 1991, 24, 987-993) in the triclinic unit cell whose parameters are given below, and refined by the Pawley method using TOPAS software (TOPAS 4.2: Coelho, A. A. *TOPAS Academic User Manual*, Brisbane, Australia, 2007; Coelho A. A. *J. Appl. Crystallogr.* 2003, 36, 86-95) to a final Rwp value of 9.55%.

Twinned crystals grown in acetonitrile/water mixtures were suitable for X-rays diffraction studies.

A single crystal selected by observation under a binocular microscope was mounted on the goniometric head of a Bruker Instrument APEX DUO diffractometer (Bruker AXS (2011). APEX2 suite V 2011.2-0. Madison, Wisconsin, U.S.A.). Intensities were collected at room temperature (T=293 K), with the use of a micro source Cu Kα radiation (ImuS, λ=1.54178 Å). Systematic investigation of the diffraction nodes indicates that the crystal belongs to the triclinic system, with a primitive Bravais lattice. The room temperature unit cell parameters are: a (Å)=11.93, b (Å)=13.24, c (Å)=13.51, α(°)=65.40, β(°)=80.08, and γ(°)=89.18.

In view of the number of atoms in the molecule of I-491 Form B and of the unit cell volume, it is concluded that this unit cell must contain 4 molecules having the formula C16 H18 F3 N5 O4 S which is equivalent to a calculated density of 1.516. The number of reflections collected was 23771, of which 10282 were unique.

Based on the statistical distribution of the intensities, a non-centrosymmetric structure is deduced.

The structure was solved by direct methods and refined on $F^2$ by full least squares methods with SHELXTL (Sheldrick, G. M. *Acta Crystallogr. Sect. A* 2008, *A*64, 112-122). All non-hydrogen atoms were refined with anisotropic displacement parameters; a riding model was used for hydrogen atoms. Final agreement values are R1=0.0512 (observed reflections) and wR2=0.1445 (all data) for 10282 reflections and 1073 parameters, with a goodness of fit of 1.030.

Figure 9:
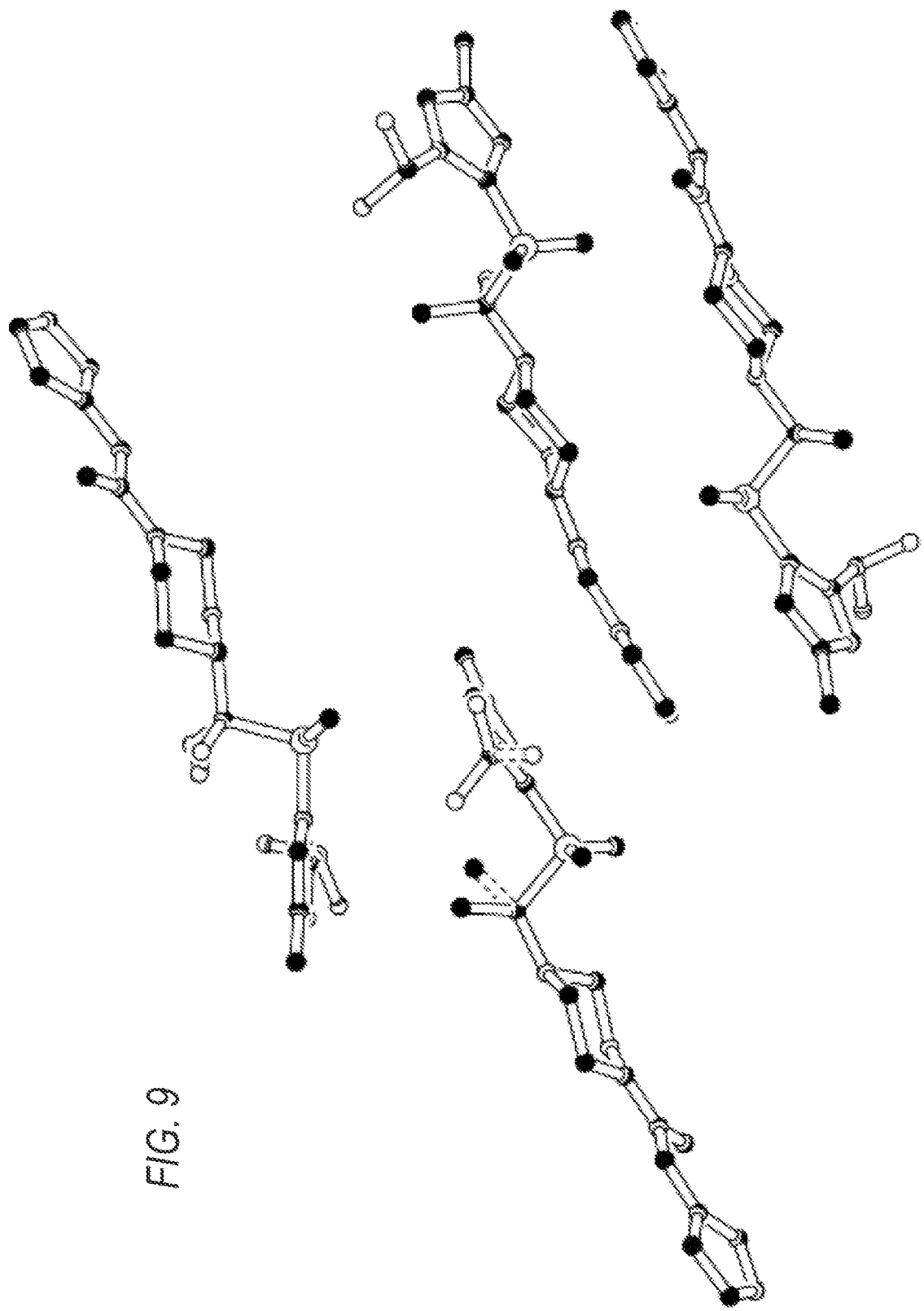
FIG. 9 shows a representation of the crystal structure of Form B viewing the molecular packing down the (011) plane with disorder showed by dotted lines.

The compound crystallizes in the space group P 1 (FIG. 8), the asymmetric unit of the crystal is made up of 4 molecules of I-491 Form B, thus 4 formulae are present in the unit cell (FIG. 9). This rather rare feature was also observed with polymorphs Form C and Form D, whereas kinetic Form A is made up of 2 independent molecules. The asymmetric cell contains: 4 [C16 H20 F3 N5 O4 S]. Several $CF_2$ groups and one methyl are disordered in the solid state. Examination of the molecular structure confirms that all bond angles and lengths stand in the standard range values.

Crystal data, X-rays experimental parameters and structure refinements are given in Table 6. Table 6.1 lists the positional parameters for all independent non-hydrogen atoms together with their equivalent isotropic displacement parameters. Bond lengths and angles are listed Table 6.2 and 6.3. Hydrogen positions are reported Table 6.4. Table 6.5 lists all the hydrogen bonds.

TABLE 6

| Identification code | Form B |
|---|---|
| Chemical formula | C16 H19.75 F3 N5 O4 S |
| Molecular weight | 435.18 |
| Temperature | 113(2) |
| Wavelength | 1.54178 |
| Crystal system; space group | Triclinic; P 1 |
| Unit cell dimensions | a = 11.9264(3) Å; α = 65.3989(14) ° |
|  | b = 13.2395(4) Å; β = 80.0842(15) ° |
|  | c = 13.5114(4) Å; γ = 89.1777(15) ° |
| Volume | 1906.89(9) Å$^3$ |
| Z, Calculated density | 4, 1.516 Mg/m$^3$ |
| Absorption coefficient | 2.097 1/mm |
| F(000) | 903 |

TABLE 6-continued

| Identification code | Form B |
|---|---|
| Theta range for data collection | 3.66° to 63.25° |
| Limiting indices | −13 <= h <= 13; −14 <= k <= 15; −15 <= l <= 15 |
| Reflection collected/unique | 23771/10282 [R(int) = 0.0454] |
| Completeness to theta max | 97.8% |
| Refinement method | Full-matrix least-square on $F^2$ |
| Data/restraints/parameters | 10282/829/1073 |
| Goodness of fit on $F^2$ | 1.030 |
| Final R indices [I > 2sigma(I)] | R1 = 0.0512; wR2 = 0.1329 |
| Final R indices [all data] | R1 = 0.0626; wR2 = 0.1445 |
| Absolute structure parameter | 0.011(14) |
| Largest diff peak and hole | 0.444 and −0.224 e/Å$^3$ |

TABLE 6.1

Atomic coordinates (×10$^4$) and equivalent isotropic displacements parameters (Å$^2$ × 10$^3$) for Form B. U(eq) is defined as one third of the trace of the orthogonalized U$_{ij}$ tensor

| Label | x | y | z | U(eq) |
|---|---|---|---|---|
| C103 | 11921(3) | 829(2) | 5961(3) | 62.0(9) |
| C104 | 10940(3) | 1046(2) | 6479(3) | 58.0(8) |
| C105 | 10552(2) | 1973(2) | 5629(2) | 48.9(7) |
| C107 | 8783(2) | 2308(2) | 6613(2) | 49.5(7) |
| C110 | 6989(3) | 2662(3) | 7489(3) | 67.7(1.0) |
| C111 | 6548(3) | 3659(3) | 7659(2) | 72.9(1.1) |
| C112 | 6151(2) | 4489(2) | 6628(2) | 56.6(8) |
| C113 | 7114(3) | 4802(3) | 5645(2) | 60.3(9) |
| C114 | 7581(3) | 3787(2) | 5517(2) | 63.8(9) |
| C115 | 5661(3) | 5497(2) | 6796(2) | 61.8(9) |
| C117 | 6476(3) | 6524(3) | 6430(3) | 80.5(1.0) |
| C121 | 3748(2) | 6808(2) | 6850(2) | 52.7(8) |
| C122 | 3020(3) | 6472(2) | 7639(3) | 57.5(8) |
| C125 | 3804(2) | 7975(2) | 6216(2) | 50.9(7) |
| C126 | 4425(3) | 8800(3) | 5118(3) | 69.6(1.0) |
| C129 | 1903(3) | 7460(3) | 8692(3) | 76.2(1.1) |
| C203 | −268(3) | 6327(3) | 2272(3) | 67.2(1.0) |
| C204 | 759(3) | 6128(2) | 1853(2) | 59.3(8) |
| C205 | 864(3) | 4994(2) | 2536(2) | 46.1(7) |
| C207 | 2682(2) | 4627(2) | 1661(2) | 45.4(7) |
| C210 | 2938(3) | 2641(2) | 2045(3) | 55.0(8) |
| C211 | 3879(2) | 1845(2) | 2230(2) | 49.8(7) |
| C212 | 4781(2) | 2186.1(1.9) | 1187(2) | 42.5(6) |
| C213 | 5249(3) | 3378(2) | 859(3) | 58.2(8) |
| C214 | 4284(3) | 4147(2) | 857(3) | 61.9(9) |
| C215 | 5740(2) | 1400(2) | 1260(2) | 42.3(6) |
| C217 | 6368(3) | 1120(2) | 2201(3) | 60.0(8) |
| C221 | 6430(3) | −520(2) | 918(2) | 51.9(7) |
| C222 | 7019(3) | −309(2) | −124(2) | 63.8(9) |
| C225 | 6997(3) | −1390(2) | 1640(2) | 52.4(8) |
| C226 | 6710(3) | −1982(3) | 2870(2) | 65.8(9) |
| C229 | 8697(4) | −1115(2) | −866(2) | 101.2(1.5) |
| C303 | −6106(3) | 13417(2) | 4960(3) | 63.8(9) |
| C304 | −5195(3) | 13126(3) | 4440(3) | 64.0(9) |
| C305 | −4863(2) | 12164(2) | 5272(2) | 45.6(7) |
| C307 | −3072(2) | 11808(2) | 4352(2) | 43.1(7) |
| C310 | −2102(3) | 10165(2) | 5446(2) | 58.7(9) |
| C311 | −1392(3) | 9265(2) | 5259(2) | 56.7(8) |
| C312 | −274(2) | 9779(2) | 4478(2) | 50.7(7) |
| C313 | −544(3) | 10601(2) | 3394(2) | 53.9(8) |
| C314 | −1201(2) | 11516(2) | 3563(2) | 52.2(8) |
| C315 | 626(2) | 8963(2) | 4405(2) | 49.8(8) |
| C317 | 1016(3) | 8316(3) | 5470(3) | 60(1) |
| C321 | 1367(3) | 7248(2) | 3761(2) | 47.8(7) |
| C322 | 2297(3) | 7589(2) | 2903(2) | 49.6(7) |
| C325 | 1597(2) | 6143(2) | 4445(2) | 50.8(7) |
| C326 | 928(3) | 5334(3) | 5505(3) | 73.3(1.1) |
| C329 | 4057(3) | 6718(3) | 2428(3) | 66.3(9) |
| C331 | 1288(17) | 8043(15) | 4920(20) | 60(1) |
| C403 | 5844(4) | −2278(3) | −1304(3) | 85.9(1.2) |
| C404 | 4834(3) | −2031(3) | −873(3) | 69.5(1.0) |
| C405 | 4767(3) | −894(2) | −1568(2) | 48.4(7) |
| C407 | 3068(3) | −397(2) | −617(2) | 48.5(7) |

TABLE 6.1-continued

Atomic coordinates (×10$^4$) and equivalent isotropic displacements parameters (Å$^2$ × 10$^3$) for Form B. U(eq) is defined as one third of the trace of the orthogonalized U$_{ij}$ tensor

| Label | x | y | z | U(eq) |
|---|---|---|---|---|
| C410 | 1704(4) | 317(3) | 388(3) | 90.2(1.3) |
| C411 | 727(4) | 1073(3) | 246(3) | 99.4(1.4) |
| C412 | 1142(3) | 2274(2) | −478(2) | 58.1(8) |
| C413 | 1756(3) | 2340(3) | −1553(3) | 78.9(1.2) |
| C414 | 2734(3) | 1606(3) | −1409(3) | 82.1(1.2) |
| C415 | 160(3) | 3065(2) | −558(2) | 54.9(8) |
| C417 | −1020(3) | 2560(3) | −281(5) | 109.2(1.4) |
| C421 | −809(2) | 4595(2) | 322(2) | 44.0(7) |
| C422 | −1532(3) | 4438(2) | 1278(2) | 50.0(8) |
| C425 | −1173(3) | 5535(2) | −498(2) | 52.0(8) |
| C426 | −735(3) | 6094(3) | −1715(3) | 66.4(1.0) |
| C429 | −3198(3) | 5428(3) | 1769(3) | 74.4(1.1) |
| F116 | 5194(2) | 5168.2(1.7) | 7907.4(1.5) | 82.1(7) |
| F127 | 3996(2) | 9798.9(1.8) | 4852(2) | 114.5(1.0) |
| F128 | 5508(2) | 8963(2) | 5149(3) | 136.7(1.3) |
| F130 | 5618(15) | 6187(9) | 7265(9) | 82.1(7) |
| F216 | 6530.0(1.4) | 1874.0(1.3) | 267.2(1.3) | 61.3(5) |
| F227 | 7111(3) | −2978.9(1.8) | 3197.2(1.8) | 123.7(1.1) |
| F228 | 7163(3) | −1406(2) | 3331.5(1.8) | 106.9(9) |
| F316 | 1570.6(1.5) | 9575.2(1.3) | 3602.9(1.7) | 71.4(6) |
| F327 | 1236(3) | 4308(2) | 5743(3) | 92.4(1.1) |
| F328 | 931(3) | 5670(2) | 6295.5(1.9) | 105.5(1.1) |
| F330 | 48(6) | 4990(5) | 5528(6) | 116(2) |
| F416 | 310(2) | 3914.7(1.7) | −1626.7(1.4) | 97.8(7) |
| F427 | −757(4) | 7166(2) | −2080(2) | 163.5(1.5) |
| F428 | −1351(3) | 5777(4) | −2263(2) | 147.6(1.4) |
| N101 | 11243(2) | 2246(2) | 4686(2) | 62.7(7) |
| N106 | 9585(2) | 2549.4(1.7) | 5658.6(1.8) | 50.6(6) |
| N109 | 7910(2) | 2985.5(1.8) | 6534.6(1.9) | 55.0(7) |
| N123 | 2693.8(1.9) | 7384.3(1.8) | 7779.9(1.8) | 51.9(6) |
| N124 | 3149(2) | 8320.8(1.7) | 6869.4(1.8) | 49.8(6) |
| N201 | −43(2) | 4559(2) | 3320(2) | 65.3(8) |
| N206 | 1743(2) | 4311.8(1.7) | 2498.4(1.8) | 52.1(6) |
| N209 | 3372(2) | 3809.6(1.7) | 1634.1(1.8) | 50.2(6) |
| N223 | 7848(3) | −1006.2(1.9) | 9(2) | 68.3(8) |
| N224 | 7859(2) | −1670.1(1.9) | 1077(2) | 60.6(7) |
| N301 | −5552(2) | 11892.3(1.9) | 6213(2) | 59.5(7) |
| N306 | −3960(2) | 11503.8(1.7) | 5237.8(1.8) | 47.4(6) |
| N309 | −2233.2(1.9) | 11086.6(1.6) | 4421.9(1.7) | 45.4(6) |
| N323 | 2983(2) | 6756.8(1.7) | 3085.8(1.8) | 48.7(6) |
| N324 | 2565(2) | 5847.0(1.8) | 4020.9(1.9) | 51.8(6) |
| N401 | 5658(2) | −504(2) | −2362(2) | 69.6(8) |
| N406 | 3920(2) | −181.4(1.7) | −1537.5(1.7) | 48.9(6) |
| N409 | 2407(2) | 454.5(1.7) | −654.3(1.7) | 47.8(6) |
| N423 | −2277(2) | 5224.0(1.8) | 1022(2) | 55.5(7) |
| N424 | −2082(2) | 5913(2) | −66(2) | 59.9(7) |
| O102 | 12118.0(1.7) | 1518.2(1.8) | 4896.1(1.8) | 65.8(6) |
| O108 | 8878(2) | 1525.3(1.8) | 7484.1(1.8) | 75.2(7) |
| O119 | 4815(2) | 6496.5(1.8) | 4975.1(1.7) | 66.5(6) |
| O120 | 3675(2) | 4937.8(1.8) | 6513(2) | 79.6(7) |
| O202 | −784.3(1.9) | 5428.7(1.7) | 3136.4(1.9) | 71.8(7) |
| O208 | 2905(2) | 5604.7(1.5) | 1018.8(1.7) | 63.7(6) |
| O219 | 4677(2) | 491(2) | 256(2) | 100.8(7) |
| O220 | 4611(2) | −580.8(1.7) | 2279(2) | 81.4(8) |
| O302 | −6359.9(1.9) | 12704.4(1.6) | 6016.9(1.7) | 67.9(7) |
| O308 | −3055.1(1.8) | 12696.2(1.5) | 3523.9(1.5) | 57.0(6) |
| O319 | 11(2) | 8654.2(1.7) | 2753.4(1.7) | 66.5(6) |
| O320 | −706.5(1.7) | 7270.1(1.7) | 4662.3(1.9) | 65.4(7) |
| O402 | 6347(2) | −1418(2) | −2168(2) | 94.3(9) |
| O408 | 2945(2) | −1305.1(1.6) | 164.3(1.7) | 70.1(7) |
| O419 | 1353.3(1.9) | 4558.1(1.7) | −288(2) | 74.7(8) |
| O420 | 346.6(1.9) | 3001.6(1.7) | 1364.7(1.6) | 62.5(6) |
| S118 | 4411.3(6) | 5904.4(5) | 6122.6(6) | 53.9(18) |
| S218 | 5223.3(6) | 131.2(5) | 1201.3(6) | 58.02(18) |
| S318 | 189.4(6) | 8002.7(5) | 3840.3(5) | 48.79(17) |
| S418 | 375.2(5) | 3822.5(5) | 266.4(5) | 44.68(16) |

TABLE 6.2

Bond lengths (Ångstrom)

| Bond | Length (Å) |
|---|---|
| C103—C104 | 1.348(4) |
| C104—C105 | 1.426(4) |
| C105—N106 | 1.377(4) |
| C107—N109 | 1.353(4) |
| C107—O108 | 1.224(3) |
| C110—C111 | 1.504(5) |
| C111—C112 | 1.520(4) |
| C112—C113 | 1.511(4) |
| C112—C115 | 1.536(4) |
| C113—C114 | 1.512(4) |
| C115—C117 | 1.533(5) |
| C115—F116 | 1.388(3) |
| C115—F130 | 1.306(12) |
| C115—S118 | 1.837(4) |
| C121—C122 | 1.361(4) |
| C121—C125 | 1.404(4) |
| C122—N123 | 1.342(4) |
| C125—C126 | 1.496(4) |
| C126—F127 | 1.338(4) |
| C126—F128 | 1.323(5) |
| C203—C204 | 1.329(5) |
| C204—C205 | 1.415(4) |
| C205—N206 | 1.382(4) |
| C207—N209 | 1.359(3) |
| C207—O208 | 1.222(3) |
| C210—C211 | 1.509(4) |
| C211—C212 | 1.520(3) |
| C212—C213 | 1.535(4) |
| C212—C215 | 1.531(3) |
| C213—C214 | 1.510(4) |
| C215—C217 | 1.491(4) |
| C215—F216 | 1.396(3) |
| C215—S218 | 1.838(3) |
| C221—C222 | 1.376(4) |
| C221—C225 | 1.415(4) |
| C222—N223 | 1.327(4) |
| C225—C226 | 1.490(4) |
| C226—F227 | 1.317(4) |
| C226—F228 | 1.337(5) |
| C303—C304 | 1.332(5) |
| C304—C305 | 1.410(4) |
| C305—N306 | 1.384(3) |
| C307—N309 | 1.361(3) |
| C307—O308 | 1.238(3) |
| C310—C311 | 1.533(4) |
| C311—C312 | 1.517(4) |
| C312—C313 | 1.502(4) |
| C312—C315 | 1.533(4) |
| C313—C314 | 1.509(4) |
| C315—C317 | 1.488(4) |
| C315—C331 | 1.432(15) |
| C315—F316 | 1.405(3) |
| C315—S318 | 1.852(3) |
| C321—C322 | 1.384(4) |
| C321—C325 | 1.421(4) |
| C322—N323 | 1.327(4) |
| C325—C326 | 1.480(4) |
| C326—F327 | 1.320(4) |
| C326—F328 | 1.318(5) |
| C326—F330 | 1.140(8) |
| C403—C404 | 1.343(5) |
| C404—C405 | 1.415(4) |
| C405—N406 | 1.379(4) |
| C407—N409 | 1.370(4) |
| C407—O408 | 1.215(3) |
| C410—C411 | 1.510(5) |
| C411—C412 | 1.513(5) |
| C412—C413 | 1.477(5) |
| C412—C415 | 1.547(4) |
| C413—C414 | 1.494(5) |
| C415—C417 | 1.484(5) |
| C415—F416 | 1.395(3) |
| C415—S418 | 1.831(3) |
| C421—C422 | 1.361(4) |
| C421—C425 | 1.403(4) |
| C422—N423 | 1.331(4) |

TABLE 6.2-continued

Bond lengths (Ångstrom)

| Bond | Length (Å) |
|---|---|
| C425—C426 | 1.492(4) |
| C426—F427 | 1.296(4) |
| C426—F428 | 1.311(6) |
| F327—F330 | 1.671(8) |
| N101—C105 | 1.303(4) |
| N101—O102 | 1.394(3) |
| N106—C107 | 1.386(3) |
| N109—C110 | 1.456(4) |
| N109—C114 | 1.459(4) |
| N123—C129 | 1.455(4) |
| N123—N124 | 1.354(3) |
| N124—C125 | 1.319(4) |
| N201—C205 | 1.319(3) |
| N201—O202 | 1.406(3) |
| N206—C207 | 1.376(3) |
| N209—C210 | 1.476(3) |
| N209—C214 | 1.467(3) |
| N223—C229 | 1.473(5) |
| N223—N224 | 1.343(3) |
| N224—C225 | 1.315(4) |
| N301—C305 | 1.300(3) |
| N301—O302 | 1.406(3) |
| N306—C307 | 1.375(3) |
| N309—C310 | 1.447(3) |
| N309—C314 | 1.471(3) |
| N323—C329 | 1.441(4) |
| N323—N324 | 1.353(3) |
| N324—C325 | 1.327(4) |
| N401—C405 | 1.307(4) |
| N401—O402 | 1.413(3) |
| N406—C407 | 1.378(3) |
| N409—C410 | 1.451(4) |
| N409—C414 | 1.450(4) |
| N423—C429 | 1.460(4) |
| N423—N424 | 1.348(3) |
| N424—C425 | 1.333(4) |
| O102—C103 | 1.325(4) |
| O202—C203 | 1.332(4) |
| O302—C303 | 1.320(4) |
| O402—C403 | 1.312(4) |
| S118—C121 | 1.747(3) |
| S118—O119 | 1.410(2) |
| S118—O120 | 1.414(2) |
| S218—C221 | 1.735(3) |
| S218—O219 | 1.422(3) |
| S218—O220 | 1.433(2) |
| S318—C321 | 1.726(3) |
| S318—O319 | 1.412(2) |
| S318—O320 | 1.428(2) |
| S418—C421 | 1.741(3) |
| S418—O419 | 1.412(2) |
| S418—O420 | 1.4231(19) |

TABLE 6.3

Bond angles (°)

| Atoms | Angle (°) |
|---|---|
| C103—C104—C105 | 104.0(3) |
| C103—O102—N101 | 108.8(2) |
| C105—N101—O102 | 106.3(2) |
| C105—N106—C107 | 123.2(2) |
| C107—N109—C110 | 117.3(2) |
| C107—N109—C114 | 126.6(2) |
| C110—C111—C112 | 110.7(3) |
| C110—N109—C114 | 112.8(2) |
| C111—C112—C115 | 111.6(3) |
| C112—C113—C114 | 111.7(2) |
| C112—C115—S118 | 109.2(2) |
| C113—C112—C111 | 109.4(3) |
| C113—C112—C115 | 113.4(2) |
| C117—C115—C112 | 117.3(3) |

TABLE 6.3-continued

| Bond angles (°) | |
|---|---|
| Atoms | Angle (°) |
| C117—C115—S118 | 109.5(2) |
| C121—C125—C126 | 128.6(3) |
| C121—S118—C115 | 104.25(15) |
| C122—C121—C125 | 104.5(3) |
| C122—C121—S118 | 124.3(2) |
| C122—N123—C129 | 128.7(2) |
| C122—N123—N124 | 111.0(2) |
| C125—C121—S118 | 131.2(2) |
| C125—N124—N123 | 105.4(2) |
| C203—C204—C205 | 103.3(2) |
| C203—O202—N201 | 108.0(2) |
| C204—C203—O202 | 112.0(3) |
| C205—N201—O202 | 104.7(2) |
| O207—N206—O205 | 123.5(2) |
| C207—N209—C210 | 122.3(2) |
| C207—N209—C214 | 115.0(2) |
| C210—C211—C212 | 110.7(2) |
| C211—C212—C213 | 108.5(2) |
| C211—C212—C215 | 115.20(19) |
| C212—C215—S218 | 109.47(18) |
| C214—C213—C212 | 109.2(2) |
| C214—N209—C210 | 112.8(2) |
| C215—C212—C213 | 111.1(2) |
| C217—C215—C212 | 117.2(2) |
| C217—C215—S218 | 111.00(18) |
| C221—C225—C223 | 128.4(3) |
| C221—S218—C215 | 105.78(13) |
| C222—C221—C225 | 104.5(3) |
| C222—C221—S218 | 125.1(2) |
| C222—N223—C229 | 127.2(3) |
| C222—N223—N224 | 113.0(2) |
| C225—C221—S218 | 130.4(2) |
| C225—N224—N223 | 105.2(2) |
| C303—C304—C305 | 104.3(2) |
| C303—O302—N301 | 108.3(2) |
| C305—N301—O302 | 105.5(2) |
| C307—N306—C305 | 122.9(2) |
| C307—N309—C310 | 123.1(2) |
| C307—N309—C314 | 115.91(18) |
| C310—N309—C314 | 116.4(2) |
| C311—C312—C315 | 116.0(2) |
| C312—C311—C310 | 110.4(2) |
| C312—C313—C314 | 109.8(3) |
| C312—C315—S318 | 113.7(2) |
| C313—C312—C311 | 108.0(2) |
| C313—C312—C315 | 115.9(2) |
| C317—C315—C312 | 113.5(3) |
| C317—C315—S318 | 109.6(2) |
| C321—C325—C326 | 129.6(3) |
| C321—S318—C315 | 104.53(14) |
| C322—C321—C325 | 103.2(2) |
| C322—C321—S318 | 125.47(19) |
| C322—N323—C329 | 128.7(2) |
| C322—N323—N324 | 112.2(2) |
| C325—C321—S318 | 131.1(2) |
| C325—N324—N323 | 105.0(2) |
| C326—F327—F330 | 42.8(3) |
| C326—F330—F327 | 51.9(4) |
| C331—C315—C312 | 150.7(11) |
| C331—C315—C317 | 38.2(12) |
| C331—C315—S318 | 80.4(12) |
| C403—C404—C405 | 103.4(3) |
| C403—C402—N401 | 108.7(2) |
| C405—N401—O402 | 104.6(2) |
| C407—N406—C405 | 123.0(2) |
| C407—N409—C410 | 115.9(2) |
| C407—N409—C414 | 122.6(2) |
| C410—C411—C412 | 111.3(3) |
| C411—C412—C415 | 111.6(3) |
| C412—C413—C414 | 111.4(3) |
| C412—C415—S418 | 107.0(2) |
| C413—C412—C411 | 108.1(3) |
| C413—C412—C415 | 114.7(2) |
| C414—N409—C410 | 113.8(3) |
| C417—C415—C412 | 117.0(3) |
| C417—C415—S418 | 112.6(3) |
| C421—C425—C426 | 130.2(3) |
| C421—S418—C415 | 107.68(14) |
| C422—C421—C425 | 105.1(2) |
| C422—C421—S418 | 123.6(2) |
| C422—N423—C429 | 128.0(2) |
| C422—N423—N424 | 112.4(2) |
| C425—C421—S418 | 131.0(2) |
| C425—N424—N423 | 104.7(2) |
| F116—C115—C112 | 109.1(2) |
| F116—C115—C117 | 107.9(3) |
| F116—C115—S118 | 102.8(2) |
| F127—C126—C125 | 110.7(3) |
| F123—C126—C125 | 111.2(3) |
| F128—C126—F127 | 105.0(3) |
| F130—C115—C112 | 151.1(8) |
| F130—C115—C117 | 54.2(7) |
| F130—C115—F116 | 58.2(5) |
| F130—C115—S118 | 99.3(8) |
| F216—C215—C212 | 107.47(18) |
| F216—C215—C217 | 109.0(2) |
| F216—C215—S218 | 101.48(17) |
| F227—C226—C225 | 109.7(3) |
| F227—C226—F228 | 109.5(3) |
| F22S—C226—C225 | 110.2(3) |
| F316—C315—C312 | 108.1(2) |
| F316—C315—C317 | 108.8(2) |
| F316—C315—C331 | 92.7(9) |
| F315—C315—S318 | 102.3(2) |
| F327—C326—C325 | 111.8(3) |
| F328—C326—C325 | 110.6(3) |
| F328—C326—F327 | 114.9(3) |
| F330—C326—C325 | 119.9(5) |
| F330—C326—F327 | 85.2(5) |
| F330—C326—F328 | 112.3(5) |
| F416—C415—C412 | 109.4(2) |
| F416—C415—C417 | 107.8(3) |
| F416—C415—S418 | 102.1(2) |
| F427—C426—C425 | 111.1(3) |
| F427—C426—F428 | 107.6(4) |
| F428—C426—C425 | 111.4(3) |
| N101—C105—C104 | 110.5(2) |
| N101—C105—N106 | 118.7(2) |
| N106—C105—C104 | 130.7(2) |
| N109—C107—N106 | 116.8(2) |
| N109—C110—C111 | 111.4(2) |
| N109—C114—C113 | 111.8(3) |
| N123—C122—C121 | 107.9(2) |
| N124—C125—C121 | 111.1(2) |
| N124—C125—C126 | 120.1(2) |
| N124—N123—C129 | 120.2(2) |
| N201—C205—C204 | 111.9(2) |
| N201—C205—N206 | 117.7(2) |
| N206—C205—C204 | 130.4(2) |
| N209—C207—N206 | 116.5(2) |
| N209—C210—C211 | 112.5(2) |
| N209—C214—C213 | 111.9(2) |
| N223—C222—C221 | 106.6(3) |
| N224—C225—C221 | 110.7(2) |
| N224—C225—C226 | 120.8(3) |
| N224—N223—C229 | 119.8(3) |
| N301—C305—C304 | 111.1(2) |
| N301—C305—N306 | 117.8(2) |
| N306—C305—C304 | 131.1(2) |
| N309—C307—N306 | 117.2(2) |
| N309—C310—C311 | 112.7(2) |
| N309—C314—C313 | 112.6(2) |
| N323—C322—C321 | 108.2(2) |
| N324—C325—C321 | 111.4(2) |
| N324—C325—C326 | 118.9(2) |
| N324—N323—C329 | 119.1(2) |
| N401—C405—C404 | 111.9(3) |
| N401—C405—N406 | 117.9(2) |
| N406—C405—C404 | 130.2(3) |
| N409—C407—N406 | 116.2(2) |
| N408—C410—C411 | 113.1(3) |
| N409—C414—C413 | 113.4(3) |

TABLE 6.3-continued

Bond angles (°)

| Atoms | Angle (°) |
|---|---|
| N423—C422—C421 | 107.2(2) |
| N424—C425—C421 | 110.6(2) |
| N424—C425—C426 | 119.1(3) |
| N424—N423—C429 | 119.5(2) |
| O102—C103—C104 | 110.4(3) |
| O108—C107—N106 | 121.0(3) |
| O108—C107—N109 | 122.2(2) |
| O119—S118—C115 | 107.52(14) |
| O119—S118—C121 | 109.34(13) |
| O119—S118—O120 | 119.64(17) |
| O120—S118—C115 | 107.15(15) |
| O120—S118—C121 | 107.86(14) |
| O208—C207—N206 | 120.9(2) |
| O208—C207—N209 | 122.5(2) |
| O219—S218—C215 | 106.31(13) |
| O219—S218—C221 | 107.44(16) |
| O219—S218—O220 | 120.37(17) |
| O220—S218—C215 | 108.06(14) |
| O220—S218—C221 | 108.01(13) |
| O302—C303—C304 | 110.8(3) |
| O308—C307—N306 | 120.8(2) |
| O308—C307—N309 | 122.0(2) |
| O319—S318—C315 | 107.69(13) |
| O319—S318—C321 | 108.22(13) |
| O319—S318—O320 | 120.68(15) |
| O320—S318—C315 | 106.01(14) |
| O329—S316—O321 | 108.57(12) |
| O402—C403—C404 | 111.4(3) |
| O408—C407—N406 | 121.7(3) |
| O408—C407—N409 | 122.1(2) |
| O419—S418—C415 | 107.83(15) |
| O419—S418—C421 | 109.03(13) |
| O419—S418—O420 | 1193.8(16) |
| O420—S418—C415 | 106.15(13) |
| O420—S418—C421 | 106.25(12) |

TABLE 6.4

Hydrogen coordinates (×10⁴) and isotropic displacements parameters (Å × 10²)

| Label | x | y | z | U(eq) |
|---|---|---|---|---|
| H10B | 12404.0 | 262.0 | 6311.0 | 74.0 |
| H10C | 10589.0 | 668.0 | 7235.0 | 70.0 |
| H10D | 9471.0 | 3098.0 | 5041.0 | 61.0 |
| H11A | 7268.0 | 2146.0 | 8160.0 | 81.0 |
| H11B | 6358.0 | 2264.0 | 7379.0 | 81.0 |
| H11C | 7160.0 | 4021.0 | 7833.0 | 87.0 |
| H11D | 5905.0 | 3416.0 | 8294.0 | 87.0 |
| H11E | 5522.0 | 4103.0 | 6488.0 | 68.0 |
| H11F | 7734.0 | 5225.0 | 5739.0 | 72.0 |
| H11G | 6834.0 | 5290.0 | 4964.0 | 72.0 |
| H11H | 6996.0 | 3427.0 | 5311.0 | 77.0 |
| H11I | 8254.0 | 4021.0 | 4911.0 | 77.0 |
| H11J | 7028.0 | 6357.0 | 6929.0 | 121.0 |
| H11K | 6040.0 | 7148.0 | 6455.0 | 121.0 |
| H11L | 6883.0 | 6722.0 | 5673.0 | 121.0 |
| H12A | 1732.0 | 6717.0 | 9302.0 | 114.0 |
| H12B | 2784.0 | 5724.0 | 8139.0 | 69.0 |
| H12C | 1196.0 | 7760.0 | 8440.0 | 114.0 |
| H12D | 4372.0 | 8534.0 | 4533.0 | 83.0 |
| H12E | 2248.0 | 7953.0 | 8948.0 | 114.0 |
| H20B | −594.0 | 7026.0 | 1990.0 | 81.0 |
| H20C | 1293.0 | 6627.0 | 1240.0 | 71.0 |
| H20D | 1699.0 | 3640.0 | 3039.0 | 62.0 |
| H21A | 2520.0 | 2569.0 | 1503.0 | 66.0 |
| H21B | 2394.0 | 2436.0 | 2750.0 | 66.0 |
| H21C | 3555.0 | 1083.0 | 2443.0 | 60.0 |
| H21D | 4234.0 | 1837.0 | 2844.0 | 60.0 |
| H21E | 4390.0 | 2205.0 | 583.0 | 51.0 |
| H21F | 5604.0 | 3406.0 | 1459.0 | 67.0 |
| H21G | 5839.0 | 3618.0 | 180.0 | 67.0 |
| H21H | 4583.0 | 4914.0 | 456.0 | 74.0 |
| H21I | 3966.0 | 4150.0 | 26.0 | 74.0 |
| H21J | 6663.0 | 1808.0 | 2199.0 | 90.0 |
| H21K | 7004.0 | 666.0 | 2123.0 | 90.0 |
| H21L | 5844.0 | 703.0 | 2901.0 | 90.0 |
| H22A | 8634.0 | −514.0 | −1584.0 | 152.0 |
| H22B | 6863.0 | 232.0 | −806.0 | 77.0 |
| H22C | 8557.0 | −1835.0 | −882.0 | 152.0 |
| H22D | 5862.0 | −2060.0 | 3108.0 | 79.0 |
| H22E | 9465.0 | −1068.0 | −715.0 | 152.0 |
| H30B | −6518.0 | 14052.0 | 4621.0 | 77.0 |
| H30C | −4848.0 | 13484.0 | 3682.0 | 77.0 |
| H30D | −3954.0 | 10861.0 | 5808.0 | 57.0 |
| H31A | −2866.0 | 9829.0 | 5877.0 | 70.0 |
| H31B | −1730.0 | 10449.0 | 5890.0 | 70.0 |
| H31C | −1237.0 | 8708.0 | 5976.0 | 68.0 |
| H31D | −1827.0 | 8879.0 | 4942.0 | 68.0 |
| H31E | 68.0 | 10238.0 | 4794.0 | 61.0 |
| H31F | −1002.0 | 10218.0 | 3092.0 | 65.0 |
| H31G | 173.0 | 10923.0 | 2855.0 | 65.0 |
| H31H | −700.0 | 11953.0 | 3776.0 | 63.0 |
| H31I | −1421.0 | 12023.0 | 2856.0 | 63.0 |
| H31J | 1218.0 | 8824.0 | 5779.0 | 90.0 |
| H31K | 1684.0 | 7919.0 | 5340.0 | 90.0 |
| H31L | 401.0 | 7778.0 | 5992.0 | 90.0 |
| H32A | 4189.0 | 7390.0 | 1730.0 | 99.0 |
| H32B | 2423.0 | 8296.0 | 2288.0 | 59.0 |
| H32C | 4037.0 | 6060.0 | 2272.0 | 99.0 |
| H32D | 4674.0 | 6678.0 | 2835.0 | 99.0 |
| H33A | 2076.0 | 8199.0 | 4517.0 | 90.0 |
| H33B | 963.0 | 7369.0 | 4921.0 | 90.0 |
| H33C | 1279.0 | 7931.0 | 5690.0 | 90.0 |
| H40B | 6155.0 | −2984.0 | −1008.0 | 103.0 |
| H40C | 4294.0 | −2506.0 | −250.0 | 83.0 |
| H40D | 3910.0 | 439.0 | −2133.0 | 59.0 |
| H41A | 2187.0 | 468.0 | 845.0 | 108.0 |
| H41B | 1393.0 | −466.0 | 794.0 | 108.0 |
| H41C | 337.0 | 1007.0 | 981.0 | 119.0 |
| H41D | 169.0 | 838.0 | −93.0 | 119.0 |
| H41E | 1709.0 | 2482.0 | −118.0 | 70.0 |
| H41F | 2043.0 | 3120.0 | −2036.0 | 95.0 |
| H41G | 1222.0 | 2115.0 | −1921.0 | 95.0 |
| H41H | 3094.0 | 1640.0 | −2140.0 | 99.0 |
| H41I | 3311.0 | 1895.0 | −1128.0 | 99.0 |
| H41J | −1091.0 | 2161.0 | −739.0 | 164.0 |
| H41K | −1560.0 | 3148.0 | −423.0 | 164.0 |
| H41L | −1188.0 | 2039.0 | 503.0 | 164.0 |
| H42A | −3935.0 | 5259.0 | 1625.0 | 112.0 |
| H42B | −1509.0 | 3873.0 | 1994.0 | 60.0 |
| H42C | −3139.0 | 6210.0 | 1645.0 | 112.0 |
| H42D | 69.0 | 5899.0 | −1870.0 | 80.0 |
| H42E | −3138.0 | 4951.0 | 2537.0 | 112.0 |

TABLE 6.5

Hydrogen bonds with bond lengths (Å) and angles (°)

| D—H . . . A | Distance (D—H) | Distance (H . . . A) | Distance (D . . . A) | Angle (D—H . . . A) |
|---|---|---|---|---|
| N106—H10D . . . N201 | 0.8800 | 2.3000 | 3.132(3) | 157.00 |
| N206—H20D . . . N101 | 0.8800 | 2.2000 | 3.047(3) | 161.00 |
| N306—H30D . . . N401 | 0.8800 | 2.3500 | 3.184(3) | 159.00 |
| N406—H40D . . . N301 | 0.8800 | 2.2500 | 3.101(3) | 162.00 |
| C103—H10B . . . N124 | 0.9500 | 2.5500 | 3.431(4) | 154.00 |
| C104—H10C . . . O108 | 0.9500 | 2.3600 | 2.796(4) | 107.00 |
| C110—H11A . . . O108 | 0.9900 | 2.2700 | 2.692(5) | 104.00 |
| C112—H11E . . . O120 | 1.0000 | 2.4500 | 3.021(4) | 116.00 |
| C113—H11G . . . F227 | 0.9900 | 2.5000 | 3.389(3) | 149.00 |
| C114—H11I . . . O202 | 0.9900 | 2.4400 | 3.319(4) | 148.00 |
| C114—H11I . . . N106 | 0.9900 | 2.4800 | 2.867(4) | 103.00 |
| C114—H11I . . . N201 | 0.9900 | 2.5500 | 3.542(4) | 177.00 |
| C117—H11J . . . F428 | 0.9800 | 2.3500 | 3.295(5) | 163.00 |
| C117—H11K . . . F128 | 0.9800 | 2.4700 | 3.269(5) | 138.00 |
| C122—H12B . . . O419 | 0.9500 | 2.4300 | 3.246(4) | 144.00 |
| C126—H12D . . . O119 | 1.0000 | 2.5800 | 3.157(5) | 117.00 |
| C129—H12E . . . O408 | 0.9800 | 2.4900 | 3.434(5) | 162.00 |
| C203—H20B . . . N224 | 0.9500 | 2.6100 | 3.484(5) | 153.00 |
| C204—H20C . . . O208 | 0.9500 | 2.3800 | 2.812(4) | 107.00 |
| C210—H21B . . . O102 | 0.9900 | 2.6000 | 3.462(4) | 146.00 |
| C210—H21B . . . N206 | 0.9900 | 2.4900 | 2.835(4) | 100.00 |
| C211—H21C . . . O220 | 0.9900 | 2.5900 | 3.293(4) | 128.00 |
| C212—H21E . . . O219 | 1.0000 | 2.4900 | 2.998(4) | 111.00 |
| C213—H21G . . . F216 | 0.9900 | 2.4000 | 2.785(4) | 102.00 |
| C217—H21J . . . O308 | 0.9800 | 2.5800 | 3.405(4) | 141.00 |
| C229—H22A . . . O108 | 0.9800 | 2.4500 | 3.256(5) | 139.00 |
| C229—H22C . . . F427 | 0.9800 | 2.5200 | 3.315(5) | 139.00 |
| C226—H22D . . . O119 | 1.0000 | 2.5600 | 3.226(4) | 124.00 |
| C226—H22D . . . O220 | 1.0000 | 2.4500 | 3.109(4) | 123.00 |
| C303—H30B . . . N324 | 0.9500 | 2.4800 | 3.409(4) | 167.00 |
| C304—H30C . . . O308 | 0.9500 | 2.3800 | 2.798(4) | 106.00 |
| C310—H31A . . . O402 | 0.9900 | 2.4600 | 3.245(4) | 136.00 |
| C310—H31A . . . N401 | 0.9900 | 2.5800 | 3.443(4) | 145.00 |
| C313—H31F . . . O319 | 0.9900 | 2.5500 | 3.073(4) | 113.00 |
| C313—H31G . . . F316 | 0.9900 | 2.4400 | 2.848(4) | 104.00 |
| C314—H31I . . . O308 | 0.9900 | 2.3300 | 2.685(3) | 100.00 |
| C314—H31I . . . O420 | 0.9900 | 2.5700 | 3.074(3) | 111.00 |
| C317—H31L . . . F427 | 0.9800 | 2.5300 | 3.352(5) | 142.00 |
| C329—H32C . . . O208 | 0.9800 | 2.5900 | 3.314(5) | 131.00 |
| C404—H40C . . . O408 | 0.9500 | 2.4100 | 2.817(4) | 106.00 |
| C414—H41H . . . O302 | 0.9900 | 2.2800 | 3.156(4) | 147.00 |
| C414—H41H . . . N301 | 0.9900 | 2.4100 | 3.375(4) | 163.00 |
| C422—H42B . . . O308 | 0.9500 | 2.4900 | 3.197(3) | 131.00 |
| C426—H42D . . . F416 | 1.0000 | 2.5300 | 3.091(5) | 115.00 |

Representation of the crystal structures are given in FIGS. 8 and 9. The figures were generated with the PLATON program (Spek, A. L. *J. Appl. Cryst.* 2003 36, 7-13).

The I-491 molecule contains a sulfur atom that allows the absolute configuration to be determined, making used of a high resolution data collection. The Flack x parameter is calculated based on the anomalous scattering method. It gives the absolute structure, providing a sufficient estimate standard deviation is reached. According to the theory, the expected values of the Flack x parameter are 0 for correct (within 3 esd.s) and +1 for inverted absolute structure. The results considering the configuration C315: R; C215: R; C415: R; C115: R is 0.011 (14), which unambiguously proved this absolute configuration for I-491 in Form B crystal structure.

A simulated diffraction pattern (FIG. 10) was produced from the room temperature experimentally determined crystal structure of Form B. An experimental powder diffraction pattern can be compared to this theoretical pattern to demonstrate the nature of the crystalline structure. Minor differences (if any) can be explained by preferential orientations in the powder.

The crystal structure of I-491 Form B was determined by single crystal X-ray diffraction, allowing the generation of a reference powder pattern. Even is the sample used was isolated from twinned crystals, the structure is of high quality; and thus represent the definitive crystal structure of Form B.

Example 7. Characterization of Form C

The solid obtained from interconversion slurring between forms (A+εD) and B at 80° C. in Acetonitrile/Water was analyzed by XRPD (acquisition parameters: type=2Th/Th locked; start=2.00°; end=40.05°; step=0.03°; step time=89. s; temperature=25° C. (room); time started=2749 s; 2-Theta=2.00; and operations=Y Scale add 1000). It was found to be crystalline and correspond to form C+traces of A and B.

Figure 11:
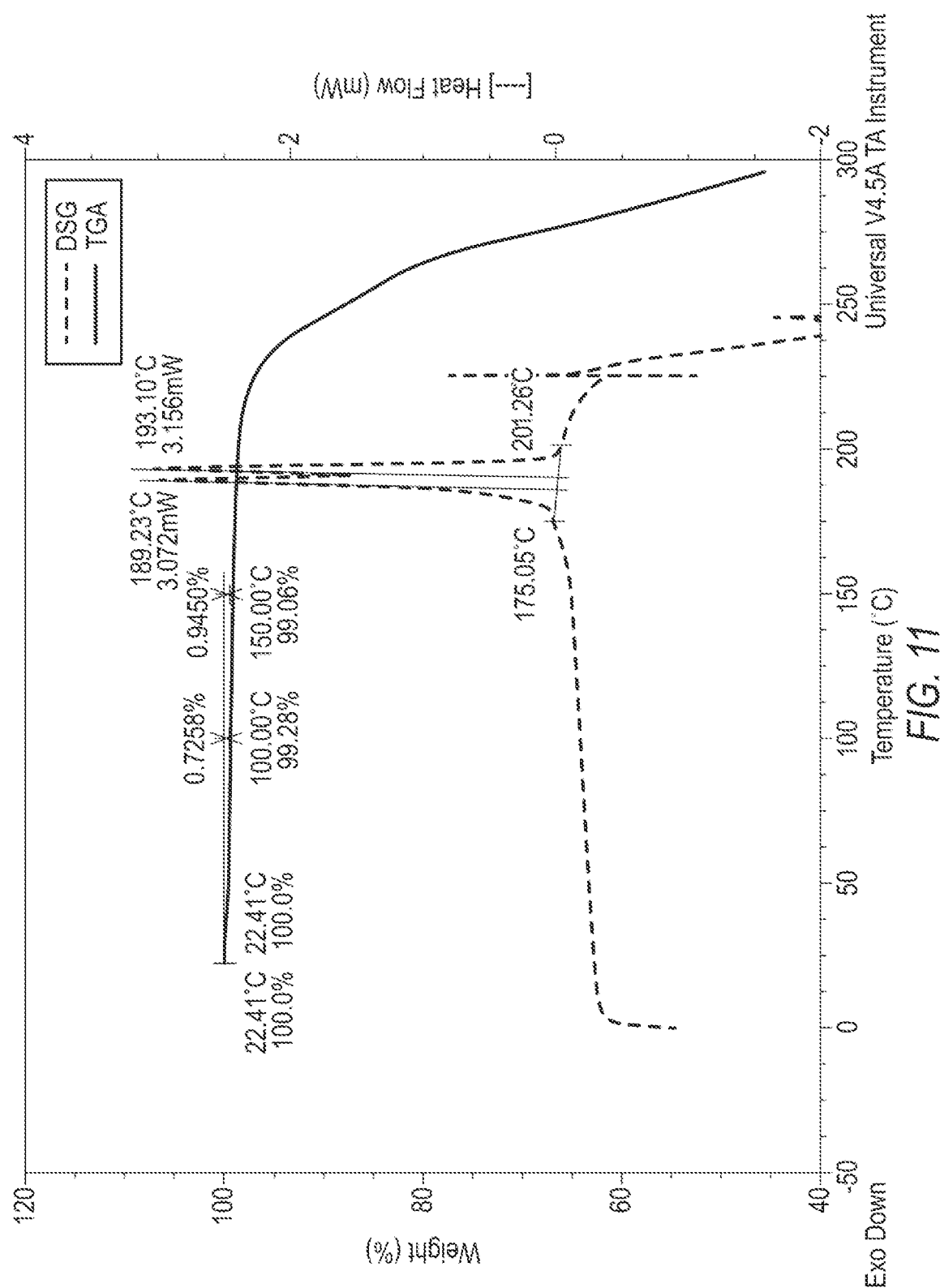
FIG. 11 shows a DSC thermogram and a TGA thermogram of Form C.

The DSC thermogram (parameters: equilibrate at 0.00° C., ramp 10.00° C./min to 250.00° C.) shows a first endothermic event at 186° C. (40.7 J/g) corresponding to the melting of Form C, followed by a second endothermic event at 190° C. (31 J/g) corresponding to the melting of Form A (FIG. 11). A continuous loss of mass of 0.9% is observed between room temperature and 150° C. by TGA (FIG. 11).

Single Crystal

Slow evaporation from MeCN/H$_2$O mixture affords few crystals suitable for X-rays diffraction studies. [3]

A second single crystal was found in the same preparation and was selected by observation under a binocular microscope was mounted on the goniometric head of a Bruker Instrument APEX DUO diffractometer (Bruker AXS (2011). APEX2 suite V 2011.2-0. Madison, Wisconsin, U.S.A.). Intensities were also collected at low temperature (T=113 K), with the use of a graphite monochromated Cu Kα radiation (λ=1.54178 Å). Systematic investigation of the diffraction nodes indicates that the second crystal belongs to the monoclinic system, with a primitive Bravais lattice. The unit cell parameters of the phase termed C are: a (Å)=14.47 b (Å)=17.28 c (Å)=16.11 α(°)=90.00 β(°)=109.85 γ(°)=90.00

In view of the number of atoms in the I-491 molecule and of the unit cell volume, it is concluded that this unit cell must contain 8 molecules having the formula C16 H20 F3 N5 O4 S which is equivalent to a calculated density of 1.527. The number of reflections collected was 63621, of which 13312 were unique.

Determination of the space group was achieved unequivocally due to the presence of a unique systematic extinction along the monoclinic axis.

The crystal structure of Form C was solved by direct methods using the SIR software (Altomare, A.; Cascarano, G.; Giacovazzo, C.; Guagliardi, A.; Burla, M. C.; Polidori, G.; Cavalli, A. *J. Appl. Crystallogr.* 1994, 27, 435-436) and refined on $F^2$ by full least squares methods with SHELXTL (Sheldrick, G. M. *Acta Crystallogr. Sect. A* 2008, *A64*, 112-122). All non-hydrogen atoms were refined with anisotropic displacement parameters; a riding model was used for hydrogen atoms. Final agreement values are R1=0.0284 (observed reflections) and wR2=0.0847 (all data) for 13312 reflections and 1070 parameters, with a goodness of fit of 1.044.

The compound in the crystal structure of Form C (FIG. 12A) crystallizes in the space group P 21, the asymmetric unit of the crystal is made up of 4 molecules of I-491, thus 8 formulae are present in the unit cell. No additional molecule like organic or water is found. The asymmetric cell contains: 4 (C16 H20 F3 N5 O4 S). Examination of the molecular structure confirms that all bond angles and lengths stand in the standard range values. Two molecules showed $CF_2$ groups that are disordered.

Crystal data, X-rays experimental parameters, and structure refinements for Form C are given in Table 7. Table 7.1 lists the positional parameters for all independent non-hydrogen atoms together with their equivalent isotropic displacement parameters. Bond lengths and angles are listed Table 7.2 and 7.3. Hydrogen positions are reported Table 7.4. Table 7.5 lists all the hydrogen bonds.

TABLE 7

| Identification code | Form C |
|---|---|
| Chemical formula | C16 H20 F3 N5 O4 S |
| Molecular weight | 435.43 |
| Temperature | 113(2) |
| Wavelength | 1.54178 |
| Crystal system; space group | Monoclinic; P 21 |
| Unit cell dimensions | a = 14.4653(2) Å; α = 90.00° |
| | b = 17.2765(2) Å; β = 109.8534(5)° |
| | c = 16.1121(2) Å; γ = 90.00° |
| Volume | 3787.25(8) Å$^3$ |
| Z, Calculated density | 8,1.527 Mg/m$^3$ |
| Absorption coefficient | 2.112 l/mm |
| F(000) | 1808 |
| Theta range for data collection | 2.92° to 67.38° |
| Limiting indices | −17 <= h <= 17; |
| | −20 <= k <= 20; |

TABLE 7-continued

| | |
|---|---|
| | −17 <= l <= 18 |
| Reflection collected/unique | 63621/13312 [R(int) = 0.0315] |
| Completeness to theta max | 99.2% |
| Refinement method | Full-matrix least-square on F$^2$ |
| Data/restraints/parameters | 13312/780/1070 |
| Goodness of fit on F$^2$ | 1.044 |
| Final R indices [I > 2sigma(I)] | R1 = 0.0284; wR2 = 0.0840 |
| Final R indices [all data] | R1 = 0.0290; wR2 = 0.0847 |
| Absolute structure parameter | 0.031(6) |
| Largest diff peak and hole | 0.393 and −0.312e/Å$^3$ |

TABLE 7.1

Atomic coordinates (×10$^4$) and equivalent isotropic displacements parameters (Å$^2$ × 10$^3$)

| Label | x | y | z | U(eq) |
|---|---|---|---|---|
| C103 | −1292.1(1.2) | 6427.4(1.1) | −654.8(1.1) | 24.1(4) |
| C104 | −1022.0(1.2) | 6241.9(1.0) | 203.2(1.1) | 22.8(3) |
| C105 | −1.0(1.1) | 6087.7(9) | 443.6(1.1) | 17.4(3) |
| C107 | 427.0(1.1) | 5716.1(9) | 1984.2(1.0) | 17.7(3) |
| C110 | 946.2(1.1) | 5441.2(1.0) | 3538.5(1.1) | 21.3(3) |
| C111 | 1852.9(1.2) | 5146.7(1.0) | 4264.7(1.1) | 21.6(3) |
| C112 | 2642.5(1.1) | 5778.6(9) | 4553.9(1.0) | 18.3(3) |
| C113 | 2904.2(1.2) | 6011.3(1.0) | 3739.9(1.1) | 21.4(3) |
| C114 | 1985.9(1.2) | 6275.9(1.0) | 2996.0(1.1) | 21.7(3) |
| C115 | 3517.9(1.2) | 5508.5(9) | 5350.9(1.1) | 18.2(3) |
| C117 | 4164.3(1.2) | 4910.4(1.0) | 5174.6(1.2) | 24.4(3) |
| C121 | 5028.0(1.1) | 6002.4(9) | 6926.3(1.0) | 17.8(3) |
| C122 | 4782.0(1.2) | 5833.2(1.0) | 7670.0(1.1) | 21.2(3) |
| C125 | 6030.7(1.2) | 5806.5(1.0) | 7172.6(1.1) | 18.7(3) |
| C126 | 6724.1(1.2) | 5850.9(1.1) | 6648.8(1.1) | 24.1(4) |
| C129 | 5726.4(1.3) | 5276.3(1.2) | 9158.6(1.1) | 27.4(4) |
| C203 | 11621.6(1.3) | 8202.4(1.5) | 16717.4(1.2) | 37.3(5) |
| C204 | 11467.9(1.2) | 8072.3(1.4) | 15841.5(1.1) | 30.5(4) |
| C205 | 10465.7(1.1) | 8308.1(1.0) | 15603.2(1.0) | 18.0(3) |
| C207 | 9884.4(1.1) | 8091.6(9) | 14021.8(1.0) | 16.5(3) |
| C210 | 9128.7(1.1) | 7622.8(1.0) | 12536.2(1.0) | 21.4(3) |
| C211 | 8438.3(1.1) | 7923.1(1.1) | 11659.1(1.0) | 21.6(3) |
| C212 | 7375.1(1.1) | 7955.2(1.0) | 11667.3(1.0) | 16.5(3) |
| C213 | 7368.2(1.1) | 8489.8(1.1) | 12419.2(1.0) | 21.5(3) |
| C214 | 8078.9(1.1) | 8195.3(1.1) | 13298.8(1.0) | 21.0(3) |
| C215 | 6626.7(1.1) | 8231.3(1.0) | 10788(1) | 16.8(3) |
| C217 | 6920.7(1.4) | 8916.7(1.1) | 10357.9(1.1) | 27.5(4) |
| C221 | 5435.4(1.2) | 7763.6(1.0) | 9080.5(1.0) | 21.2(3) |
| C222 | 5690.9(1.1) | 8020.2(1.1) | 8372.1(1.1) | 22.7(3) |
| C225 | 4431.3(1.1) | 7933.9(1.0) | 8857.7(1.0) | 19.9(3) |
| C226 | 3753.8(1.2) | 7806.2(1.1) | 9371.4(1.1) | 24.5(4) |
| C229 | 4756.3(1.4) | 8640.3(1.3) | 6931.3(1.2) | 33.5(4) |
| C303 | −3766.2(1.1) | 7826.6(1.0) | −5144.7(1.1) | 20.4(3) |
| C304 | −3394.5(1.1) | 7615.0(9) | −4256.1(1.1) | 19.3(3) |
| C305 | −2417.7(1.1) | 8086.7(9) | −4068.2(1.0) | 15.5(3) |
| C307 | −1678.8(1.1) | 8303.4(1.0) | −2494.6(1.0) | 19.7(3) |
| C310 | −1304.2(1.2) | 8816.7(1.2) | −1027.1(1.1) | 25.7(4) |
| C311 | −521.7(1.2) | 8694.3(1.2) | −129.8(1.1) | 25.3(4) |
| C312 | 499.7(1.2) | 8883.7(1.0) | −172.9(1.0) | 16.9(3) |
| C313 | 663.2(1.1) | 8344.7(1.0) | −851.7(1.0) | 21.1(3) |
| C314 | −66.3(1.1) | 6480.6(1.0) | −1760(1) | 19.7(3) |
| C315 | 1329.2(1.2) | 6936.6(1.0) | 725.6(1.0) | 19.9(3) |
| C317 | 1106.2(1.3) | 9483.8(1.0) | 1366.0(1.1) | 25.5(4) |
| C321 | 2550.6(1.2) | 8191.6(1.0) | 2268.3(1.1) | 20.4(3) |
| C322 | 2323.5(1.1) | 8255.3(9) | 3053.5(1.1) | 16.6(3) |
| C325 | 3575.6(1.2) | 8256.6(1.1) | 2559.0(1.1) | 23.2(3) |
| C326 | 4255.8(1.4) | 8225.0(1.4) | 2037.0(1.3) | 34.9(4) |
| C329 | 3344.6(1.4) | 8421.8(1.2) | 4642.3(1.1) | 28.9(4) |
| C403 | 14210.2(1.4) | 5776.4(1.6) | 11540.8(1.3) | 39.0(5) |
| C404 | 13958.7(1.2) | 5896.1(1.2) | 10670.8(1.2) | 27.8(4) |
| C405 | 12916.7(1.2) | 5870.8(1.0) | 10368.5(1.1) | 19.8(3) |
| C407 | 12504.7(1.2) | 5872.2(1.0) | 8767.6(1.1) | 20.7(3) |
| C410 | 12034.8(1.3) | 5728.5(1.3) | 7217.3(1.2) | 29.9(4) |
| C411 | 11182.1(1.3) | 5316.6(1.2) | 6525.7(1.2) | 29.2(4) |
| C412 | 10268.0(1.2) | 5834.5(1.0) | 6257.0(1.1) | 21.1(3) |
| C413 | 10009.5(1.2) | 6021.7(1.1) | 7060.2(1.1) | 24.1(4) |
| C414 | 10881.7(1.3) | 6390.8(1.1) | 7797.0(1.1) | 25.0(4) |
| C415 | 9437.1(1.2) | 5446.1(9) | 5498.3(1.1) | 19.4(3) |
| C417 | 6625.9(1.3) | 4646.9(1.0) | 5746.6(1.3) | 26.7(4) |

TABLE 7.1-continued

Atomic coordinates (×10⁴) and equivalent isotropic displacements parameters (Å² × 10³)

| Label | x | y | z | U(eq) |
|---|---|---|---|---|
| C421 | 7916.0(1.3) | 5760.7(1.0) | 3855.0(1.1) | 23.7(3) |
| C422 | 8179.4(1.3) | 5528.8(1.0) | 3145.1(1.2) | 25.0(4) |
| C425 | 6892.9(1.2) | 5644.5(1.0) | 3592.4(1.1) | 23.3(4) |
| C426 | 6206.4(1.4) | 5799.8(1.2) | 4092.4(1.2) | 30.3(4) |
| C429 | 7233.5(1.4) | 5011.0(1.5) | 1646.1(1.2) | 36.5(5) |
| F116 | 3140.8(6) | 5211.0(6) | 5980.8(6) | 22.3(2) |
| F127 | 7031.0(1.1) | 5118.5(8) | 6555.6(1.1) | 46.9(4) |
| F128 | 7549.6(9) | 6226.2(1.1) | 7122.2(6) | 47.8(4) |
| F216 | 5744.9(7) | 8404.9(6) | 10916.1(6) | 25.9(2) |
| F227 | 3633.1(8) | 8485.8(7) | 9754.8(7) | 32.4(2) |
| F228 | 2851.6(7) | 7606.6(8) | 8813.4(8) | 36.7(3) |
| F316 | 2164.3(7) | 9201.2(7) | 569.4(7) | 29.7(2) |
| F327 | 4672.3(1.1) | 7615.4(9) | 2291.3(1.1) | 60.4(4) |
| F328 | 4843.9(9) | 8859.1(8) | 2219.7(9) | 45.5(3) |
| F416 | 9852.5(7) | 5106.7(6) | 4916.2(7) | 25.7(2) |
| F427 | 5265.4(1.1) | 5791.2(1.8) | 3554.9(1.0) | 67.0(7) |
| F428 | 6291.1(1.1) | 5223.1(9) | 4678.2(1.0) | 40.9(4) |
| F527 | 5551(6) | 6303(8) | 3616(6) | 67.0(7) |
| F528 | 5661(6) | 5154(4) | 4146(5) | 40.9(4) |
| F627 | 6386(13) | 6152(11) | 5903(9) | 46.9(4) |
| F628 | 6591(13) | 5264(11) | 6085(12) | 47.8(4) |
| N101 | 311.4(9) | 6166.1(9) | −230.0(9) | 20.5(3) |
| N106 | 679.2(1.0) | 5897.7(8) | 1256.8(9) | 18.4(3) |
| N109 | 1204.5(9) | 5685.5(8) | 2769.0(9) | 19.3(3) |
| N123 | 5603.2(1.0) | 5567.0(6) | 8278.3(9) | 19.6(3) |
| N124 | 6381.9(1.0) | 5548.1(9) | 7990.8(9) | 21.8(3) |
| N201 | 10244.4(1.0) | 8539.6(9) | 16291.2(9) | 24.4(3) |
| N206 | 9733.9(9) | 6314.2(8) | 14787.8(8) | 16.3(3) |
| N209 | 9073.2(9) | 8099.8(8) | 13272.3(9) | 18.2(3) |
| N223 | 4873.3(1.0) | 8310.3(1.0) | 7791.6(9) | 23.4(3) |
| N224 | 4091.3(1.0) | 8264.3(9) | 8070.9(9) | 23.7(3) |
| N301 | −2226.9(9) | 6252.7(8) | −4793.8(9) | 19.1(3) |
| N306 | −1671.(9) | 8169.4(8) | −3265.2(9) | 16.8(3) |
| N309 | −1086.4(1.0) | 8409.2(8) | −1740.2(9) | 19.5(3) |
| N323 | 3177(1) | 8344.2(8) | 3707.7(9) | 19.3(3) |
| N324 | 3960.2(1.0) | 8348.1(9) | 3430.5(9) | 23.8(3) |
| N401 | 12579.6(1.0) | 5732.6(1.0) | 11014.9(1.0) | 28.4(3) |
| N406 | 12246.5(1.0) | 5971.9(8) | 9529.0(9) | 20.5(3) |
| N409 | 11757.3(1.0) | 5907.5(9) | 7991.4(1.0) | 23.6(3) |
| N423 | 7350(1) | 5291.6(9) | 2527.1(9) | 23.8(3) |
| N424 | 6551.6(1.0) | 5355(1) | 2779.2(9) | 24.7(3) |
| O102 | −529.6(8) | 6392.1(7) | −948.1(7) | 22.7(2) |
| O106 | −419.9(8) | 5551.9(7) | 1924.9(8) | 25.1(3) |
| O119 | 3539.5(9) | 6863.0(7) | 6131.8(8) | 28.1(3) |
| O120 | 4769.1(9) | 6639.6(7) | 5417.2(8) | 27.0(3) |
| O202 | 11130.4(8) | 8479.8(9) | 17017.5(8) | 30.7(3) |
| O208 | 10713.3(8) | 7939.3(7) | 14007.2(7) | 21.1(2) |
| O219 | 7127.9(9) | 7168.2(9) | 9831.7(8) | 32.4(3) |
| O220 | 5803(1) | 6847.3(8) | 10419.9(8) | 32.0(3) |
| O302 | −3103.3(8) | 8079.9(7) | −5493.6(7) | 21.2(2) |
| O308 | −2724.0(8) | 8301.4(9) | −2496.8(6) | 31.1(3) |
| O319 | 2186.0(1.1) | 7564.4(9) | 768.3(9) | 40.7(4) |
| O320 | 836.2(1.0) | 7681.9(8) | 1396.4(9) | 33.9(3) |
| O402 | 13415.6(9) | 5671.7(1.1) | 11779.5(9) | 41.9(4) |
| O408 | 13351.4(9) | 5710.9(9) | 6841.9(8) | 30.1(3) |
| O419 | 8066.3(1.2) | 6505.0(9) | 5262.6(1.0) | 46.9(4) |
| O420 | 9320.3(1.3) | 6703.3(9) | 4561(1) | 52.0(5) |
| S116 | 4221.8(3) | 6355.1(2) | 5934.7(2) | 16.75(6) |
| S216 | 6276.2(3) | 7397.4(2) | 10036.8(2) | 20.93(6) |
| S316 | 1692.8(3) | 7992.5(2) | 1253.8(3) | 23.31(9) |
| S418 | 8673.2(3) | 6207.0(2) | 4814.5(3) | 28.64(1) |

TABLE 7.2

Bong lengths (Å)

| Bond | Length (Å) |
|---|---|
| C103—C104 | 1.342(3) |
| C104—C105 | 1.419(2) |
| C105—N106 | 1.385(2) |
| C107—N109 | 1.379(2) |
| C107—O108 | 1.229(2) |
| C110—C111 | 1.519(2) |
| C111—C112 | 1.534(2) |
| C112—C113 | 1.537(2) |
| C112—C115 | 1.536(2) |
| C113—C114 | 1.526(2) |
| C115—C117 | 1.504(2) |
| C115—F116 | 1.4027(18) |
| C115—S118 | 1.8466(16) |
| C121—C122 | 1.392(2) |
| C121—C125 | 1.409(2) |
| C122—N123 | 1.339(2) |
| C125—C126 | 1.516(2) |
| C126—F127 | 1.366(2) |
| C126—F126 | 1.345(2) |
| C126—F627 | 1.246(12) |
| C126—F628 | 1.331(13) |
| C203—C204 | 1.347(3) |
| C204—C205 | 1.427(2) |
| C205—N206 | 1.379(2) |
| C207—N209 | 1.369(2) |
| C207—O208 | 1.236(2) |
| C210—C211 | 1.518(2) |
| C211—C212 | 1.543(2) |
| C212—C213 | 1.526(2) |
| C212—C215 | 1.538(2) |
| C213—C214 | 1.528(2) |
| C215—C217 | 1.504(2) |
| C215—F216 | 1.3923(18) |
| C215—S218 | 1.8385(17) |
| C221—C222 | 1.387(2) |
| C221—C225 | 1.404(2) |
| C222—N223 | 1.332(2) |
| C225—C226 | 1.498(2) |
| C226—F227 | 1.365(2) |
| C228—F228 | 1.354(2) |
| C303—C304 | 1.348(2) |
| C304—C305 | 1.421(2) |
| C305—N306 | 1.387(2) |
| C307—N309 | 1.371(2) |
| C307—O308 | 1.221(2) |
| C310—C311 | 1.519(2) |
| C311—C312 | 1.536(2) |
| C312—C313 | 1.527(2) |
| C312—C315 | 1.537(2) |
| C313—C314 | 1.526(2) |
| C315—C317 | 1.515(2) |
| C315—F316 | 1.3921(19) |
| C315—S318 | 1.8324(17) |
| C321—C322 | 1.384(2) |
| C321—C325 | 1.401(2) |
| C322—N323 | 1.332(2) |
| C325—C326 | 1.497(2) |
| C326—F327 | 1.351(3) |
| C326—F328 | 1.357(3) |
| C403—C404 | 1.339(3) |
| C404—C405 | 1.419(2) |
| C405—N406 | 1.382(2) |
| C407—N409 | 1.370(2) |
| C407—O408 | 1.230(2) |
| C410—C411 | 1.527(3) |
| C411—C412 | 1.530(2) |
| C412—C413 | 1.530(2) |
| C412—C415 | 1.546(2) |
| C413—C414 | 1.530(2) |
| C415—C417 | 1.498(2) |
| C415—F418 | 1.4025(19) |
| C415—S418 | 1.8264(17) |
| C421—C422 | 1.362(3) |
| C421—C425 | 1.409(2) |
| C422—N423 | 1.337(2) |
| C425—C426 | 1.500(2) |
| C426—F427 | 1.342(2) |
| C426—F428 | 1.349(3) |
| C426—F527 | 1.322(9) |
| C426—F528 | 1.369(7) |

TABLE 7.2-continued

Bong lengths (Å)

| Bond | Length (Å) |
| --- | --- |
| F127—F628 | 0.85(2) |
| F627—F628 | 1.57(3) |
| N101—C105 | 1.317(2) |
| N101—O102 | 1.4197(16) |
| N106—C107 | 1.377(2) |
| N109—C110 | 1.473(2) |
| N109—C114 | 1.473(2) |
| N123—C129 | 1.456(2) |
| N123—N124 | 1.356(2) |
| N124—C125 | 1.319(2) |
| N201—C205 | 1.316(2) |
| N201—O202 | 1.4156(17) |
| N206—C207 | 1.379(2) |
| N209—C210 | 1.469(2) |
| N209—C214 | 1.463(2) |
| N223—C229 | 1.455(2) |
| N223—N224 | 1.3544(19) |
| N224—C225 | 1.323(2) |
| N301—C305 | 1.319(2) |
| N301—O302 | 1.4112(16) |
| N306—C307 | 1.387(2) |
| N309—C310 | 1.472(2) |
| N309—C314 | 1.463(2) |
| N323—C329 | 1.446(2) |
| N323—N324 | 1.352(2) |
| N324—C325 | 1.333(2) |
| N401—C405 | 1.313(2) |
| N401—O402 | 1.4068(18) |
| N406—C407 | 1.376(2) |
| N409—C410 | 1.467(2) |
| N409—C414 | 1.460(2) |
| N423—C429 | 1.455(2) |
| N423—N424 | 1.353(2) |
| N424—C425 | 1.331(2) |
| O102—C103 | 1.340(2) |
| O202—C203 | 1.339(2) |
| O302—C303 | 1.341(2) |
| O402—C403 | 1.342(2) |
| S118—C121 | 1.7373(16) |
| S118—O119 | 1.4345(13) |
| S118—O120 | 1.4407(13) |
| S218—C221 | 1.7277(16) |
| S218—O219 | 1.4326(13) |
| S218—O220 | 1.4301(14) |
| S318—C321 | 1.7410(16) |
| S318—O319 | 1.4309(15) |
| S318—O320 | 1.4385(14) |
| S418—C421 | 1.7418(18) |
| S418—O419 | 1.4336(17) |
| S418—O420 | 1.4276(17) |

TABLE 7.3

Bond angles (°)

| Atoms | Angle (°) |
| --- | --- |
| C103—C104—C105 | 103.77(15) |
| C103—O102—N101 | 107.78(12) |
| C105—N101—O102 | 105.12(12) |
| C107—N106—C105 | 123.44(14) |
| C107—N109—C110 | 114.95(13) |
| C107—N109—C114 | 121.29(13) |
| C110—C111—C112 | 110.78(14) |
| C111—C112—C113 | 107.51(13) |
| C111—C112—C115 | 110.76(13) |
| C112—C115—S118 | 108.89(11) |
| C113—C112—C115 | 114.85(13) |
| C114—C113—C112 | 110.34(13) |
| C114—N109—C110 | 112.45(13) |
| C117—C115—C112 | 118.71(14) |
| C117—C115—S118 | 111.24(11) |
| C121—C125—C126 | 150.04(15) |

TABLE 7.3-continued

Bond angles (°)

| Atoms | Angle (°) |
| --- | --- |
| C121—S118—C115 | 105.81(8) |
| C122—C121—C125 | 104.29(14) |
| C122—C121—S118 | 125.26(12) |
| C122—N123—C129 | 127.97(14) |
| C122—N123—N124 | 113.05(13) |
| C125—C121—S118 | 130.44(13) |
| C125—N124—N123 | 104.52(13) |
| C128—F627—F628 | 54.9(8) |
| C126—F628—F627 | 50.0(8) |
| C203—C204—C205 | 102.95(16) |
| C203—O202—N201 | 107.77(13) |
| C205—N201—O202 | 105.28(13) |
| C207—N206—C205 | 123.16(13) |
| C207—N209—C210 | 116.18(13) |
| C207—N209—C214 | 122.17(13) |
| C210—C211—C212 | 110.29(13) |
| C212—C213—C214 | 118.58(13) |
| C212—C215—S218 | 108.28(11) |
| C213—C212—C211 | 107.68(13) |
| C213—C212—C215 | 110.57(13) |
| C214—N209—C210 | 114.26(13) |
| C215—C212—C211 | 113.27(13) |
| C217—C215—C212 | 116.61(14) |
| C217—C215—S218 | 111.78(11) |
| C221—C225—C226 | 129.94(15) |
| C221—S218—C215 | 104.65(8) |
| C222—C221—C225 | 105.33(14) |
| C222—C221—S218 | 123.14(12) |
| C222—N223—C229 | 127.23(15) |
| C222—N223—N224 | 112.79(14) |
| C225—C221—S218 | 131.31(13) |
| C225—N224—N223 | 105.24(13) |
| C303—C304—C305 | 103.44(14) |
| C303—O302—N301 | 108.05(11) |
| C305—N301—O302 | 105.24(12) |
| C305—N306—C307 | 121.10(13) |
| C307—N309—C310 | 114.85(13) |
| C307—N309—C314 | 121.81(13) |
| C310—C311—C312 | 110.11(14) |
| C312—C315—S318 | 113.17(11) |
| C313—C312—C311 | 107.82(14) |
| C313—C312—C315 | 116.16(13) |
| C314—C313—C312 | 110.22(13) |
| C314—N309—C310 | 116.87(13) |
| C315—C312—C311 | 115.13(13) |
| C317—C315—C312 | 113.65(13) |
| C317—C315—S318 | 109.40(11) |
| C321—C325—C326 | 130.57(16) |
| C321—S318—C315 | 105.52(8) |
| C322—C321—C325 | 105.23(14) |
| C322—C321—S318 | 124.12(13) |
| C322—N323—C329 | 128.04(15) |
| C322—N323—N324 | 113.25(13) |
| C325—C321—S318 | 130.45(13) |
| C325—N324—N323 | 104.52(13) |
| C403—C404—C405 | 103.52(16) |
| C403—O402—N401 | 107.70(14) |
| C404—C403—O402 | 111.47(16) |
| C405—N401—O402 | 105.53(13) |
| C407—N406—C405 | 121.74(14) |
| C407—N409—C410 | 115.49(14) |
| C407—N409—C414 | 125.29(14) |
| C410—C411—C412 | 110.04(18) |
| C411—C412—C415 | 109.63(14) |
| C412—C413—C414 | 111.14(14) |
| C412—C415—S418 | 108.25(11) |
| C413—C412—C411 | 108.68(14) |
| C413—C412—C415 | 115.08(14) |
| C414—N409—C410 | 113.96(14) |
| C417—C415—C412 | 117.32(14) |
| C417—C415—S418 | 111.42(12) |
| C421—C425—C426 | 129.26(16) |
| C421—S418—C415 | 106.82(8) |
| C422—C421—C425 | 105.48(15) |
| C422—C421—S418 | 126.58(14) |
| C422—N423—C429 | 127.31(15) |

TABLE 7.3-continued

Bond angles (°)

| Atoms | Angle (°) |
|---|---|
| C422—N423—N424 | 113.16(14) |
| C425—C421—S418 | 127.55(14) |
| C425—N424—N423 | 104.89(13) |
| F116—C115—C112 | 107.64(12) |
| F116—C115—C117 | 108.44(13) |
| F116—C115—S118 | 101.79(10) |
| F127—C126—C125 | 108.39(15) |
| F127—F628—C126 | 74.0(9) |
| F127—F628—F627 | 119.7(13) |
| F128—C126—C125 | 109.85(14) |
| F128—C126—F127 | 104.46(15) |
| F216—C215—C212 | 108.91(12) |
| F218—C215—C217 | 108.38(14) |
| F216—C215—S218 | 101.90(10) |
| F227—C226—C225 | 109.35(15) |
| F228—C226—C225 | 109.54(14) |
| F228—C226—F227 | 106.07(13) |
| F316—C315—C312 | 107.27(12) |
| F316—C315—C317 | 108.52(14) |
| F316—C315—S318 | 104.27(11) |
| F327—C325—C325 | 110.51(17) |
| F327—C326—F328 | 105.25(15) |
| F328—C326—C325 | 109.40(17) |
| F418—C415—C412 | 108.39(13) |
| F418—C415—C417 | 106.39(13) |
| F418—C415—S418 | 101.91(11) |
| F427—C425—C425 | 111.27(15) |
| F427—C426—F428 | 105.93(19) |
| F427—C426—F528 | 64.5(4) |
| F428—C42S—C425 | 108.91(15) |
| F428—C426—F528 | 43.5(3) |
| F527—C426—C425 | 106.3(4) |
| F527—C426—F427 | 42.5(5) |
| F527—C426—F428 | 140.2(5) |
| F527—C426—F528 | 105.6(6) |
| F528—C425—C425 | 111.7(3) |
| F627—C126—C125 | 116.1(8) |
| F627—C126—F127 | 108.5(8) |
| F627—C126—F128 | 109.1(10) |
| F627—C126—F628 | 75.0(13) |
| F628—C125—C125 | 111.8(7) |
| F628—C126—F127 | 36.5(9) |
| F628—C126—F128 | 130.4(7) |
| F628—F127—C126 | 69.5(10) |
| N101—C105—C104 | 111.87(14) |
| N101—C105—N106 | 118.16(14) |
| N106—C105—C104 | 129.95(15) |
| N108—C107—N109 | 114.83(13) |
| N109—C11G—C111 | 110.19(13) |
| N109—C114—C113 | 112.18(13) |
| N123—C122—C121 | 106.24(14) |
| N124—C125—C121 | 111.90(15) |
| N124—C125—C126 | 118.06(15) |
| N124—N123—C129 | 118.92(13) |
| N201—C205—C204 | 112.06(14) |
| N291—C205—N206 | 118.19(14) |
| N208—C205—C204 | 129.75(15) |
| N209—C207—N206 | 115.99(13) |
| N209—C210—C211 | 111.15(14) |
| N209—C214—C213 | 111.66(13) |
| N223—C222—C221 | 106.08(14) |
| N224—C225—C221 | 110.55(15) |
| N224—C225—C226 | 119.51(14) |
| N224—N223—C229 | 119.97(14) |
| N301—C305—C304 | 111.92(13) |
| N301—C305—N306 | 117.98(13) |
| N306—C305—C304 | 130.10(14) |
| N309—C307—N306 | 116.28(13) |
| N309—C310—C311 | 112.78(14) |
| N309—C314—C313 | 111.75(13) |
| N323—C322—C321 | 106.19(14) |
| N324—C325—C321 | 110.89(15) |
| N324—C325—C326 | 118.53(15) |
| N324—N323—C329 | 118.70(14) |
| N401—C405—C404 | 111.76(15) |
| N401—C405—N406 | 118.25(15) |
| N408—C405—C404 | 129.99(16) |
| N409—C407—N406 | 116.51(14) |
| N409—C410—C411 | 109.38(15) |
| N409—C414—C413 | 110.89(15) |
| N423—C422—C421 | 105.99(15) |
| N424—C425—C421 | 110.48(16) |
| N424—C425—C426 | 120.26(16) |
| N424—N423—C429 | 119.50(13) |
| O102—C103—C104 | 111.46(14) |
| O108—C107—N106 | 122.12(14) |
| O108—C107—N109 | 122.93(15) |
| O119—S118—C115 | 107.18(7) |
| O119—S118—C121 | 107.96(7) |
| O119—S118—O120 | 119.29(8) |
| O120—S118—C115 | 107.43(7) |
| O120—S118—C121 | 108.39(7) |
| O202—C203—C204 | 111.95(15) |
| O208—C207—N206 | 121.72(14) |
| O208—C207—N209 | 122.15(14) |
| O219—S218—C215 | 107.67(8) |
| O219—S218—C221 | 107.24(8) |
| O220—S218—C215 | 107.53(8) |
| O220—S218—C221 | 109.35(8) |
| O220—S218—O219 | 119.45(9) |
| O302—C303—C304 | 111.34(14) |
| O308—C307—N306 | 121.19(14) |
| O308—C307—N309 | 122.53(15) |
| O319—S318—C315 | 108.90(8) |
| O319—S318—C321 | 107.46(8) |
| O319—S318—O320 | 120.73(10) |
| O320—S318—C315 | 106.22(8) |
| O320—S318—C321 | 107.06(8) |
| O408—C407—N406 | 121.57(15) |
| O408—C407—N409 | 121.77(15) |
| O419—S418—C415 | 107.11(8) |
| O419—S418—C421 | 108.26(9) |
| O420—S418—C415 | 106.48(9) |
| O420—S418—C421 | 106.72(9) |
| O420—S418—O419 | 120.87(11) |

TABLE 7.4

Hydrogen coordinates (×10$^4$) and isotropic displacements parameters (Å × 10$^2$)

| Label | x | y | z | U(eq) |
|---|---|---|---|---|
| H10B | −1942.0 | 6566.0 | −1010.0 | 29.0 |
| H10C | −1421.0 | 6219.0 | 565.0 | 27.0 |
| H10D | 1308.0 | 5893.0 | 1312.0 | 22.0 |
| H11A | 445.0 | 5027.0 | 3362.0 | 26.0 |
| H11B | 663.0 | 5884.0 | 3760.0 | 26.0 |
| H11C | 2120.0 | 4691.0 | 4049.0 | 26.0 |
| H11D | 1670.0 | 4982.0 | 4777.0 | 26.0 |
| H11E | 2345.0 | 6240.0 | 4742.0 | 22.0 |
| H11F | 3393.0 | 6436.0 | 3898.0 | 26.0 |
| H11G | 3201.0 | 5564.0 | 3539.0 | 26.0 |
| H11H | 1738.0 | 6757.0 | 3177.0 | 26.0 |
| H11I | 2162.0 | 6394.0 | 2467.0 | 26.0 |
| H11J | 4542.0 | 5140.0 | 4817.0 | 37.0 |
| H11K | 3791.0 | 4473.0 | 4857.0 | 37.0 |
| H11L | 4654.0 | 4729.0 | 5736.0 | 37.0 |
| H12A | 5118.0 | 5360.0 | 9286.0 | 41.0 |
| H12B | 4157.0 | 5894.0 | 7733.0 | 25.0 |
| H12C | 6266.0 | 5556.0 | 9594.0 | 41.0 |
| H12D | 6385(18) | 5834(15) | 7022(17) | 29.0 |
| H12E | 5878.0 | 4724.0 | 9188.0 | 41.0 |
| H20B | 12483.0 | 8108.0 | 17079.0 | 45.0 |
| H20C | 11803.0 | 7873.0 | 15473.0 | 37.0 |
| H20D | 9142.0 | 8468.0 | 14755.0 | 20.0 |
| H21A | 8953.0 | 7082.0 | 12621.0 | 26.0 |
| H21B | 9811.0 | 7626.0 | 12531.0 | 26.0 |
| H21C | 8467.0 | 7579.0 | 11177.0 | 26.0 |

TABLE 7.4-continued

Hydrogen coordinates (×10⁴) and isotropic displacements parameters ($Å × 10^2$)

| Label | x | y | z | U(eq) |
|---|---|---|---|---|
| H21D | 8648.0 | 8447.0 | 11548.0 | 26.0 |
| H21E | 7183.0 | 7424.0 | 11794.0 | 22.0 |
| H21F | 6696.0 | 8515.0 | 12447.0 | 26.0 |
| H21G | 7581.0 | 9019.0 | 12307.0 | 26.0 |
| H21H | 8094.0 | 8566.0 | 13772.0 | 25.0 |
| H21I | 7841.0 | 7692.0 | 13442.0 | 25.0 |
| H21J | 7467.0 | 8771.0 | 10160.0 | 41.0 |
| H21K | 7126.0 | 9342.0 | 10784.0 | 41.0 |
| H21L | 8360.0 | 9083.0 | 9850.0 | 41.0 |
| H22A | 5401.0 | 8687.0 | 6862.0 | 50.0 |
| H22B | 6322.0 | 7994.0 | 8313.0 | 27.0 |
| H22C | 4454.0 | 9154.0 | 6884.0 | 50.0 |
| H22D | 4019.0 | 7396.0 | 9829.0 | 29.0 |
| H22E | 4334.0 | 8303.0 | 6468.0 | 50.0 |
| H30B | −4419.0 | 7675.0 | −5481.0 | 24.0 |
| H30C | −3709.0 | 7662.0 | −3852.0 | 23.0 |
| H30D | −1055.0 | 8182.0 | −3244.0 | 23.0 |
| H31A | −1945.0 | 8637.0 | −1006.0 | 31.0 |
| H31B | −1382.0 | 9380.0 | −1160.0 | 31.0 |
| H31C | −537.0 | 8150.0 | 56.0 | 30.0 |
| H31D | −657.0 | 9031.0 | 312.0 | 30.0 |
| H31E | 441.0 | 9414.0 | −434.0 | 23.0 |
| H31F | 1347.0 | 8441.0 | −878.0 | 25.0 |
| H31G | 653.0 | 7800.0 | −673.0 | 25.0 |
| H31H | 4.0 | 9005.0 | −1970.0 | 24.0 |
| H31I | 10.0 | 8100.0 | −2182.0 | 24.0 |
| H31J | 668.0 | 9228.0 | 1630.0 | 38.0 |
| H31K | 788.0 | 9951.0 | 1055.0 | 38.0 |
| H31L | 1720.0 | 9626.0 | 1835.0 | 38.0 |
| H32A | 3770.0 | 8869.0 | 4876.0 | 43.0 |
| H32B | 1688.0 | 8239.0 | 3102.0 | 22.0 |
| H32C | 3662.0 | 7952.0 | 4950.0 | 43.0 |
| H32D | 3874.0 | 8196.0 | 1391.0 | 42.0 |
| H32E | 2715.0 | 8497.0 | 4734.0 | 43.0 |
| H40B | 14868.0 | 5767.0 | 11939.0 | 47.0 |
| H40C | 14378.0 | 5978.0 | 10336.0 | 33.0 |
| H40D | 11639.0 | 6103.0 | 9466.0 | 25.0 |
| H41A | 12623.0 | 5392.0 | 7392.0 | 36.0 |
| H41B | 12197.0 | 6212.0 | 6967.0 | 36.0 |
| H41C | 11038.0 | 4825.0 | 6770.0 | 35.0 |
| H41D | 11365.0 | 5199.0 | 6001.0 | 35.0 |
| H41E | 10441.0 | 6332.0 | 6027.0 | 25.0 |
| H41F | 9816.0 | 5540.0 | 7311.0 | 29.0 |
| H41G | 9443.0 | 6381.0 | 6921.0 | 29.0 |
| H41H | 11016.0 | 6907.0 | 7597.0 | 30.0 |
| H41I | 10716.0 | 6461.0 | 8340.0 | 30.0 |
| H41J | 8442.0 | 5096.0 | 6070.0 | 40.0 |
| H41K | 9256.0 | 4454.0 | 6119.0 | 40.0 |
| H41L | 8379.0 | 4606.0 | 5210.0 | 40.0 |
| H42A | 7870.0 | 5025.0 | 1556.0 | 55.0 |
| H42B | 8819.0 | 5536.0 | 3104.0 | 30.0 |
| H42C | 6764.0 | 5341.0 | 1207.0 | 55.0 |
| H42D | 6367.0 | 6308.0 | 4405.0 | 36.0 |
| H42E | 6988.0 | 4478.0 | 1582.0 | 55.0 |

TABLE 7.5

Hydrogen bonds with bond lengths (Ångstrom) and angles (degrees °)

| D—H...A | Distance (D—H) | Distance (H...A) | Distance (D...A) | Angle (D—H...A) |
|---|---|---|---|---|
| N106—H10D...N401 | 0.8800 | 2.0700 | 2.919(2) | 161.00 |
| N206—H20D...N301 | 0.8800 | 2.3600 | 3.135(2) | 147.00 |
| N308—H30D...N201 | 0.8800 | 2.3300 | 3.146(2) | 154.00 |
| N406—H40D...N101 | 0.8800 | 2.1400 | 2.973(2) | 158.00 |
| C103—H10B...O219 | 0.9500 | 2.4400 | 2.948(2) | 113.00 |
| C104—H10C...O108 | 0.9500 | 2.4600 | 2.870(2) | 106.00 |
| C111—H11D...F116 | 0.9900 | 2.3800 | 2.7622(19) | 102.00 |
| C112—H11E...O119 | 1.0000 | 2.5600 | 3.069(2) | 112.00 |
| C114—H11I...N106 | 0.9900 | 2.5100 | 2.873(2) | 101.00 |
| C129—H12A...O408 | 0.9800 | 2.4800 | 3.381(2) | 152.00 |
| C122—H12B...O406 | 0.9500 | 2.4600 | 3.246(2) | 140.00 |
| C203—H20B...N224 | 0.9500 | 2.3500 | 3.269(2) | 163.00 |
| C204—H20C...O208 | 0.9500 | 2.3600 | 2.791(2) | 107.00 |
| C210—H21B...O208 | 0.9900 | 2.3500 | 2.7350(19) | 102.00 |
| C211—H21C...O219 | 0.9900 | 2.4700 | 3.189(2) | 129.00 |
| C213—H21F...F216 | 0.9900 | 2.3900 | 2.7455(18) | 100.00 |
| C214—H21H...O302 | 0.9900 | 2.5500 | 3.002(2) | 108.00 |
| C214—H21H...N301 | 0.9900 | 2.5700 | 3.253(2) | 126.00 |
| C217—H21K...O408 | 0.9800 | 2.5900 | 3.431(2) | 144.00 |
| C222—H22B...O308 | 0.9500 | 2.2600 | 1.104(2) | 147.00 |
| C304—H30C...O308 | 0.9500 | 2.4300 | 2.795(2) | 103.00 |
| C310—H31A...O308 | 0.9900 | 2.3500 | 2.706(2) | 100.00 |
| C311—H31C...O320 | 0.9900 | 2.5200 | 3.112(2) | 118.00 |
| C314—H31I...O202 | 0.9900 | 2.4800 | 3.055(2) | 117.00 |
| C317—H31K...O102 | 0.9800 | 2.5100 | 3.412(2) | 152.00 |
| C329—H32A...F428 | 0.9800 | 2.4600 | 3.282(3) | 142.00 |
| C322—H32B...O208 | 0.9500 | 2.4000 | 3.243(2) | 147.00 |
| C326—H32D...O319 | 1.0000 | 2.5500 | 3.208(3) | 123.00 |
| C403—H40B...F427 | 0.9500 | 2.4700 | 3.082(2) | 122.00 |
| C403—H40B...N424 | 0.9500 | 2.4600 | 3.375(3) | 163.00 |
| C404—H40C...O220 | 0.9500 | 2.5200 | 3.273(2) | 137.00 |
| C404—H40C...O408 | 0.9500 | 2.4100 | 2.793(2) | 104.00 |
| C410—H41A...O408 | 0.9900 | 2.2800 | 2.663(2) | 102.00 |
| C411—H41D...F418 | 0.9900 | 2.3000 | 2.678(2) | 102.00 |
| C412—H41E...O420 | 1.0000 | 2.4500 | 3.009(2) | 114.00 |
| C414—H41I...O102 | 0.9900 | 2.4500 | 3.326(2) | 148.00 |
| C414—H41I...N101 | 0.9900 | 2.6100 | 3.568(2) | 162.00 |
| C414—H41I...N406 | 0.9900 | 2.5300 | 2.910(2) | 102.00 |

TABLE 7.5-continued

Hydrogen bonds with bond lengths (Ångstrom) and angles (degrees °)

| D—H . . . A | Distance (D—H) | Distance (H . . . A) | Distance (D . . . A) | Angle (D—H . . . A) |
|---|---|---|---|---|
| C417—H41J . . . F127 | 0.9800 | 2.4200 | 3.311(3) | 151.00 |
| C429—H42A . . . O108 | 0.9800 | 2.5100 | 3.400(2) | 151.00 |
| C422—H42B . . . O108 | 0.9500 | 2.5000 | 3.268(2) | 138.00 |
| C426—H42D . . . O419 | 1.0000 | 2.4100 | 2.983(3) | 116.00 |

Figure 12B:
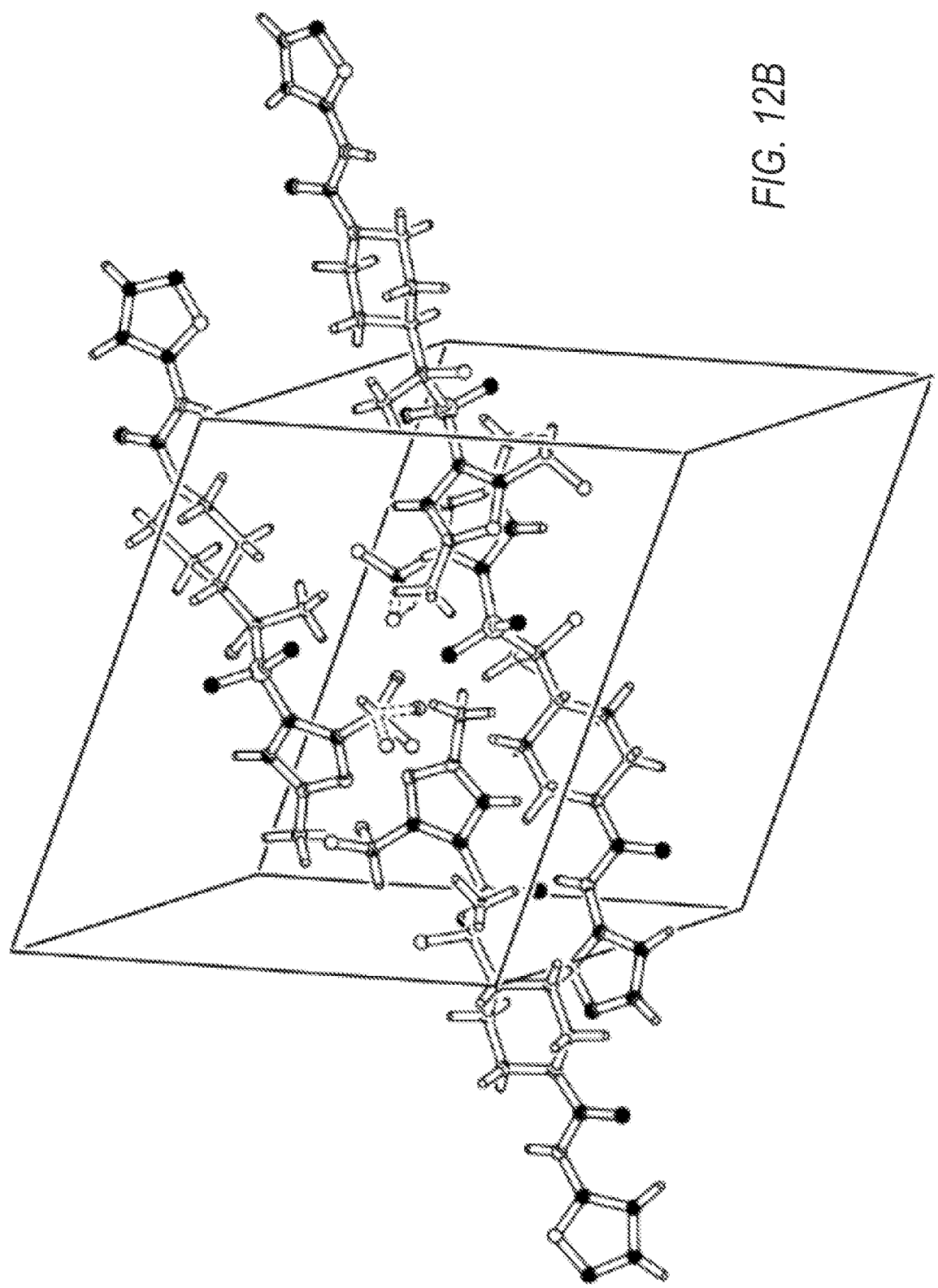
FIG. 12B shows the crystal structure of monoclinic Form C representing the molecular packing down the short axis with disordered regions indicated with dotted lines.

Representation of the crystal structures are given in FIG. 12A and FIG. 12B; the figures were generated with the PLATON program (Spek, A. L. *J. Appl. Cryst.* 2003 36, 7-13) for both structures.

The I-491 molecule contains a sulfur atom that allows the absolute configuration to be determined, making used of a high resolution data collection (performed at low temperature). The Flack x parameter is calculated based on the anomalous scattering method. It gives the absolute structure, providing a sufficient estimate standard deviation is reached. According to the theory, the expected values of the Flack x parameter are 0 for correct (within 3 esd.s) and +1 for inverted absolute structure (Flack, H. D., Bernadinelli, G. *Acta. Cryst.* 1999 A55, 908-915). The results are the following: Considering the configuration C115: R; C415: R; C215: R; C315: R; the Flack parameter is 0.031 (6), which unambiguously proved this absolute configuration for I-491 Form C.

Simulated diffraction patterns were produced from the low temperature experimentally determined crystal structure of Form C (FIG. 13). An experimental powder diffraction pattern can be compared to one of these theoretical patterns to demonstrate the nature of the crystalline structure. Minor differences (if any) can be explained by preferential orientations in the powder.

The polymorphic crystal structures of I-491 Form C was determined by single crystal X-ray diffraction, allowing the generation of a reference powder pattern. Form C was fully characterized by this work.

Example 8. Characterization of Form D

Slow evaporation from MeCN/H$_2$O mixture afforded crystals suitable for X-ray diffraction studies.

A single crystal selected by observation under a binocular microscope was mounted on the goniometric head of a Bruker Instrument APEX DUO diffractometer (Bruker AXS (2011). APEX2 suite V 2011.2-0. Madison, Wisconsin, U.S.A.). Intensities were collected at low temperature (T=113 K), with the use of a graphite monochromated Cu Kα radiation (λ=1.54178 Å). Systematic investigation of the diffraction nodes indicates that the first crystal belongs to the triclinic system, with a primitive Bravais lattice. The unit cell parameters of the phase termed D are: a (Å)=9.78, b (Å)=13.86, c (Å)=16.11, α(°)=65.39, β(°)=84.54, γ(°)=72.42.

In view of the number of atoms in the I-491 molecule and of the unit cell volume, it is concluded that this unit cell must contain 4 molecules having the formula C16 H20 F3 N5 O4 S which is equivalent to a calculated density of 1.522. The number of reflections collected was 27364, of which 11440 were unique.

Based on the statistical distribution of the intensities, a non-centrosymmetric structure is deduced.

The crystal structure of Form D was solved by direct methods using the SIR software (Altomare, A.; Cascarano, G.; Giacovazzo, C.; Guagliardi, A.; Burla, M. C.; Polidori, G.; Cavalli, A. *J. Appl. Crystallogr.* 1994, 27, 435-436) and refined on F$^2$ by full least squares methods with SHELXTL (Sheldrick, G. M. *Acta Crystallogr. Sect. A* 2008, A64, 112-122). All non-hydrogen atoms were refined with anisotropic displacement parameters, a riding model was used for hydrogen atoms. Final agreement values are R1=0.0430 (observed reflections) and wR2=0.1179 (all data) for 11440 reflections and 1045 parameters, with a goodness of fit of 1.071.

The compound in the crystal structure of Form D (FIG. 14 and FIG. 15) crystallizes in the space group P 1, the asymmetric unit of the crystal is made up of 4 molecules of I-491, thus 4 formulae are present in the unit cell. No additional molecule like organic or water is found. The asymmetric cell contains: 4 (C16 H20 F3 N5 O4 S). Examination of the molecular structure confirms that all bond angles and lengths stand in the standard range values. A piperidine group is disordered in the solid state.

Crystal data, X-rays experimental parameters and structure refinements for Form D are given in Table 8. Table 8.1 lists the positional parameters for all independent non-hydrogen atoms together with their equivalent isotropic displacement parameters. Bond lengths and angles are listed Table 8.2 and 8.3. Hydrogen positions are reported Table 8.4. Table 8.5 lists all the hydrogen bonds.

TABLE 8

| | |
|---|---|
| Identification code | Form D |
| Chemical formula | C16 H17.75 F3 N5 O4 S |
| Molecular weight | 433.16 |
| Temperature | 113(2) |
| Wavelength | 1.54178 |
| Crystal system; space group | Triclinic; P 1 |
| Unit cell dimensions | a = 9.7779(2) Å; α = 65.3922(8)° |
| | b = 13.8626(2) Å; β = 84.5393(9)° |
| | c = 16.1058(2) Å; γ = 72.4184(8)° |
| Volume | 1890.93(5) Å$^3$ |
| Z, Calculated density | 4, 1.522 Mg/m$^3$ |
| Absorption coefficient | 2.114 l/mm |
| F(000) | 895 |
| Theta range for data collection | 3.02° to 68.04° |
| Limiting indices | −11 <= h <= 11; |
| | −16 <= k <= 16; |
| | −19 <= l <= 18 |
| Reflection collected/unique | 27364/11440 [R(int) = 0.0446] |
| Completeness to theta max | 96.5% |
| Refinement method | Full-matrix least-square on F$^2$ |
| Data/restraints/parameters | 11440/826/1045 |
| Goodness of fit on F$^2$ | 1.071 |
| Final R indices [I > 2sigma(I)] | R1 = 0.0430; wR2 = 0.1139 |
| Final R indices [all data] | R1 = 0.0502; wR2 = 0.1179 |
| Absolute structure parameter | 0.003(13) |
| Largest diff peak and hole | 0.499 d −0.442e/Å$^3$ |

TABLE 8.1

Atomic coordinates (×10$^4$) and equivalent isotropic displacements parameters (Å$^2$ × 10$^3$) for Form D. U(eq) is defined as one third of the trace of the orthogonalized U$_{ij}$ tensor.

| Label | x | y | z | U(eq) |
|---|---|---|---|---|
| C103 | −3863(3) | 7003(2) | −6063.7(1.9) | 43.9(8) |
| C104 | −3695(3) | 6566.2(1.8) | −5150.7(1.7) | 34.3(7) |
| C105 | −2331(2) | 5755.7(1.6) | −4972.6(1.5) | 24.3(5) |
| C107 | −2069(2) | 5039.5(1.7) | −3320.0(1.6) | 24.6(5) |
| C110 | −120(3) | 3295.6(1.8) | −2606.6(1.6) | 29.1(6) |
| C111 | 965(3) | 2802.9(1.8) | −1820.5(1.5) | 26.4(6) |
| C112 | 238(2) | 2466.1(1.7) | −899.0(1.5) | 24.3(5) |
| C113 | −902(3) | 3504.6(1.9) | −891.5(1.6) | 29.8(6) |
| C114 | −1980(3) | 3992(2) | −1683.9(1.7) | 32.6(7) |
| C115 | 1340(2) | 1900.5(1.7) | −103.2(1.6) | 26.1(6) |
| C117 | 1963(3) | 2651(2) | 96.0(1.8) | 36.8(7) |
| C121 | 1986(3) | 407.0(1.7) | 1727.9(1.6) | 25.5(6) |
| C122 | 2139(2) | 813.3(1.8) | 2349.2(1.6) | 27.0(6) |
| C125 | 3269(2) | −445.6(1.8) | 1815.5(1.6) | 25.0(6) |
| C126 | 3705(3) | −1193.4(1.8) | 1321.9(1.8) | 32.1(6) |
| C129 | 4057(3) | 298(2) | 3502.6(1.8) | 40.8(7) |
| C203 | 929(3) | 8419(2) | −943.0(1.8) | 39.9(7) |
| C204 | 1073(3) | 8058.5(1.9) | −34.3(1.8) | 34.0(7) |
| C205 | 1945(2) | 6939(2) | 241.5(1.9) | 32.6(6) |
| C207 | 1999(2) | 6288.8(1.7) | 1884.9(1.6) | 25.8(6) |
| C210 | 4301(2) | 5034.1(1.8) | 2727.3(1.6) | 26.0(6) |
| C211 | 4804(2) | 3925.3(1.8) | 3547.0(1.6) | 25.6(6) |
| C212 | 4227(2) | 4037.3(1.6) | 4439.6(1.5) | 20.9(5) |
| C213 | 2581(2) | 4471.9(1.8) | 4323.4(1.6) | 26.0(6) |
| C214 | 2134(2) | 5595.5(1.9) | 3522.2(1.6) | 27.2(6) |
| C215 | 4705(2) | 2968.8(1.7) | 5311.3(1.5) | 22.7(5) |
| C217 | 4515(2) | 1933.4(1.8) | 5318.9(1.7) | 26.8(6) |
| C221 | 6913(2) | 1784.5(1.7) | 6737.4(1.6) | 25.3(5) |
| C222 | 6518(3) | 1978.3(1.8) | 7509.6(1.8) | 31.7(6) |
| C225 | 7747(2) | 661.4(1.8) | 7069.8(1.7) | 27.2(6) |
| C226 | 8429(2) | −56.4(1.8) | 6567.2(1.7) | 27.8(6) |
| C229 | 6965(2) | 803(2) | 9194.7(1.9) | 40.5(7) |
| C303 | 5978(3) | 2550(2) | 11360.7(1.9) | 47.5(9) |
| C304 | 5780(3) | 2864(2) | 10469.5(1.9) | 41.8(7) |
| C305 | 4678(3) | 3878.1(1.9) | 10195.4(1.7) | 30.9(6) |
| C307 | 4144(2) | 4267.9(1.8) | 8632.4(1.6) | 26.9(6) |
| C310 | 3503(3) | 4675.5(1.8) | 7095.7(1.7) | 30.6(6) |
| C311 | 2181(3) | 5320.5(1.7) | 6475.8(1.6) | 28.9(6) |
| C312 | 2039(2) | 6567.5(1.7) | 6058.3(1.5) | 22.7(5) |
| C313 | 1977(3) | 6931.8(1.7) | 6849.3(1.6) | 25.7(6) |
| C314 | 3293(3) | 6231.4(1.7) | 7493.4(1.7) | 27.5(6) |
| C315 | 772(2) | 7221.0(1.6) | 5366.7(1.5) | 22.8(5) |
| C317 | −700(2) | 7479.6(1.9) | 5742.5(1.7) | 29.3(6) |
| C321 | −182(2) | 8986.7(1.7) | 3650.6(1.6) | 25.1(6) |
| C322 | −269(2) | 8539.7(1.8) | 3037.9(1.6) | 24.3(6) |
| C325 | −1448(3) | 9879.0(1.7) | 3474.6(1.6) | 26.4(6) |
| C326 | −1966(3) | 10868.8(1.8) | 3929.1(1.6) | 27.4(6) |
| C329 | −2093(3) | 8996.7(1.9) | 1836.8(1.7) | 28.8(6) |
| C403 | 11286(3) | 1144.5(1.8) | 16007.8(1.7) | 28.9(6) |
| C404 | 10964(2) | 1511.3(1.8) | 15120.7(1.7) | 25.6(6) |
| C405 | 10310(2) | 2683.4(1.6) | 14831.8(1.5) | 21.5(5) |
| C407 | 9897(4) | 3314(2) | 13220(2) | 63.7(1.0) |
| C410 | 8567(3) | 5287.7(1.9) | 12386.8(1.8) | 36.8(7) |
| C411 | 7630(5) | 5983(3) | 11496(3) | 38.2(4) |
| C412 | 8563(5) | 6111(3) | 10653(3) | 38.2(4) |
| C413 | 9287(5) | 4949(3) | 10683(3) | 38.2(4) |
| C414 | 10252(5) | 4260(3) | 11546(3) | 38.2(4) |
| C415 | 7655(4) | 6894(2) | 9763(2) | 54.6(9) |
| C417 | 8668(4) | 6881(3) | 9005(3) | 70.4(1.0) |
| C421 | 5429(3) | 7781(2) | 8400.7(1.9) | 34.6(6) |
| C422 | 5739(3) | 7551.1(1.9) | 7633.6(1.7) | 31.2(6) |
| C425 | 4557(3) | 8907(2) | 8046.8(1.8) | 33.3(6) |
| C426 | 3883(3) | 9619(2) | 8552(2) | 43.9(8) |
| C429 | 5060(3) | 8626(2) | 5968.6(1.8) | 36.2(7) |
| C511 | 8505(8) | 6062(5) | 11436(4) | 38.2(4) |
| C512 | 7560(8) | 5862(5) | 10856(5) | 38.2(4) |
| C513 | 8272(8) | 4693(5) | 10881(4) | 38.2(4) |
| C514 | 8358(8) | 3849(5) | 11884(4) | 38.2(4) |
| F116 | 2470.4(1.4) | 1115.2(1.0) | −276.6(9) | 32.3(4) |
| F127 | 4879.7(1.8) | −1007.7(1.3) | 825.7(1.1) | 49.8(4) |
| F128 | 4122(2) | −2264.4(1.2) | 1935.5(1.2) | 60.3(6) |
| F216 | 3943.6(1.4) | 3175.7(1.0) | 6036.0(9) | 30.1(3) |
| F226 | 7591.2(1.6) | −715.3(1.2) | 6639.6(1.1) | 44.2(4) |
| F227 | 9706.5(1.6) | −768.9(1.1) | 6989.4(1.0) | 38.8(4) |
| F316 | 757.2(1.3) | 6620.3(9) | 4856.6(9) | 25.3(3) |
| F327 | −3021(2) | 11554.5(1.2) | 3416.8(1.1) | 54.5(5) |
| F328 | −2627(1.9) | 10160.6(1.2) | 4719.7(1.1) | 46.8(4) |
| F416 | 7327.8(1.9) | 7937.5(1.2) | 9790.9(1.2) | 49.3(5) |
| F427 | 4512(2) | 10442.9(1.5) | 8317.3(1.6) | 87.2(6) |
| F428 | 2514(2) | 10151.0(1.4) | 8268.0(1.5) | 59.9(5) |
| N101 | −1720(2) | 5711.2(1.6) | −5721.7(1.4) | 34.1(6) |
| N106 | −1609(2) | 5017.5(1.3) | −4146.2(1.2) | 21.7(4) |
| N109 | −1273(2) | 4227.6(1.4) | −2561.8(1.3) | 25.8(5) |
| N123 | 3422(2) | 222.4(1.5) | 2764.7(1.3) | 27.8(5) |
| N124 | 4123(2) | −559.6(1.5) | 2451.7(1.4) | 28.4(5) |
| N201 | 2283(3) | 6686.1(1.8) | −454.2(1.5) | 44.0(7) |
| N206 | 2480(2) | 6170.9(1.5) | 1100.2(1.4) | 30.9(5) |
| N209 | 2726(2) | 5495.0(1.5) | 2681.0(1.3) | 24.7(5) |
| N223 | 7090(2) | 1032.2(1.5) | 8225.7(1.4) | 30.2(5) |
| N224 | 7862(2) | 215.9(1.5) | 7970.4(1.4) | 30.5(5) |
| N301 | 4235(3) | 4141.8(1.7) | 10886.6(1.5) | 40.8(6) |
| N306 | 4047(2) | 4588.3(1.5) | 9343.9(1.3) | 29.1(5) |
| N309 | 3442(2) | 5049.6(1.4) | 7828.0(1.3) | 26.0(5) |
| N323 | −1499(2) | 9140.2(1.4) | 2560.3(1.3) | 25.6(5) |
| N324 | −2249(2) | 9977.0(1.4) | 2802.3(1.3) | 24.5(5) |
| N401 | 10272(2) | 2974.8(1.4) | 15513.0(1.3) | 26.0(5) |
| N406 | 9775.6(1.9) | 3488.9(1.4) | 13992.9(1.3) | 22.9(4) |
| N409 | 9317(3) | 4180.6(1.9) | 12424.3(1.7) | 56.5(8) |
| N423 | 5084(2) | 8454.4(1.5) | 3927.2(1.4) | 28.0(5) |
| N424 | 4350(2) | 9295.8(1.6) | 7159.6(1.5) | 32.2(5) |
| O08A | 10099(4) | 2238(3) | 13347(2) | 38.2(4) |
| O08B | 10987(4) | 2533(3) | 13185(2) | 38.2(4) |
| O102 | −2713(2) | 6533.4(1.5) | −6436.5(1.3) | 44.8(6) |
| O108 | −3126.9(1.8) | 5777.4(1.2) | −6265.1(1.1) | 30.4(4) |
| O119 | 301.5(1.9) | 189.5(1.4) | 703.9(1.3) | 37.5(5) |
| O120 | −550.3(1.9) | 1725.9(1.5) | 1203.8(1.3) | 41.3(5) |
| O202 | 1646(2) | 7629.1(1.5) | −1236.7(1.3) | 47.0(6) |
| O208 | 915.9(1.8) | 7030.6(1.3) | 1884.3(1.2) | 33.0(5) |
| O219 | 6622.5(1.9) | 3787.0(1.3) | 5591.3(1.4) | 42.6(5) |
| O220 | 7458.7(1.7) | 2289.3(1.4) | 5033.1(1.2) | 32.9(5) |
| O302 | 5080(2) | 3281.1(1.5) | 11646.7(1.3) | 50.0(6) |
| O308 | 4757.9(1.8) | 3306.8(1.2) | 8735.8(1.2) | 31.8(4) |
| O319 | 2502.7(1.7) | 8114.5(1.4) | 4127.0(1.3) | 36.8(5) |
| O320 | 947.0(1.9) | 9255.9(1.3) | 4894.3(1.3) | 35.5(5) |
| O402 | 10907.0(1.9) | 1981.9(1.2) | 16278.6(1.1) | 31.2(4) |
| O419 | 6239(4) | 5740.3(1.7) | 9509.1(1.8) | 81.2(9) |
| O420 | 4919(3) | 7159(2) | 10104.6(1.6) | 66.7(7) |
| S118 | 589.2(6) | 1019.5(4) | 917.6(4) | 27.39(14) |
| S218 | 6563.1(6) | 2759.6(4) | 5611.5(4) | 26.51(13) |
| S318 | 1145.2(5) | 8473.1(4) | 4491.0(4) | 24.67(13) |
| S418 | 5931.9(9) | 6818.3(6) | 9511.3(5) | 49.2(2) |

TABLE 8.2

Bond lengths (Å)

| Bond | Length (Å) |
|---|---|
| C103—C104 | 1.342(4) |
| C104—C105 | 1.423(3) |
| C105—N105 | 1.387(3) |
| C107—N109 | 1.368(3) |
| C107—O108 | 1.242(3) |
| C110—C111 | 1.514(3) |
| C111—C112 | 1.533(3) |
| C112—C113 | 1.536(3) |
| C112—C115 | 1.528(3) |
| C113—C114 | 1.518(4) |
| C115—C117 | 1.502(4) |
| C115—F116 | 1.397(3) |
| C115—S118 | 1.837(2) |
| C121—C122 | 1.375(4) |
| C121—C125 | 1.410(3) |
| C122—N123 | 1.333(3) |
| C125—C126 | 1.498(4) |

TABLE 8.2-continued

Bond lengths (Å)

| Bond | Length (Å) |
|---|---|
| C126—F127 | 1.363(3) |
| C126—F128 | 1.355(3) |
| C203—C204 | 1.341(4) |
| C204—C205 | 1.425(3) |
| C205—N206 | 1.376(3) |
| C207—N209 | 1.373(3) |
| C207—C208 | 1.233(3) |
| C210—C211 | 1.525(3) |
| C211—C212 | 1.545(3) |
| C212—C213 | 1.539(3) |
| C212—C215 | 1.536(3) |
| C213—C214 | 1.518(3) |
| C215—C217 | 1.497(3) |
| C215—F216 | 1.408(3) |
| C215—S218 | 1.830(2) |
| C221—C222 | 1.376(4) |
| C221—C225 | 1.413(3) |
| C222—N223 | 1.335(3) |
| C225—C226 | 1.502(4) |
| C226—F227 | 1.362(3) |
| C303—C304 | 1.330(4) |
| C304—C305 | 1.411(3) |
| C305—N306 | 1.378(3) |
| C307—N309 | 1.369(3) |
| C307—C308 | 1.231(3) |
| C310—C311 | 1.507(3) |
| C311—C312 | 1.538(3) |
| C312—C313 | 1.544(4) |
| C312—C315 | 1.530(3) |
| C313—C314 | 1.528(3) |
| C315—C317 | 1.506(3) |
| C315—F316 | 1.396(3) |
| C315—S318 | 1.839(2) |
| C321—C322 | 1.386(4) |
| C321—C325 | 1.411(3) |
| C322—N323 | 1.330(3) |
| C325—C326 | 1.501(4) |
| C326—F327 | 1.344(3) |
| C326—F328 | 1.381(3) |
| C403—C404 | 1.335(4) |
| C404—C405 | 1.437(3) |
| C405—N406 | 1.368(3) |
| C407—N409 | 1.360(4) |
| C410—C411 | 1.546(5) |
| C410—C511 | 1.453(7) |
| C411—C412 | 1.539(6) |
| C412—C413 | 1.533(6) |
| C412—C415 | 1.544(5) |
| C413—C414 | 1.527(6) |
| C415—C417 | 1.501(5) |
| C415—C512 | 1.762(7) |
| C415—F416 | 1.402(4) |
| C415—S418 | 1.814(4) |
| C421—C422 | 1.385(4) |
| C421—C425 | 1.427(3) |
| C422—N423 | 1.319(3) |
| C425—C426 | 1.498(4) |
| C426—F427 | 1.358(4) |
| C426—F428 | 1.336(3) |
| C511—C512 | 1.530(10) |
| C512—C513 | 1.543(9) |
| C513—C514 | 1.542(8) |
| F226—C226 | 1.365(3) |
| N101—C105 | 1.311(3) |
| N101—O102 | 1.421(3) |
| N106—C107 | 1.373(3) |
| N109—C110 | 1 458(3) |
| N109—C114 | 1.466(3) |
| N123—C129 | 1.446(4) |
| N123—N124 | 1.356(3) |
| N124—C125 | 1.312(3) |
| N201—C205 | 1.309(4) |
| N201—O202 | 1.416(3) |
| N206—C207 | 1.363(3) |
| N209—C210 | 1.474(3) |
| N209—C214 | 1.466(3) |
| N223—C229 | 1.458(3) |
| N223—N224 | 1.354(3) |
| N224—C225 | 1.320(3) |
| N301—C305 | 1.308(4) |
| N301—O302 | 1.409(3) |
| N306—C307 | 1.377(3) |
| N309—C310 | 1.463(3) |
| N309—C314 | 1.460(3) |
| N323—C329 | 1458(3) |
| N323—N324 | 1.358(3) |
| N324—C325 | 1.334(3) |
| N401—C405 | 1.312(3) |
| N401—O402 | 1.420(2) |
| N406—C407 | 1.353(4) |
| N409—C410 | 1.466(3) |
| N409—C414 | 1.592(5) |
| N409—C514 | 1.612(8) |
| N423—C429 | 1.463(3) |
| N423—N424 | 1.350(3) |
| N424—C425 | 1.312(4) |
| O08A—C407 | 1.373(5) |
| O08B—C407 | 1.285(5) |
| O102—C103 | 1.343(3) |
| O202—C203 | 1.348(4) |
| O302—C303 | 1.336(3) |
| O402—C403 | 1.344(3) |
| S118—C121 | 1.734(2) |
| S118—O119 | 1.437(2) |
| S118—O120 | 1.4254(19 |
| S218—C221 | 1.741(2) |
| S218—O219 | 1.430(2) |
| S218—O220 | 1.437(2) |
| S318—C321 | 1.731(2) |
| S318—O319 | 1.4313(18 |
| S318—O320 | 1.440(2) |
| S418—C421 | 1.733(3) |
| S418—O419 | 1.434(2) |
| S418—O420 | 1.425(3) |

TABLE 8.3

Bond angles (°)

| Atoms | Angle (°) |
|---|---|
| C103—C104—C105 | 103.7(2) |
| C103—O102—N101 | 108.49(19) |
| C104—C103—O102 | 110.8(2) |
| C105—N101—O102 | 104.47(18) |
| C107—N106—C105 | 123.48(18) |
| C107—N109—C110 | 122.1(2) |
| C107—N109—C114 | 116.98(18) |
| C110—C111—C112 | 111.1(2) |
| C110—N109—C114 | 114.74(17) |
| C111—C112—C113 | 107.70(17) |
| C112—C115—S118 | 109.59(17) |
| C114—C113—C112 | 110.5(2) |
| C115—C112—C111 | 111.27(19) |
| C115—C112—C113 | 113.9(2) |
| C117—C115—C112 | 115.95(13) |
| C117—C115—S118 | 111.79(13) |
| C121—C125—C126 | 129.5(2) |
| C121—S118—C115 | 103.48(11) |
| C122—C121—C125 | 105.4(2) |
| C122—C121—S118 | 123.85(16) |
| C122—N123—C129 | 127.7(2) |
| C122—N123—N124 | 112.2(2) |
| C125—C121—S118 | 130.1(2) |
| C125—N124—N123 | 105.70(18) |
| C203—C204—C205 | 103.2(2) |
| C203—O202—N201 | 107.0(2) |
| C204—C203—O202 | 112.0(2) |
| C205—N201—O202 | 105.91(19) |

TABLE 8.3-continued

Bond angles (°)

| Atoms | Angle (°) |
|---|---|
| C207—N206—C205 | 123.57(19) |
| C207—N209—C210 | 121.65(19) |
| C207—N209—C214 | 115.56(18) |
| C210—C211—C212 | 110.58(18) |
| C212—C215—S218 | 108.68(16) |
| C213—C212—C211 | 106.95(19) |
| C214—C213—C212 | 110.21(19) |
| C214—N239—C210 | 113.60(19) |
| C215—C212—C211 | 114.70(17) |
| C215—C212—C213 | 111.29(18) |
| C217—C215—C212 | 117.6(2) |
| C217—C215—S218 | 111.06(14) |
| C221—C225—C228 | 130.4(2) |
| C221—S218—C215 | 107.49(11) |
| C222—C221—C225 | 104.6(2) |
| C222—C221—S218 | 126.43(16) |
| C222—N223—C229 | 128.4(2) |
| C222—N223—N224 | 112.2(2) |
| C225—C221—S218 | 128.8(2) |
| C225—N224—N223 | 105.24(17) |
| C303—C304—C305 | 104.4(3) |
| C303—O302—N301 | 107.9(2) |
| C304—C303—O302 | 110.9(2) |
| C305—N301—O302 | 105.31(18) |
| C305—N306—C307 | 122.68(19) |
| C307—N309—C310 | 115.73(18) |
| C307—N309—C314 | 123.8(2) |
| C310—C311—C312 | 110.5(2) |
| C311—C312—C313 | 108.02(18) |
| C311—C312—C315 | 110.9(2) |
| C312—C315—S318 | 109.32(16) |
| C314—C313—C312 | 110.34(18) |
| C314—N309—C310 | 113.31(18) |
| C315—C312—C313 | 114.75(18) |
| C317—C315—C312 | 117.1(2) |
| C317—C315—S318 | 111.84(14) |
| C321—C325—C326 | 129.6(2) |
| C321—S318—C315 | 104.54(11) |
| C322—C321—C325 | 104.8(2) |
| C322—C321—S318 | 128.23(16) |
| C322—N323—C320 | 127.9(2) |
| C322—N323—N324 | 113.3(2) |
| C325—C321—S318 | 128.9(2) |
| C325—N324—N323 | 104.37(17) |
| C403—C404—C405 | 104.3(2) |
| C403—O402—N401 | 108.00(18) |
| C404—C403—O402 | 111.05(19) |
| C405—N401—O402 | 105.70(17) |
| C407—N406—C405 | 123.9(2) |
| C407—N409—C410 | 121.8(3) |
| C407—N409—C414 | 115.7(3) |
| C407—N409—C514 | 111.5(3) |
| C410—C511—C512 | 110.9(6) |
| C410—N409—C414 | 110.9(2) |
| C410—N409—C514 | 109.2(3) |
| C411—C412—C415 | 111.0(3) |
| C412—C411—C410 | 110.7(3) |
| C412—C415—C512 | 38.7(3) |
| C412—C415—S418 | 124.4(3) |
| C413—C412—C411 | 107.6(3) |
| C413—C412—C415 | 112.3(4) |
| C413—C414—N409 | 109.7(3) |
| C414—C413—C412 | 108.9(4) |
| C414—N409—C514 | 79.9(3) |
| C417—C415—C412 | 105.2(3) |
| C417—C415—C512 | 131.5(3) |
| C417—C415—S418 | 111.1(2) |
| C421—C425—C426 | 128.7(2) |
| C421—S418—C415 | 106.81(14) |
| C422—C421—C425 | 103.8(2) |
| C422—C421—S418 | 124.58(18) |
| C422—N423—C429 | 128.2(2) |
| C422—N423—N424 | 113.0(2) |
| C425—C421—S418 | 131.5(2) |
| C425—N424—N423 | 105.35(18) |
| C511—C410—C411 | 34.2(3) |
| C511—C410—N409 | 106.9(3) |
| C511—C512—C415 | 101.7(5) |
| C511—C512—C513 | 107.9(5) |
| C512—C415—S418 | 86.2(3) |
| C512—C513—C514 | 107.9(6) |
| C513—C512—C415 | 111.0(5) |
| C513—C514—N409 | 105.5(5) |
| F116—C115—C112 | 108.8(2) |
| F116—C115—C117 | 108.1(2) |
| F116—C115—S118 | 101.65(13) |
| F127—C126—C125 | 109.2(2) |
| F128—C126—C125 | 109.7(2) |
| F128—C126—F127 | 106.02(19) |
| F216—C215—C212 | 107.20(16) |
| F216—C215—C217 | 108.51(18) |
| F216—C215—S218 | 102.66(16) |
| F226—C226—C225 | 108.8(2) |
| F227—C226—C225 | 109.7(2) |
| F227—C226—F226 | 105.21(17) |
| F316—C315—C312 | 108.03(16) |
| F316—C315—C317 | 107.6(2) |
| F316—C315—S318 | 101.74(14) |
| F327—C326—C325 | 110.3(2) |
| F327—C326—F328 | 104.01(19) |
| F328—C326—C325 | 108.02(19) |
| F416—C415—C412 | 103.2(3) |
| F416—C415—C417 | 108.2(3) |
| F416—C415—C512 | 111.0(3) |
| F416—C415—S418 | 103.59(19) |
| F427—C426—C425 | 109.3(2) |
| F428—C426—C425 | 109.8(3) |
| F428—C426—F427 | 104.2(2) |
| N101—C105—C104 | 112.5(2) |
| N101—C105—N106 | 117.68(19) |
| N106—C105—C104 | 129.8(2) |
| N109—C107—N106 | 116.53(18) |
| N109—C110—C111 | 111.5(2) |
| N109—C114—C113 | 111.6(2) |
| N123—C122—C121 | 106.4(2) |
| N124—C125—C121 | 110.3(2) |
| N124—C125—C126 | 120.18(19) |
| N124—N123—C129 | 119.95(19) |
| N201—C205—C204 | 111.9(2) |
| N201—C205—N206 | 119.0(2) |
| N206—C205—C204 | 129.1(3) |
| N206—C207—N209 | 116.46(19) |
| N209—C210—C211 | 111.57(19) |
| N209—C214—C213 | 109.70(19) |
| N223—C222—C221 | 107.0(2) |
| N224—C225—C221 | 110.9(2) |
| N224—C225—C228 | 116.70(19) |
| N224—N223—C229 | 119.39(18) |
| N301—C305—C304 | 111.4(2) |
| N301—C305—N306 | 118.4(2) |
| N306—C305—C304 | 130.2(3) |
| N309—C307—N306 | 116.68(19) |
| N309—C310—C311 | 110.49(19) |
| N309—C314—C313 | 111.4(2) |
| N323—C322—C321 | 106.5(2) |
| N324—C325—C321 | 111.0(2) |
| N324—C325—C326 | 119.38(19) |
| N324—N323—C329 | 118.82(17) |
| N401—C405—C464 | 110.90(19) |
| N401—C405—N406 | 118.46(19) |
| N406—C405—C404 | 130.6(2) |
| N406—C407—N409 | 118.6(3) |
| N406—C407—O08A | 115.3(3) |
| N409—C407—O08A | 121.5(3) |
| N409—C410—C411 | 109.7(3) |
| N423—C422—C421 | 107.1(2) |
| N424—C425—C421 | 110.8(2) |
| N424—C425—C426 | 120.5(2) |
| N424—N423—C429 | 118.85(18) |
| O08B—C407—N406 | 116.7(3) |
| O08B—C407—N409 | 118.7(3) |
| O08B—C407—O08A | 45.7(3) |

TABLE 8.3-continued

Bond angles (°)

| Atoms | Angle (°) |
|---|---|
| O108—C107—N106 | 121.79(19) |
| O108—C107—N109 | 121.6(2) |
| O119—S118—C115 | 107.01(11) |
| O119—S118—C121 | 109.76(11) |
| O120—S118—C115 | 107.85(10) |
| O120—S118—C121 | 108.18(12) |
| O120—S118—O119 | 119.38(12) |
| O208—C207—N206 | 121.6(2) |
| O208—C207—N209 | 121.6(2) |
| O219—S218—C215 | 106.45(10) |
| O219—S218—C221 | 107.25(12) |
| O219—S218—O220 | 120.20(12) |
| O220—S218—C215 | 106.69(11) |
| O220—S218—C221 | 108.18(10) |
| O308—C307—N306 | 121.3(2) |
| O308—C307—N309 | 121.9(2) |
| O319—S318—C315 | 106.77(10) |
| O319—S318—C321 | 108.72(12) |
| O319—S318—O320 | 119.65(12) |
| O320—S318—C315 | 107.48(11) |
| O320—S318—C321 | 108.63(11) |
| O419—S418—C415 | 104.37(17) |
| O419—S418—C421 | 107.13(15) |
| O420—S418—C415 | 107.69(17) |
| O420—S418—C421 | 107.80(13) |
| O420—S418—O419 | 122.07(17) |

TABLE 8.4

Hydrogen coordinates ($\times 10^4$) and isotropic displacements parameters ($\text{Å}^2 \times 10^3$)

| Label | x | y | z | U(eq) |
|---|---|---|---|---|
| H10B | −4684.0 | 7569.0 | −6401.0 | 53.0 |
| H10C | −4337.0 | 6754.0 | −4724.0 | 41.0 |
| H10D | −815.0 | 4508.0 | −4152.0 | 26.0 |
| H11A | 369.0 | 3549.3 | −3192.0 | 35.0 |
| H11B | −533.0 | 2718.0 | −2590.0 | 35.0 |
| H11C | 1460.0 | 3353.0 | −1877.0 | 32.0 |
| H11D | 1696.0 | 2144.0 | −1848.0 | 32.0 |
| H11E | −267.0 | 1921.0 | −862.0 | 29.0 |
| H11F | −1407.0 | 3309.0 | −308.0 | 36.0 |
| H11G | −431.0 | 4064.0 | −937.0 | 36.0 |
| H11H | −2527.0 | 3464.0 | −1598.0 | 39.0 |
| H11I | −2667.0 | 4686.0 | −1690.0 | 39.0 |
| H11J | 1227.0 | 3097.0 | 355.0 | 55.0 |
| H11K | 2291.0 | 3143.0 | −471.8 | 55.0 |
| H11L | 2776.0 | 2204.0 | 535.0 | 55.0 |
| H12A | 3476.0 | 957.0 | 3593.0 | 61.0 |
| H12B | 1464.0 | 1399.0 | 2460.0 | 32.0 |
| H12C | 5033.0 | 353.0 | 3350.0 | 61.0 |
| H12D | 2897.0 | −1066.0 | 916.0 | 38.0 |
| H12E | 4092.0 | −365.0 | 4065.0 | 61.0 |
| H20B | 386.0 | 9144.0 | −1333.0 | 48.0 |
| H20C | 688.0 | 8454.0 | 336.0 | 41.0 |
| H20D | 3171.0 | 5570.0 | 1145.0 | 37.0 |
| H21A | 4748.0 | 5565.0 | 2771.0 | 31.0 |
| H21B | 4620.0 | 4932.0 | 2159.0 | 31.0 |
| H21C | 5867.0 | 3668.0 | 3586.0 | 31.0 |
| H21D | 4460.0 | 3366.0 | 3467.0 | 31.0 |
| H21E | 4577.0 | 4614.0 | 4499.0 | 25.0 |
| H21F | 2210.0 | 3941.0 | 4217.0 | 31.0 |
| H21G | 2164.0 | 4538.0 | 4889.0 | 31.0 |
| H21H | 1073.0 | 5876.0 | 3459.0 | 33.0 |
| H21I | 2490.0 | 6131.0 | 3632.0 | 33.0 |
| H21J | 5128.0 | 1730.0 | 4865.0 | 40.0 |
| H21K | 3509.0 | 2062.0 | 5170.0 | 40.0 |
| H21L | 4782.0 | 1331.0 | 5927.0 | 40.0 |
| H22A | 6341.0 | 1463.0 | 9267.0 | 61.0 |
| H22B | 5946.0 | 2657.0 | 7530.0 | 38.0 |
| H22C | 7919.0 | 606.0 | 9467.0 | 61.0 |
| H22D | 8559.0 | 405.0 | 5912.0 | 33.0 |
| H22E | 6552.0 | 184.0 | 9502.0 | 61.0 |
| H30B | 6667.0 | 1893.0 | 11743.0 | 57.0 |
| H30C | 6270.0 | 2491.0 | 10101.0 | 50.0 |
| H30D | 3562.0 | 5274.0 | 9251.0 | 35.0 |
| H31A | 3575.0 | 3876.0 | 7364.0 | 37.0 |
| H31B | 4368.0 | 4778.0 | 6737.0 | 37.0 |
| H31C | 1320.0 | 5187.0 | 6828.0 | 35.0 |
| H31D | 2242.0 | 5063.0 | 5981.0 | 35.0 |
| H31E | 2933.0 | 6673.0 | 5722.0 | 27.0 |
| H31F | 1943.0 | 7724.0 | 6599.0 | 31.0 |
| H31G | 1095.0 | 6846.0 | 7192.0 | 31.0 |
| H31H | 4165.0 | 6386.0 | 7167.0 | 33.0 |
| H31I | 3205.0 | 6440.0 | 8018.0 | 33.0 |
| H31J | −770.0 | 7999.0 | 6022.0 | 44.0 |
| H31K | −861.0 | 6794.0 | 6204.0 | 44.0 |
| H31L | −1427.0 | 7814.0 | 5246.0 | 44.0 |
| H32A | −1452.0 | 8350.0 | 1752.0 | 43.0 |
| H32B | 416.0 | 7925.0 | 2972.0 | 29.0 |
| H32C | −2186.0 | 9660.0 | 1268.0 | 43.0 |
| H32D | −1160.0 | 10895.0 | 4060.0 | 33.0 |
| H32E | −3040.0 | 8883.0 | 2006.0 | 43.0 |
| H40B | 11725.0 | 391.0 | 16396.0 | 35.0 |
| H40C | 11129.0 | 1092.0 | 14762.0 | 31.0 |
| H40D | 9326.0 | 4161.0 | 13954.0 | 28.0 |
| H41A | 8627.0 | 6302.0 | 8818.0 | 106.0 |
| H41B | 9648.0 | 6730.0 | 9217.0 | 106.0 |
| H41C | 8391.0 | 7603.0 | 8483.0 | 106.0 |
| H42B | 6316.0 | 6871.0 | 7619.0 | 37.0 |
| H42C | 5722.0 | 7979.0 | 5895.0 | 54.0 |
| H42D | 3962.0 | 9169.0 | 9228.0 | 53.0 |
| H42E | 5357.0 | 9288.0 | 5589.0 | 54.0 |
| H42F | 4086.0 | 8725.0 | 5779.0 | 54.0 |

TABLE 8.5

Hydrogen bonds with bond lengths (Å) and angles (degrees °)

| D—H . . . A | Distance (D—H) | Distance (H . . . A) | Distance (D . . . A) | Angle (D—H . . . A) |
|---|---|---|---|---|
| N106—H10D . . . N401 | 0.8800 | 2.3300 | 3.108(3) | 148.00 |
| N206—H20D . . . N301 | 0.8800 | 2.1300 | 2.959(3) | 157.00 |
| N306—H30C . . . N201 | 0.8800 | 2.1700 | 3.008(3) | 159.00 |
| C103—H10B . . . N124 | 0.9500 | 2.4700 | 3.341(4) | 163.00 |
| C104—H10C . . . O108 | 0.9500 | 2.3800 | 2.814(3) | 107.00 |
| C110—H11A . . . O402 | 0.9900 | 2.5500 | 2.971(3) | 106.00 |
| C110—H11A . . . N106 | 0.9900 | 2.4100 | 2.761(3) | 100.00 |
| C110—H11A . . . N401 | 0.9900 | 2.5400 | 3.212(3) | 125.00 |
| C110—H11B . . . O402 | 0.9900 | 2.5600 | 2.971(3) | 105.00 |
| C111—H11D . . . F116 | 0.9900 | 2.3900 | 2.758(3) | 101.00 |
| C113—H11F . . . O120 | 0.9900 | 2.5000 | 3.220(3) | 129.00 |
| C114—H11I . . . O108 | 0.9900 | 2.3500 | 2.736(3) | 102.00 |

TABLE 8.5-continued

Hydrogen bonds with bond lengths (Å) and angles (degrees °)

| D—H . . . A | Distance (D—H) | Distance (H . . . A) | Distance (D . . . A) | Angle (D—H . . . A) |
|---|---|---|---|---|
| C122—H12B . . . O08A | 0.9500 | 2.2900 | 3.180(3) | 155.00 |
| C122—H12B . . . O08B | 0.9500 | 2.2400 | 3.086(5) | 147.00 |
| C128—H12C . . . O119 | 1.0000 | 2.5700 | 3.306(4) | 131.00 |
| C293—H20B . . . N224 | 0.9500 | 2.5500 | 3.334(4) | 141.00 |
| C204—H20C . . . O208 | 0.9500 | 2.4300 | 2.824(3) | 105.00 |
| C210—H21B . . . N206 | 0.9900 | 2.5100 | 2.377(3) | 101.00 |
| C211—H21C . . . O220 | 0.9900 | 2.5900 | 3.273(3) | 126.00 |
| C212—H21E . . . O219 | 1.0000 | 2.4500 | 2.974(3) | 112.00 |
| C213—H21G . . . F216 | 0.0000 | 2.3900 | 2.782(3) | 103.00 |
| C229—H22A . . . O308 | 0.9800 | 2.3900 | 3.300(3) | 155.00 |
| C222—H22B . . . O308 | 0.9500 | 2.5200 | 3.274(3) | 137.00 |
| C226—H22D . . . F328 | 1.0000 | 2.5200 | 3.109(3) | 117.00 |
| C226—H22D . . . O229 | 1.0000 | 2.3400 | 3.077(3) | 129.00 |
| C303—H30B . . . N324 | 0.9500 | 2.4400 | 3.354(3) | 161.00 |
| C304—H30C . . . O308 | 0.9500 | 2.4200 | 2.812(3) | 105.00 |
| C310—H31A . . . O308 | 0.9900 | 2.3100 | 2.668(3) | 100.00 |
| C311—H31D . . . F316 | 0.9900 | 2.3200 | 2.692(3) | 101.00 |
| C312—H31E . . . O319 | 1.0000 | 2.4900 | 3.040(3) | 114.00 |
| C314—H31I . . . O202 | 0.9900 | 2.5000 | 3.364(3) | 145.00 |
| C314—H31I . . . N306 | 0.9900 | 2.5100 | 2.892(3) | 102.00 |
| C317—H31J . . . F226 | 0.9800 | 2.4900 | 3.342(3) | 146.00 |
| C329—H32A . . . O208 | 0.9800 | 2.4400 | 3.334(3) | 151.00 |
| C322—H32B . . . O208 | 0.9500 | 2.4700 | 3.246(3) | 138.00 |
| C326—H32D . . . O08A | 1.0000 | 2.3700 | 3.207(5) | 140.00 |
| C326—H32D . . . O320 | 1.0000 | 2.5200 | 3.050(3) | 113.00 |
| C404—H40C . . . O08A | 0.9500 | 2.2800 | 2.728(4) | 108.00 |
| C404—H40C . . . O08B | 0.9500 | 2.4800 | 2.838(4) | 102.00 |
| C404—H40C . . . O320 | 0.9500 | 2.5200 | 3.300(3) | 139.00 |
| C422—H42B . . . O108 | 0.9500 | 2.4000 | 3.222(3) | 144.00 |
| C426—H42D . . . O420 | 1.0000 | 2.4600 | 3.194(4) | 130.00 |

Figure 15:
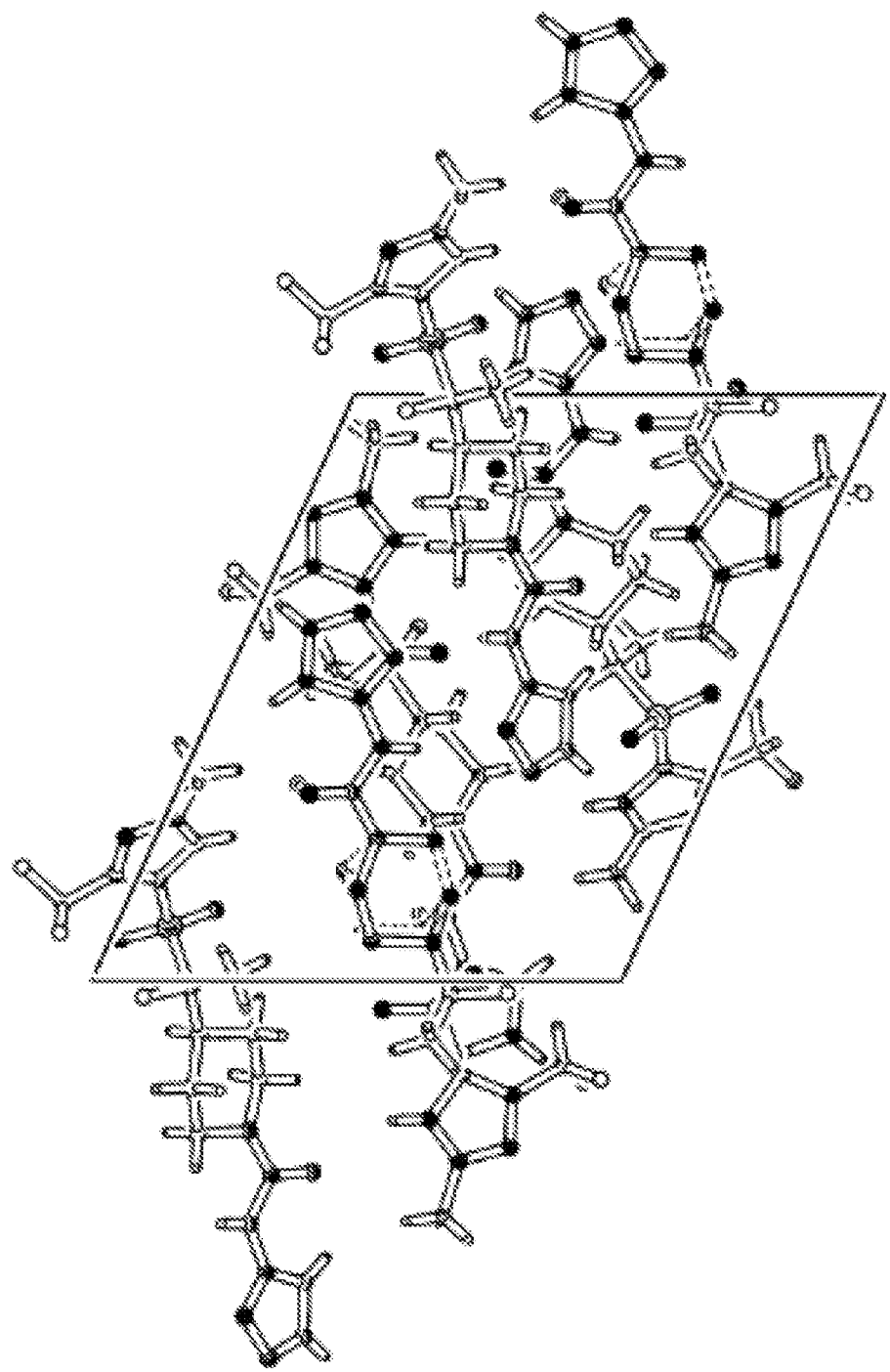
FIG. 15 shows a crystal structure of triclinic Form D representing the molecular packing down the short axis with disordered regions indicated by dotted lines.
Figure 16:
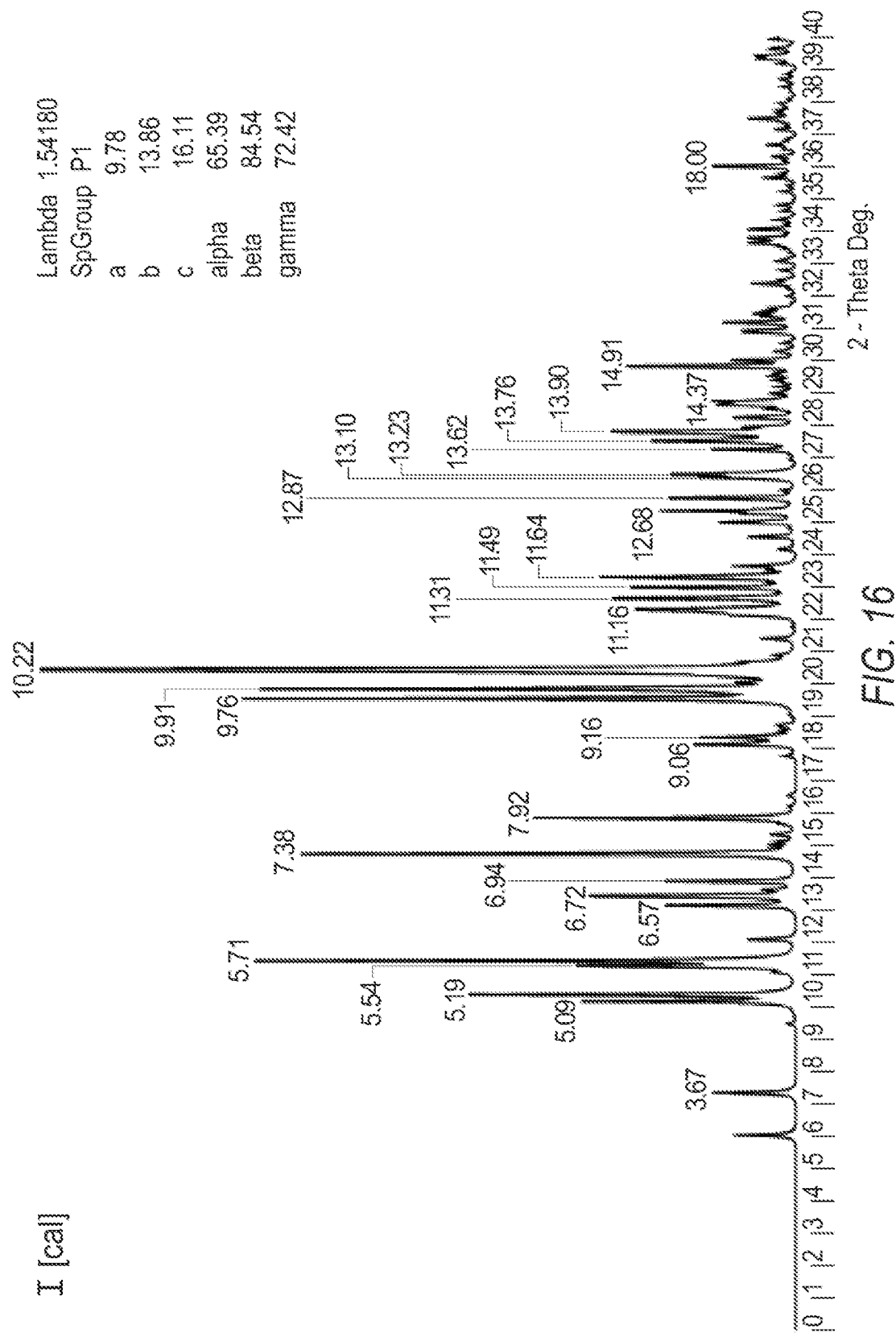
FIG. 16 shows a simulated powder diffraction pattern from the crystal structure of Form D at copper wavelength.

Representation of the crystal structures are given in FIGS. 14 and 15; the figures were generated with the PLATON program (Spek, A. L. J. Appl. Cryst. 2003 36, 7-13) for both structures.

The I-491 molecule contains a sulfur atom that allows the absolute configuration to be determined, making used of a high resolution data collection (performed at low temperature). The Flack x parameter is calculated based on the anomalous scattering method. It gives the absolute structure, providing a sufficient estimate standard deviation is reached. According to the theory, the expected values of the Flack x parameter are 0 for correct (within 3 esd.s) and +1 for inverted absolute structure (Flack, H. D., Bernadinelli, G. Acta. Cryst. 1999 A55, 908-915). The results are the following: Considering the configuration C115: R; C215: R; C315: R; C415: R; the Flack parameter is 0.003 (13), which unambiguously proved this absolute configuration for I-491 Form D.

A simulated diffraction pattern was produced from the low temperature experimentally determined crystal structure of Form D (FIG. 16). An experimental powder diffraction pattern can be compared to one of these theoretical patterns to demonstrate the nature of the crystalline structure. Minor differences (if any) can be explained by preferential orientations in the powder.

A polymorphic crystal structures of I-491 Form D was determined by single crystal X-ray diffraction, allowing the generation of reference powder patterns.

Example 9. Myosin Activation Assay

Small molecule agents were assessed for their ability to activate the enzymatic activity of bovine cardiac myosin using a biochemical assay that couples the release of ADP (adenosine diphosphate) from cardiac myosin to an enzymatic coupling system consisting of pyruvate kinase and lactate dehydrogenase (PK/LDH) and monitoring the absorbance decrease of NADH (at 340 nm) as a function of time. PK converts ADP to ATP (adenosine triphosphate) by converting PEP (phosphoenolpyruvate) to pyruvate. Pyruvate is then converted to lactate by LDH by converting NADH (nicotinamide adenine dinucleotide) to NAD (oxidized nicotinamide adenine dinucleotide). The source of cardiac myosin was from bovine heart in the form of skinned myofibrils. Prior to testing small molecule agents, the bovine myofibrils were assessed for their calcium responsiveness and the calcium concentration that achieves either a 50% (pCa$_{50}$ or pCa=~6) or <5% (pCa=10) activation of the myofibril system was chosen as the final condition for assessing the activation activity of the small molecule agents. All enzymatic activity was measured in a buffered solution containing 12 mM PIPES (piperazine-N,N'-bis(2-ethanesulfonic acid), 2 mM magnesium chloride at pH 6.8 (PM12 buffer). Final assay conditions were 1 mg/mL of bovine cardiac myofibrils, 0.4 mM PK/LDH, 50 uM ATP, 0.1 mg/mL BSA (bovine serum albumin), 10 ppm antifoam, 2 mM BME, 0.5 mM NADH, 1.5 mM PEP at the desired free calcium concentration required to achieve either 50% or <5% activation of the myofibrils.

A dilution series of compound was created in DMSO such that the final desired concentration of compound would be achieved in a volume of 100 µL with a fixed DMSO concentration of 3.3% (v/v). Typically a 1 µL of the dilution series was added to a 384 well plate to achieve a 10 point dose response. Following the addition of 14 µL of a solution containing bovine cardiac myofibrils, PK/LDH and a solution of calcium (that achieved the desired activation), the enzymatic reaction was started with the addition of 15 µL of a solution containing ATP, PEP and NADH. The reaction progress was followed in a PerkinElmer Envision plate reader at ambient temperature using clear bottom plates. The plate reader was configured to read absorbance at 340 nm in kinetics mode for 15 minutes. Data were recorded as the slope of the absorbance response to time. The slopes of the absorbance response as a function of time were normalized to slopes on the plate containing DMSO. This normalized rate was then plotted as a function of small molecule concentration and the data was fitted to a four-parameter fit using EXCEL XLfit. The concentration at which the total response is increased by twenty or fifty percent is reported as $AC_{20}$ or $AC_{50}$. Any agent that failed to achieve the corresponding percent activation at the highest concentration tested is reported as an $AC_{20}$ or $AC_{50}$ greater than the highest concentration tested (ie. $AC_{50}$>50 uM).

TABLE 9

Myosin Activation of Selected Compounds[a]

| Compound I-491 | Myosin Activation |
|---|---|
| Form A | +++ |

[a]+++ represents myosin activation value $AC_{20}$ < 2 μM; ++ represents myosin activation value $AC_{20}$ from 2 μM-5 μM; + represents myosin activation value $AC_{20}$ > 5 μM.

Example 10. Cardiomyocyte Contractility Assay

Contractility of adult rat ventricular myocytes is determined by edge detection with an IonOptix contractility system. Aliquots of myocytes in Tyrode buffer (137 mM NaCl, 3.7 mM KCl, 0.5 mM $MgCl_2$, 1.5 mM $CaCl_2$, 4 mM HEPES, 11 mM glucose) are placed in a perfusion chamber (Series 20 RC-27NE; Warner Instruments), allowed to adhere to the coverslip, and then perfused with 37° C. Tyrode buffer. Myocytes are filed stimulated at 1 Hz and 10V. Only myocytes with clear striations, quiescent prior to pacing, with a cell length of 120-180 microns, a basal fractional shortening equal to 3-8% of the cell length, and a contraction velocity greater than 100 microns per second are used for contractility experiments. To determine the response to compounds, myocytes are first perfused for 60 seconds with Tyrodes buffer followed by 5 minutes of compound and a 140 second washout with Tyrodes buffer. Data is continuously recorded using IonOptix software. Contractility data is analyzed using Ionwizard software (IonOptix). For each cell, 10-20 contractility transients were averaged and compared under basal (no compound) and compound-treated conditions. Compound activity is measured by effects on fractional shortening (FS), where fractional shortening is the ratio of the peak length of the cell at contraction divided by the basal cell length normalized to 100% for an untreated cell.

TABLE 10

Activation of Cardiomyocyte Contraction by Selected Compounds[a]

| Compound I-491 | Activity at 10 uM | Activity at 3.0 uM | Activity at 1.0 uM |
|---|---|---|---|
| Form A | | ++ | + |

[a]+ represents fractional shorting activation <20% over basal. ++ represents fractional shorting activation values from 20% to 50% over basal. +++ represents fractional shortening activation values greater than 50% over basal.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

EQUIVALENTS AND SCOPE

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any one of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

CLAUSES

1. A composition comprising a polymorph of formula (I-491):

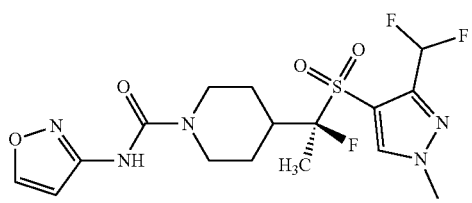 [SMILES: Cn1cc(S(=O)(=O)[C@@](C)(F)C2CCN(C(=O)Nc3ccon3)CC2)c(C(F)F)n1]

wherein the polymorph is Form A.
2. The composition of clause 1, wherein the polymorph has a chiral purity of at least 99.9%.
3. The composition of any one of clauses 1 to 2, wherein the polymorph is characterized by at least one of:
   a. a X-ray powder diffraction pattern obtained by irradiation with Cu-Kα having two or more peaks expressed in degrees 2-theta±0.2° and selected from 6.62, 10.98, 13.26, 14.48, 15.02, 15.48, 15.78, 16.08, 16.32, 17.72, 19.26, 19.86, 19.94, 20.44, 21.68, 21.90, 22.04, 22.60, 23.78, 26.16, 26.36, 26.58, 27.24, and 28.04 degrees; or
   b. a DSC thermogram showing an endotherm at about 181-200° C.
4. The composition of any one of clauses 1 to 3, wherein the polymorph is characterized by a X-ray powder diffraction pattern obtained by irradiation with Cu-Kα having peaks expressed in degrees 2-theta±0.2° at each of 10.98, 15.78, 16.08, 20.44, 23.78, and 26.58 degrees.
5. The composition of any one of clauses 1 to 3, wherein the polymorph is characterized by a X-ray powder diffraction pattern obtained by irradiation with Cu-Kα having peaks expressed in degrees 2-theta±0.2° at each of 6.62, 10.98, 16.08, 23.78, and 26.58 degrees.
6. The composition of any one of clauses 1 to 3, wherein the polymorph is characterized by a X-ray powder diffraction pattern obtained by irradiation with Cu-Kα having peaks expressed in degrees 2-theta±0.2° at each of 15.78, 16.08, and 23.78 degrees.
7. The composition of any one of clauses 1 to 3, wherein the polymorph is characterized by a X-ray powder diffraction pattern obtained by irradiation with Cu-Kα having peaks expressed in degrees 2-theta±0.2° at each of 6.62, 15.78, 16.08, and 26.58 degrees.
8. The composition of any one of clauses 1 to 3, wherein the polymorph is characterized by a X-ray powder diffraction pattern obtained by irradiation with Cu-Kα having peaks expressed in degrees 2-theta±0.2° at each of 6.62, 17.72, 23.78, and 26.58 degrees.
9. The composition of any one of clauses 1 to 3, wherein the polymorph is characterized by a X-ray powder diffraction pattern essentially the same as shown in FIG. 1A.
10. The composition of any one of clauses 1 to 3, wherein the polymorph is characterized by a X-ray powder diffraction pattern essentially the same as shown in FIG. 1B.
11. The composition of any one of clauses 1 to 10, wherein the polymorph is characterized by a X-ray powder diffraction pattern obtained by irradiation with Cu-Kα lacking peaks expressed in degrees 2-theta±0.05° at each of 0 to 6.00, 8.00 to 8.90, 11.40 to 12.60, 16.80 to 17.20, and 24.40 to 24.80 degrees.
12. The composition of any one of clauses 1 to 10, wherein the polymorph is characterized by a X-ray powder diffraction pattern obtained by irradiation with Cu-Kα lacking peaks expressed in degrees 2-theta±0.05° at 24.40 to 24.80 degrees.
13. The composition of any one of clauses 1 to 10, wherein the polymorph is characterized by a X-ray powder diffraction pattern obtained by irradiation with Cu-Kα lacking peaks expressed in degrees 2-theta±0.05° at each of 0 to 6.00, 11.40 to 12.60, and 24.40 to 24.80 degrees.
14. The composition of any one of clauses 1 to 10, wherein the polymorph is characterized by a X-ray powder diffraction pattern obtained by irradiation with Cu-Kα lacking peaks expressed in degrees 2-theta±0.05° at 11.40 to 12.60 degrees.
15. The composition of any one of clauses 1 to 14, wherein the polymorph is characterized by a melt onset of about 181° C.
16. The composition of any one of clauses 1 to 15, wherein the polymorph is characterized by a melting point of 191° C.±2° C.
17. The composition of any one of clauses 1 to 16, wherein the polymorph is characterized by a DSC thermogram essentially the same as shown in FIG. 2.
18. The composition of any one of clauses 1 to 17, wherein the polymorph has a triclinic crystal system and a space group of P1.
19. The composition of any one of clauses 1 to 18, wherein the polymorph has unit cell dimensions of a=6.403 Å, b=11.343 Å, c=13.507 Å, α=81.91°, β=85.73°, and γ=85.18°.
20. The composition of any one of clauses 1 to 19, wherein the composition is substantially free of other forms of I-491.
21. The composition of any one of clauses 1 to 20, wherein the composition is substantially free of Form D of I-491.
22. The composition of any one of clauses 1 to 21, wherein the composition is substantially free of amorphous I-491.
23. A composition comprising Form A of I-491, wherein the composition is greater than or equal to 99.5% by weight Form A of I-491.
24. A composition comprising Form A of I-491, wherein the molar ratio of the amount of Form A of I-491 to the sum of the amounts of other forms is equal to or greater than 80:20.
25. The composition of clause 24, wherein the molar ratio of the amount of Form A of I-491 to the sum of the amounts of other forms is equal to or greater than 90:10.
26. The composition of any one of clauses 24-25, wherein the molar ratio of the amount of Form A of I-491 to the sum of the amounts of other forms is equal to or greater than 95:5.

27. The composition of any one of clauses 24-26, wherein the molar ratio of the amount of Form A of I-491 to the sum of the amounts of other forms is equal to or greater than 99:1.
28. The composition of any one of clauses 24-27, wherein the molar ratio of the amount of Form A of I-491 to the sum of the amounts of other forms is equal to or greater than 99.5:0.5.
29. A composition comprising Form A of I-491 and Form D of I-491, wherein the molar ratio of the amount of Form A of I-491 to Form D of I-491 is equal to or greater than 80:20.
30. The composition of clause 29, wherein the molar ratio of the amount of Form A of I-491 to Form D of I-491 is equal to or greater than 90:10.
31. The composition of any one of clauses 29-30, wherein the molar ratio of the amount of Form A of I-491 to Form D of I-491 is equal to or greater than 95:5.
32. The composition of any one of clauses 29-31, wherein the molar ratio of the amount of Form A of I-491 to Form D of I-491 is equal to or greater than 99:1.
33. A pharmaceutical composition comprising an effective amount of the composition of any one of clauses 1 to 32 and a pharmaceutically acceptable carrier.
34. A polymorph of formula (I-491):

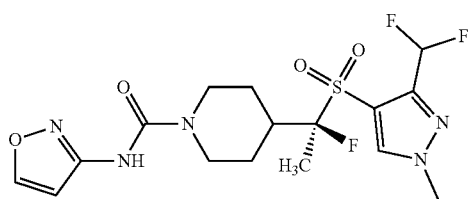 [SMILES: Cn1cc(S(=O)(=O)[C@@](C)(F)C2CCN(C(=O)Nc3ccon3)CC2)c(C(F)F)n1]

wherein the polymorph is Form B of I-491.
35. The polymorph of clause 34, wherein the polymorph has a chiral purity of at least 99.9%.
36. The polymorph of any one of clauses 34 to 35, characterized by at least one of:
   a. a X-ray powder diffraction pattern obtained by irradiation with Cu-Kα pattern having two or more peaks expressed in degrees 2-theta±0.2° and selected from 7.32, 7.88, 10.20, 10.88, 13.40, 14.68, 15.24, 15.42, 16.28, 17.70, 18.48, 19.02, 20.18, 20.70, 21.56, 21.98, 22.94, 23.16, 23.86, 24.24, 24.78, 25.38, 26.40, 26.88, and 28.74 degrees; or
   b. a DSC thermogram showing an endotherm at about 170-185° C.
37. The polymorph of any one of clauses 34 to 36, characterized by a X-ray powder diffraction pattern obtained by irradiation with Cu-Kα having peaks expressed in degrees 2-theta±0.2° at each of 15.42, 16.28, 19.02, 20.70, and 26.88 degrees.
38. The polymorph of any one of clauses 34 to 36, characterized by a X-ray powder diffraction pattern obtained by irradiation with Cu-Kα having peaks expressed in degrees 2-theta±0.2° at each of 15.42, 20.70, and 26.88 degrees.
39. The polymorph of any one of clauses 34 to 36, characterized by a X-ray powder diffraction pattern obtained by irradiation with Cu-Kα having peaks expressed in degrees 2-theta±0.2° at each of 7.88, 10.20, 20.70, and 26.88 degrees.
40. The polymorph of any one of clauses 34 to 36, characterized by a X-ray powder diffraction pattern obtained by irradiation with Cu-Kα having peaks expressed in degrees 2-theta±0.2° at each of 7.32, 7.88, 10.20, and 18.48 degrees.
41. The polymorph of any one of clauses 34 to 36, characterized by a X-ray powder diffraction pattern obtained by irradiation with Cu-Kα having peaks expressed in degrees 2-theta±0.2° at each of 7.32, 16.28, and 26.88 degrees.
42. The polymorph of any one of clauses 34 to 36, characterized by a X-ray powder diffraction pattern obtained by irradiation with Cu-Kα having peaks expressed in degrees 2-theta±0.2° at each of 7.88, 15.42, 17.70, and 21.56 degrees.
43. The polymorph of any one of clauses 34 to 42, characterized by a X-ray powder diffraction pattern essentially the same as shown in FIG. 6A.
44. The polymorph of any one of clauses 34 to 42, characterized by a X-ray powder diffraction pattern essentially the same as shown in FIG. 6B.
45. The polymorph of any one of clauses 34 to 44, characterized by a X-ray powder diffraction pattern obtained by irradiation with Cu-Kα lacking peaks expressed in degrees 2-theta±0.05° at each of 0 to 6.80 and 8.15 to 9.00 degrees.
46. The polymorph of any one of clauses 34 to 44, characterized by a X-ray powder diffraction pattern obtained by irradiation with Cu-Kα lacking peaks expressed in degrees 2-theta±0.05° at 0 to 6.80 degrees.
47. The polymorph of any one of clauses 34 to 44, characterized by a X-ray powder diffraction pattern obtained by irradiation with Cu-Kα lacking peaks expressed in degrees 2-theta±0.05° at 8.15 to 9.00 degrees.
48. The polymorph of any one of clauses 34 to 47, characterized by a melt onset of about 170° C.
49. The polymorph of any one of clauses 34 to 48, characterized by a melting point of 178° C.±2° C.
50. The polymorph of any one of clauses 34 to 49, characterized by a second endotherm at about 185-200° C.
51. The polymorph of any one of clauses 34 to 50, characterized by second a melting point of 192.7° C.±2° C.
52. The polymorph of any one of clauses 34 to 51, characterized by a DSC thermogram essentially the same as shown in FIG. 4.
53. The polymorph of any one of clauses 34 to 52, wherein the polymorph has a triclinic crystal system and a space group of P1.
54. The polymorph of any one of clauses 34 to 53, wherein the polymorph has unit cell dimensions of a=11.926 Å, b=13.239 Å, c=13.511 Å, α=65.40°, β=80.08°, and γ=89.18°.
55. A composition comprising the polymorph of any one of clauses 34 to 54, wherein the composition is substantially free of other forms of I-491.
56. A composition comprising the polymorph of any one of clauses 34 to 55, wherein the composition is substantially free of Form A and/or D of I-491.
57. A composition comprising the polymorph of any one of clauses 34 to 56, wherein the composition is substantially free of amorphous I-491.
58. A composition comprising Form B of I-491, wherein the composition is greater than or equal to 99.5% by weight Form B of I-491.

59. A composition comprising Form B of I-491, wherein the molar ratio of the amount of Form B of I-491 to the sum of the amounts of other forms is equal to or greater than 80:20.
60. The composition of clause 59, wherein the molar ratio of the amount of Form B of I-491 to the sum of the amounts of other forms is equal to or greater than 90:10.
61. The composition of any one of clauses 59-60, wherein the molar ratio of the amount of Form B of I-491 to the sum of the amounts of other forms is equal to or greater than 95:5.
62. The composition of any one of clauses 59-61, wherein the molar ratio of the amount of Form B of I-491 to the sum of the amounts of other forms is equal to or greater than 99:1.
63. The composition of any one of clauses 59-62, wherein the molar ratio of the amount of Form B of I-491 to the sum of the amounts of other forms is equal to or greater than 99.5:0.5.
64. A pharmaceutical composition comprising an effective amount of the polymorph of any one of clauses 34 to 54 or composition of any one of clauses 55 to 63, and a pharmaceutically acceptable carrier.
65. A pharmaceutical composition comprising:
    a. Form A of I-491; and
    b. one or more diluents.
66. The pharmaceutical composition of clause 65, further comprising:
    a. Form A of I-491;
    b. one or more diluents; and
    c. a disintegrant.
67. The pharmaceutical composition of clause 66, further comprising:
    a. Form A of I-491;
    b. one or more diluents;
    c. a disintegrant; and
    d. a binder.
68. The pharmaceutical composition of clause 67, further comprising:
    a. Form A of I-491;
    b. one or more diluents;
    c. a disintegrant;
    d. a binder; and
    e. a lubricant.
69. The pharmaceutical composition of any one of clauses 65 to 68, wherein the one or more diluents is selected from the group consisting of calcium carbonate, sodium carbonate, calcium phosphate, dicalcium phosphate, calcium sulfate, calcium hydrogen phosphate, sodium phosphate lactose, sucrose, cellulose, microcrystalline cellulose, kaolin, mannitol, sorbitol, inositol, sodium chloride, dry starch, cornstarch, powdered sugar, and mixtures of any of the foregoing diluents.
70. The pharmaceutical composition of any one of clauses 66 to 68, wherein the disintegrant is selected from the group consisting of agar, calcium carbonate, potato or tapioca starch, alginic acid, certain silicates, sodium carbonate, croscarmellose sodium, crospovidone, sodium starch glycolate, and mixtures of any of the foregoing disintegrants.
71. The pharmaceutical compositions of any one of clauses 67 to 68, wherein the binder is selected from the group consisting of starch (e.g., cornstarch and starch paste), gelatin, sugars (e.g., sucrose, glucose, dextrose, dextrin, molasses, lactose, lactitol, mannitol, etc.), natural and synthetic gums (e.g., acacia, sodium alginate, extract of Irish moss, panwar gum, ghatti gum, mucilage of isapol husks, carboxymethylcellulose, methylcellulose, ethylcellulose, hydroxyethylcellulose, hydroxypropyl cellulose, hydroxypropyl methylcellulose, microcrystalline cellulose, cellulose acetate, poly (vinyl-pyrrolidone), magnesium aluminum silicate (Veegum®), and larch arabogalactan), alginates, polyethylene oxide, polyethylene glycol, inorganic calcium salts, silicic acid, polymethacrylates, waxes, water, alcohol, and mixtures of any of the foregoing binders.
72. The pharmaceutical composition of clause 68, wherein the lubricant is selected from a group consisting of magnesium stearate, calcium stearate, stearic acid, silica, talc, malt, glyceryl behanate, hydrogenated vegetable oils, polyethylene glycol, sodium benzoate, sodium acetate, sodium chloride, leucine, magnesium lauryl sulfate, sodium lauryl sulfate, and mixtures of any of the foregoing lubricants.
73. A pharmaceutical composition comprising Form A of I-491, lactose monohydrate, microcrystalline cellulose, croscarmellose sodium, hydroxypropyl methylcellulose, and magnesium stearate.
74. A method of treating a disease selected from the group consisting of systolic dysfunction, diastolic dysfunction, HFrEF, HFpEF, chronic heart failure, and acute heart failure, comprising administering to a subject in need thereof an effective amount of a polymorph of any one of clauses 34-54, or a pharmaceutically acceptable salt thereof, a composition of any one of clauses 1-32 and 55-63, or a pharmaceutical composition of any one of clauses 33, 64-73, and 113-121.
75. A method in accordance with clause 74, wherein the polymorph or pharmaceutical composition is administered in an IV formulation for the treatment of acute heart failure.
76. A method of treating systolic dysfunction, comprising administering to a subject in need thereof an effective amount of a polymorph of any one of clauses 34-54, or a pharmaceutically acceptable salt thereof, a composition of any one of clauses 1-32 and 55-63, or a pharmaceutical composition of any one of clauses 33, 64-73, and 113-121.
77. The method of clause 76, wherein the polymorph is Form B of I-491.
78. The method of clause 76, wherein the polymorph is Form A of I-491.
79. A method of treating HFrEF, comprising administering to a subject in need thereof an effective amount of a polymorph of any one of clauses 34-54, or a pharmaceutically acceptable salt thereof, a composition of any one of clauses 1-32 and 55-63, or a pharmaceutical composition of any one of clauses 33, 64-73, and 113-121.
80. The method of clause 79, wherein the polymorph is Form B of I-491.
81. The method of clause 79, wherein the polymorph is Form A of I-491.
82. A method of treating dilated cardiomyopathy (DCM), comprising administering to a subject in need thereof an effective amount of a polymorph of any one of clauses 34-54, or a pharmaceutically acceptable salt thereof, a composition of any one of clauses 1-32 and 55-63, or a pharmaceutical composition of any one of clauses 33, 64-73, and 113-121.
83. The method of clause 82, wherein the polymorph is Form B of I-491.

84. The method of clause 82, wherein the polymorph is Form A of I-491.
85. A method of treating a disease characterized by left ventricular systolic dysfunction or symptoms or reduced exercise capacity due to systolic dysfunction; in conjunction with therapies aimed at treating heart failure, comprising administering to a subject in need thereof an effective amount of a polymorph of any one of clauses 34-54, or a pharmaceutically acceptable salt thereof, a composition of any one of clauses 1-32 and 55-63, or a pharmaceutical composition of any one of clauses 33, 64-73, and 113-121.
86. The method of clause 85, wherein the polymorph is Form B of I-491.
87. The method of clause 85, wherein the polymorph is Form A of I-491.
88. The method of any one of clauses 74 to 87, combined with therapies that retard the progression of heart failure by down-regulating neurohormonal stimulation of the heart and attempt to prevent cardiac remodeling (e.g., ACE inhibitors, angiotensin receptor blockers (ARBs), β-blockers, aldosterone receptor antagonists, or neural endopeptidase inhibitors).
89. The method of any one of clauses 74 to 87, combined with therapies that improve cardiac function by stimulating cardiac contractility (e.g., positive inotropic agents, such as the β-adrenergic agonist dobutamine or the phosphodiesterase inhibitor milrinone).
90. The method of any one of clauses 74 to 87, combined with therapies that reduce cardiac preload (e.g., diuretics, such as furosemide).
91. The method of any one of clauses 74 to 87, combined with therapies that reduce afterload (vasodilators of any class, including but not limited to calcium channel blockers, phosphodiesterase inhibitors, endothelin receptor antagonists, renin inhibitors, or smooth muscle myosin modulators).
92. The method of any one of clauses 74 to 87, wherein said compound is administered in combination with a beta-blocker.
93. A polymorph of I-491, wherein the polymorph is Form A of I-491, prepared by a process comprising the steps of recrystallizing I-491 in a mixture of methanol and water via slow evaporation.
94. A polymorph of I-491, wherein the polymorph is Form B of I-491, prepared by a process comprising the steps of recrystallizing I-491 in a mixture of acetonitrile and water.
95. The polymorph of clause 94, wherein the process is carried out at a temperature selected from 25° C. to 70° C.
96. The polymorph of any one of clauses 94-95, wherein the process is carried out at room temperature.
97. A polymorph of I-491, wherein the polymorph is Form B of I-491, prepared by a process comprising the steps of recrystallizing I-491 from a slurry of I-491 in solvent selected from the group consisting of water, ethanol, methanol, ethyl acetate, methyl isobutyl ketone, ethanol and water mixture, methanol and water mixture, and water.
98. The polymorph of clause 97, wherein the solvent is ethanol, methanol, ethyl acetate or methyl isobutyl ketone.
99. The polymorph of clause 98, wherein the process is carried out at a temperature selected from 20° C. to 50° C.
100. The polymorph of any one of clauses 98-99, wherein the process is carried out at room temperature.
101. A composition comprising a polymorph of formula (I-491):

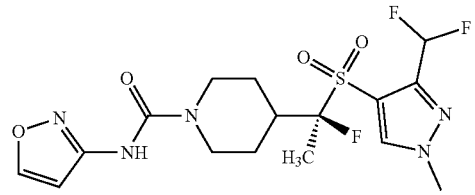 [SMILES: Cn1cc(S(=O)(=O)[C@@](C)(F)C2CCN(C(=O)Nc3ccon3)CC2)c(C(F)F)n1]

wherein the polymorph is Form A of I-491, wherein Form A of I-491 is characterized by a triclinic crystal system and a space group of P1.
102. The composition of clause 101, wherein the polymorph has unit cell dimensions of a=6.403 Å, b=11.343 Å, c=13.507 Å, α=81.91°, β=85.73°, and γ=85.18°.
103. A polymorph of formula (I-491):

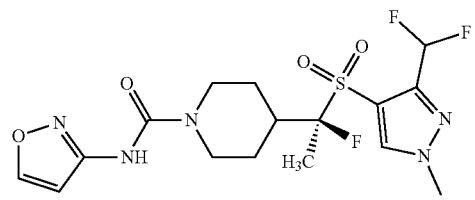 [SMILES: Cn1cc(S(=O)(=O)[C@@](C)(F)C2CCN(C(=O)Nc3ccon3)CC2)c(C(F)F)n1]

wherein the polymorph is Form B of I-491, wherein Form B of I-491 is characterized by a triclinic crystal system and a space group of P1.
104. The polymorph of clause 103, wherein the polymorph has unit cell dimensions of a=11.926 Å, b=13.239 Å, c=13.511 Å, α=65.40°, β=80.08°, and γ=89.18°.
105. The composition of any one of clauses 1 and 101-102, wherein the composition comprises greater than or equal to 75% by weight Form A of I-491.
106. The composition of any one of clauses 1 and 101-102, wherein the composition comprises greater than or equal to 85% by weight Form A of I-491.
107. The composition of any one of clauses 1 and 101-102, wherein the composition comprises greater than or equal to 90% by weight Form A of I-491.
108. The composition of any one of clauses 1 and 101-102, wherein the composition comprises greater than or equal to 95% by weight Form A of I-491.
109. The composition of any one of clauses 1 and 101-102, wherein the composition comprises greater than or equal to 98% by weight Form A of I-491.
110. The composition of any one of clauses 1 and 101-102, wherein the composition comprises greater than or equal to 99% by weight Form A of I-491.
111. The composition of any one of clauses 1 and 101-102, wherein the composition comprises greater than or equal to 99.5% by weight Form A of I-491.
112. The composition of any one of clauses 1 and 101-102, wherein the composition comprises greater than or equal to 99.9% by weight Form A of I-491.
113. A pharmaceutical composition comprising:
a. Form B of I-491; and
b. one or more diluents.

114. The pharmaceutical composition of clause 113, further comprising:
   a. Form B of I-491;
   b. one or more diluents; and
   c. a disintegrant.
115. The pharmaceutical composition of clause 114, further comprising:
   a. Form B of I-491;
   b. one or more diluents;
   c. a disintegrant; and
   d. a binder.
116. The pharmaceutical composition of clause 115, further comprising:
   a. Form B of I-491;
   b. one or more diluents;
   c. a disintegrant;
   d. a binder; and
   e. a lubricant.
117. The pharmaceutical composition of any one of clauses 113 to 116, wherein the one or more diluents is selected from the group consisting of calcium carbonate, sodium carbonate, calcium phosphate, dicalcium phosphate, calcium sulfate, calcium hydrogen phosphate, sodium phosphate lactose, sucrose, cellulose, microcrystalline cellulose, kaolin, mannitol, sorbitol, inositol, sodium chloride, dry starch, cornstarch, powdered sugar, and mixtures of any of the foregoing diluents.
118. The pharmaceutical composition of any one of clauses 114 to 116, wherein the disintegrant is selected from the group consisting of agar, calcium carbonate, potato or tapioca starch, alginic acid, certain silicates, sodium carbonate, croscarmellose sodium, crospovidone, sodium starch glycolate, and mixtures of any of the foregoing disintegrants.
119. The pharmaceutical compositions of any one of clauses 115 to 116, wherein the binder is selected from the group consisting of starch (e.g., cornstarch and starch paste), gelatin, sugars (e.g., sucrose, glucose, dextrose, dextrin, molasses, lactose, lactitol, mannitol, etc.), natural and synthetic gums (e.g., acacia, sodium alginate, extract of Irish moss, panwar gum, ghatti gum, mucilage of isapol husks, carboxymethylcellulose, methylcellulose, ethylcellulose, hydroxyethylcellulose, hydroxypropyl cellulose, hydroxypropyl methylcellulose, microcrystalline cellulose, cellulose acetate, poly (vinyl-pyrrolidone), magnesium aluminum silicate (Veegum®), and larch arabogalactan), alginates, polyethylene oxide, polyethylene glycol, inorganic calcium salts, silicic acid, polymethacrylates, waxes, water, alcohol, and mixtures of any of the foregoing binders.
120. The pharmaceutical composition of clause 116, wherein the lubricant is selected from a group consisting of magnesium stearate, calcium stearate, stearic acid, silica, talc, malt, glyceryl behanate, hydrogenated vegetable oils, polyethylene glycol, sodium benzoate, sodium acetate, sodium chloride, leucine, magnesium lauryl sulfate, sodium lauryl sulfate, and mixtures of any of the foregoing lubricants.
121. A pharmaceutical composition comprising Form B of I-491, lactose monohydrate, microcrystalline cellulose, croscarmellose sodium, hydroxypropyl methylcellulose, and magnesium stearate.

What is claimed is:
1. A polymorph of compound formula (I-491):

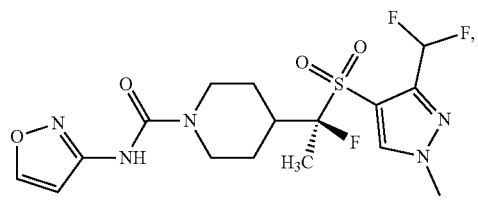

(I-491)

wherein the polymorph is Form B of compound (I-491), characterized by an endotherm at about 170° C. to about 185° C.

2. The polymorph of claim 1, wherein the polymorph has a chiral purity of at least 99.9%.

3. The polymorph of claim 1, characterized by a X-ray powder diffraction pattern obtained by irradiation with Cu-Kα having two or more peaks expressed in degrees 2-theta±0.2° and selected from the group consisting of 7.32, 7.88, 10.20, 10.88, 13.40, 14.68, 15.24, 15.42, 16.28, 17.70, 18.48, 19.02, 20.18, 20.70, 21.56, 21.98, 22.94, 23.16, 23.86, 24.24, 24.78, 25.38, 26.40, 26.88, and 28.74 degrees.

4. The polymorph of claim 1, characterized by a X-ray powder diffraction pattern obtained by irradiation with Cu-Kα having peaks expressed in degrees 2-theta±0.2° at each of 15.42, 16.28, 19.02, 20.70, and 26.88 degrees.

5. The polymorph of claim 1, characterized by a X-ray powder diffraction pattern obtained by irradiation with Cu-Kα having peaks expressed in degrees 2-theta±0.2° at each of 15.42, 20.70, and 26.88 degrees.

6. The polymorph of claim 1, characterized by a X-ray powder diffraction pattern obtained by irradiation with Cu-Kα having peaks expressed in degrees 2-theta±0.2° at each of 7.88, 10.20, 20.70, and 26.88 degrees.

7. The polymorph of claim 1, characterized by a X-ray powder diffraction pattern obtained by irradiation with Cu-Kα having peaks expressed in degrees 2-theta±0.2° at each of 7.32, 7.88, 10.20, and 18.48 degrees.

8. The polymorph of claim 1, characterized by a X-ray powder diffraction pattern obtained by irradiation with Cu-Kα having peaks expressed in degrees 2-theta±0.2° at each of 7.32, 16.28, and 26.88 degrees.

9. The polymorph of claim 1, characterized by a X-ray powder diffraction pattern obtained by irradiation with Cu-Kα having peaks expressed in degrees 2-theta±0.2° at each of 7.88, 15.42, 17.70, and 21.56 degrees.

10. The polymorph of claim 1, characterized by a X-ray powder diffraction pattern essentially the same as shown in FIG. 6B.

11. The polymorph of claim 4, characterized by a X-ray powder diffraction pattern obtained by irradiation with Cu-Kα lacking peaks expressed in degrees 2-theta±0.05° at each of 0 to 6.80 and 8.15 to 9.00 degrees.

12. The polymorph of claim 1, characterized by a second endotherm at about 185° C. to about 200° C.

13. The polymorph of claim 12, characterized by a second endotherm at 192.7° C.±2° C.

14. The polymorph of claim 1, characterized by a DSC thermogram essentially the same as shown in FIG. 7.

15. The polymorph of claim 1, wherein the polymorph has a triclinic crystal system and a space group of P1.

16. The polymorph of claim 15, wherein the polymorph has unit cell dimensions of about a=11.93 Å, b=13.24 Å, c=13.51 Å, α=65.40°, β=80.08°, and γ=89.18°.

17. A composition comprising the polymorph of claim 1, wherein the composition is substantially free of other forms of compound (I-491).

18. A composition comprising the polymorph of claim 1, wherein the molar ratio of the amount of Form B of compound (I-491) to the sum of the amounts of other forms of compound (I-491) is equal to or greater than 80:20.

19. A pharmaceutical composition comprising an effective amount of the polymorph of claim 1, and a pharmaceutically acceptable carrier.

20. A pharmaceutical composition comprising:
(a) a polymorph of compound (1-491)

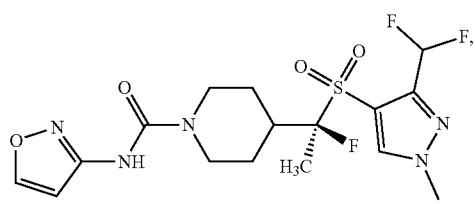

(I-491)

wherein the polymorph is Form B of compound (I-491), characterized by an endotherm at about 170° C. to about 185° C.; and
(b) one or more diluents.

21. A pharmaceutical composition comprising a polymorph of compound (I-491):

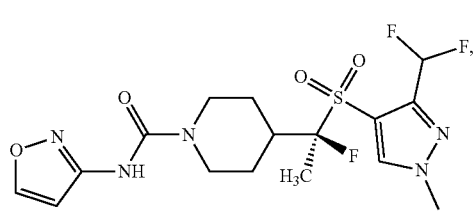

(I-491)

wherein the polymorph is Form B of compound (I-491), characterized by an endotherm at about 170° C. to about 185° C.;
lactose monohydrate;
microcrystalline cellulose;
croscarmellose sodium;
hydroxypropyl methylcellulose; and
magnesium stearate.

22. The polymorph of claim 1, characterized by a DSC thermogram showing a small endothermic event at about 170° C. to about 185° C., followed by a major endothermic event at about 193±2° C.

23. A pharmaceutical composition comprising an effective amount of the polymorph of claim 4, and a pharmaceutically acceptable carrier.

24. A pharmaceutical composition comprising an effective amount of the polymorph of claim 10, and a pharmaceutically acceptable carrier.

25. The pharmaceutical composition of claim 20, wherein the one or more diluents is selected from the group consisting of calcium carbonate, sodium carbonate, calcium phosphate, dicalcium phosphate, calcium sulfate, calcium hydrogen phosphate, sodium phosphate lactose, sucrose, cellulose, microcrystalline cellulose, kaolin, mannitol, sorbitol, inositol, sodium chloride, dry starch, cornstarch, powdered sugar, and mixtures of any of the foregoing diluents.

26. The pharmaceutical composition of claim 20, further comprising a disintegrant.

27. The pharmaceutical composition of claim 26, wherein the disintegrant is selected from the group consisting of agar, calcium carbonate, potato or tapioca starch, alginic acid, certain silicates, sodium carbonate, croscarmellose sodium, crospovidone, sodium starch glycolate, and mixtures of any of the foregoing disintegrants.

28. The pharmaceutical composition of claim 20, further comprising a binder.

29. The pharmaceutical composition of claim 28, wherein the binder is selected from the group consisting of starch, gelatin, sugars, natural and synthetic gums, alginates, polyethylene oxide, polyethylene glycol, inorganic calcium salts, silicic acid, polymethacrylates, waxes, water, alcohol, and mixtures of any of the foregoing binders.

30. The pharmaceutical composition of claim 20, further comprising a lubricant.

31. The pharmaceutical composition of claim 30, wherein the lubricant is selected from the group consisting of magnesium stearate, calcium stearate, stearic acid, silica, talc, malt, glyceryl behanate, hydrogenated vegetable oils, polyethylene glycol, sodium benzoate, sodium acetate, sodium chloride, leucine, magnesium lauryl sulfate, sodium lauryl sulfate, and mixtures of any of the foregoing lubricants.

32. A polymorph of compound (I-491):

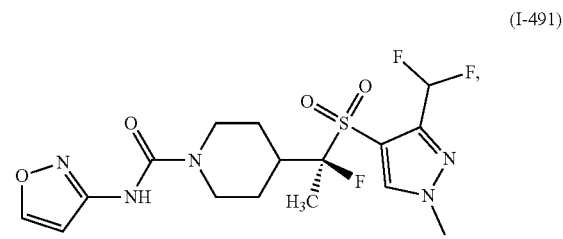 [SMILES: Cn1cc(S(=O)(=O)[C@@](C)(F)C2CCN(C(=O)Nc3ccon3)CC2)c(C(F)F)n1]

(I-491)

wherein the polymorph is Form B of compound (I-491), characterized by a X-ray powder diffraction pattern obtained by irradiation with Cu-Kα having two or more peaks expressed in degrees 2-theta±0.2° and selected from the group consisting of 7.32, 7.88, 10.20, 10.88, 13.40, 14.68, 15.24, 15.42, 16.28, 17.70, 18.48, 19.02, 20.18, 20.70, 21.56, 21.98, 22.94, 23.16, 23.86, 24.24, 24.78, 25.38, 26.40, 26.88, and 28.74 degrees.

33. The polymorph of claim 32, characterized by a X-ray powder diffraction pattern obtained by irradiation with Cu-Kα having peaks expressed in degrees 2-theta±0.2° at each of 15.42, 16.28, 19.02, 20.70, and 26.88 degrees.

34. The polymorph of claim 32, characterized by a X-ray powder diffraction pattern obtained by irradiation with Cu-Kα having peaks expressed in degrees 2-theta±0.2° at each of 15.42, 20.70, and 26.88 degrees.

35. The polymorph of claim 32, characterized by a X-ray powder diffraction pattern obtained by irradiation with Cu-Kα having peaks expressed in degrees 2-theta±0.2° at each of 7.88, 10.20, 20.70, and 26.88 degrees.

36. The polymorph of claim 32, characterized by a X-ray powder diffraction pattern obtained by irradiation with Cu-Kα having peaks expressed in degrees 2-theta±0.2° at each of 7.32, 7.88, 10.20, and 18.48 degrees.

37. The polymorph of claim 32, characterized by a X-ray powder diffraction pattern obtained by irradiation with Cu-Kα having peaks expressed in degrees 2-theta±0.2° at each of 7.32, 16.28, and 26.88 degrees.

38. The polymorph of claim 32, characterized by a X-ray powder diffraction pattern obtained by irradiation with Cu-Kα having peaks expressed in degrees 2-theta±0.2° at each of 7.88, 15.42, 17.70, and 21.56 degrees.

* * * * *